US009062160B1

(12) United States Patent
Chan et al.

(10) Patent No.: US 9,062,160 B1
(45) Date of Patent: Jun. 23, 2015

(54) CATALYST-FREE METHODS OF FORMING POLYURETHANES FROM PENTAFLUOROPHENYL CARBONATES

(71) Applicants: International Business Machines Corporation, Armonk, NY (US); Agency For Science, Technology and Research, Singapore (SG); Universidad del Pais Vasco/Euskal Herriko Unibertsitatea, Bizkaia (ES)

(72) Inventors: Julian M. W. Chan, Fremont, CA (US); Daniel J. Coady, San Jose, CA (US); Amanda C. Engler, San Jose, CA (US); Jeannette M. Garcia, San Jose, CA (US); James L. Hedrick, Pleasanton, CA (US); Zhan Yuin Ong, Singapore (SG); Haritz Sardon, San Jose, CA (US); Yi Yan Yang, Singapore (SG)

(73) Assignees: International Business Machines Corporation, Armonk, NY (US); Agency For Science, Technology And Research, Singapore (SG)

( * ) Notice: Subject to any disclaimer, the term of this patent is extended or adjusted under 35 U.S.C. 154(b) by 23 days.

(21) Appl. No.: 14/162,222

(22) Filed: Jan. 23, 2014

(51) Int. Cl.
C08G 73/24 (2006.01)
C08G 71/04 (2006.01)
C08G 65/00 (2006.01)
C08G 73/02 (2006.01)

(52) U.S. Cl.
CPC .............. *C08G 71/04* (2013.01); *C08G 65/007* (2013.01); *C08G 73/02* (2013.01); *C08G 73/0206* (2013.01)

(58) Field of Classification Search
CPC .. C08G 65/007; C08G 73/02; C08G 73/0206; C08G 71/04
USPC ......................................................... 528/401
See application file for complete search history.

(56) References Cited

U.S. PATENT DOCUMENTS 2,757,191 A 7/1956 Stilmar
3,236,812 A 2/1966 McElroy
3,485,802 A 12/1969 Witsiepe (Continued)

FOREIGN PATENT DOCUMENTS

WO 2012007254 A1 1/2012

OTHER PUBLICATIONS

Ballarad, et al., "NMR studies of mixed amines.", Energy Procedia 4 (2011) 291-298.

(Continued)

*Primary Examiner* — Michael L Leonard
(74) *Attorney, Agent, or Firm* — Michael R. Roberts

(57) ABSTRACT

One catalyst-free method of forming a polyurethane comprises forming a first emulsion comprising a first monomer, a surfactant, a water immiscible organic solvent, and water. The first monomer comprises two or more pentafluorophenyl carbonate groups. The first emulsion is combined with an aqueous mixture containing a second monomer comprising two or more nucleophilic amine groups, thereby forming a second emulsion. The first and second monomers of the second emulsion are allowed to react by interfacial polymerization, thereby forming a polyurethane. The polyurethane can have a number average molecular weight (Mn) of about 30000 to about 80000. The method is compatible with introducing pendant functionality into the polyurethane by way of cyclic carbonate precursors to the first monomer.

21 Claims, 21 Drawing Sheets

(56) References Cited

U.S. PATENT DOCUMENTS

| | | | |
|---|---|---|---|
| 4,758,615 | A | 7/1988 | Engel et al. |
| 5,175,231 | A | 12/1992 | Rappoport et al. |
| 5,340,889 | A | 8/1994 | Crawford et al. |
| 6,120,905 | A | 9/2000 | Figovsky |
| 8,137,700 | B2 | 3/2012 | Frechet et al. |
| 2006/0178443 | A1 | 8/2006 | Boinowitz et al. |
| 2011/0313091 | A1 | 12/2011 | Argyropoulos et al. |
| 2012/0149842 | A1 | 6/2012 | Diakoumakos |
| 2012/0264901 | A1 | 10/2012 | Cramail |

OTHER PUBLICATIONS

Barrere, et al., "High Molecular Weight Polyurethane and Polymer Hybrid Particles in Aqueous Miniemulsion," Macromolecules 2003, 36, 5119-5125; Published on Web Jun. 20, 2003.

Katsarava, et al., "Synthesis of Polyurethanes by Polycondensation of Activated Diol Biscarbonates With Diamines in Mild Conditions," Polymer Science U.S.S.R., 229, 10, 2268-2275 (1987).

Lau, et al., "Progress in Interfacial Polymerization Technique on Composite Membrane Preparation," 2011 2nd International Conference on Environmental Engineering and Applications (IPCBEE) vol. 17 (2011), 173-177.

Sardon, et al., "Homogeneous isocyanate- and catalyst-free synthesis of polyurethanes in aqueous media," Green Chemistry, 2013,15, 1121-1126; Published on Mar. 18, 2013.

Ubaghs, L., "Isocyanate-free Synthesis of (Functional) Polyureas, Polyurethanes, and Urethane-containing Copolymers," Thesis, Rheinisch-Westralischen Technischen Hochschule Aachen, Feb. 14, 2005.

Zhang, et al., "Polyaniline nanofibers: chemical synthesis using surfactants," Chem. Comm, 2004, 2360-2361.

CATALYST-FREE METHODS OF FORMING POLYURETHANES FROM PENTAFLUOROPHENYL CARBONATES

BACKGROUND

The present invention relates to a catalyst-free methods of forming polyurethanes from pentafluorophenyl carbonates, and more specifically to surfactant assisted interfacial polymerization of pentafluorophenyl carbonates to form polyurethanes.

Polyurethanes (PUs) have been used for a wide range of applications including thermoplastics, surface coatings, textile coatings, adhesives, elastomers, foams and dispersions. The properties of PUs are tailored by the reagents used and the method of preparation. Taking into account the currently large PU production volume, an ongoing need exists for more environmentally friendly (i.e., "greener") PU syntheses.

PUs are typically produced by an addition reaction between a diisocyanate and a bi-functional and/or multi-functional alcohol. The resulting polymer is an alternating segmented copolymer, where the segments are derived from the monomers. The segments can be "soft" or "hard." Typically, the soft flexible segments are generated from polymeric diols and diisocyanates (e.g., polyethers, polyesters or polycarbonates), and the hard rigid segments are generally formed from short chain and low molecular weight diisocyanates and diols. The polymeric diols can be biocompatible and/or biodegradable while the diisocyanates, obtained from phosgene, raise severe toxicity issues.

Isocyanate-free approaches to polyurethanes include the reaction of six- and seven-membered ring carbonates with nucleophiles such as diamines. High temperatures and long reaction times are required to generate high molecular weights using this method. Moreover, the cyclic carbonates can be unstable in aqueous media. As a result, polyurethane formation in aqueous media has been limited to the use of isocyanate monomers. Molecular weights of polyurethanes formed under aqueous conditions using isocyanate monomers are considerably lower than those obtained in organic solvents.

Another synthetic approach to polyurethanes utilizes activated aromatic dicarbonates, which undergo condensation with nucleophiles such as diamines to form polyurethanes in organic solvent media. The efficiency of the condensation reaction is dependent on the nature of the leaving group and the structure of the dicarbonate.

Interfacial polymerization is one of the most challenging techniques for polycondensation reactions. Two reactive monomers are dissolved separately in immiscible liquids. In this type of polymerization, rapid reaction occurs at the interface between these two solutions. Examples of interfacial polymerization employed for forming polyurethanes include the reaction of acetals, bis-chloroformates and isocyanates. In each case, the interfacial polymerization is hampered by the instability of the starting materials in aqueous media.

Therefore, more efficient methods of preparing polyurethanes were sought, in particular, catalyst-free methods of forming polyurethane nanoparticles and nanogels using isocyanate-free monomers. Methods compatible with introduction of arbitrary functionality into the polyurethanes for emerging medical and thin film applications are particularly desirable.

SUMMARY

Accordingly, a method is disclosed, comprising:
forming an initial emulsion by combining with agitation i) a first mixture comprising a first monomer and a water immiscible organic solvent with ii) a second mixture comprising water and a surfactant, wherein the first monomer comprises two or more pentafluorophenyl carbonate (PFPC) groups having the structure

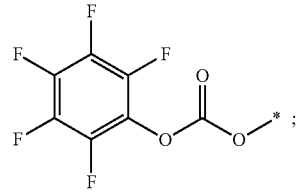 [SMILES: *OC(=O)Oc1c(F)c(F)c(F)c(F)c1F]

combining with agitation the initial emulsion and a third mixture, the third mixture comprising water and a second monomer, thereby forming a second emulsion that includes the first monomer and the second monomer, wherein the second monomer comprises two or more nucleophilic amine groups, and each of the two or more nucleophilic amine groups is capable of reacting with a respective PFPC group of the first monomer to form a respective carbamate group; and allowing the first monomer and the second monomer of the second emulsion to react by interfacial polymerization, thereby forming a polyurethane, wherein the polyurethane has a number average molecular weight (Mn) of about 30000 to about 80000.

Another method is disclosed, comprising:
forming an emulsion comprising droplets of an organic phase dispersed in an aqueous phase, the organic phase comprising a water immiscible organic solvent and a first monomer, the first monomer comprising two or more pentafluorophenyl carbonate (PFPC) groups having the structure

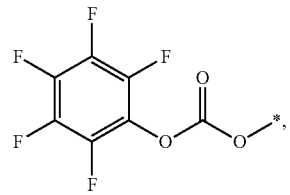

the aqueous phase comprising water, a surfactant, and a second monomer, wherein the second monomer comprises two or more nucleophilic amine groups, and;
allowing the first monomer and the second monomer of the emulsion to polymerize interfacially, thereby forming a polyurethane, wherein the polyurethane has a number average molecular weight (Mn) of about 30000 to about 80000.

Another method is disclosed, comprising:
(I) combining with agitation i) a first mixture comprising a first monomer and a water immiscible organic solvent with ii) a second mixture comprising water and a surfactant, thereby forming a first emulsion, wherein the first monomer comprises two or more pentafluorophenyl carbonate (PFPC) groups having the structure

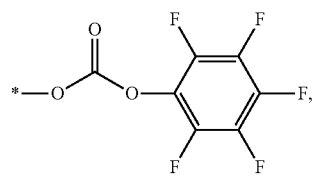 [SMILES: *OC(=O)Oc1c(F)c(F)c(F)c(F)c1F]

and one or more sub-structural moieties of formula (3):

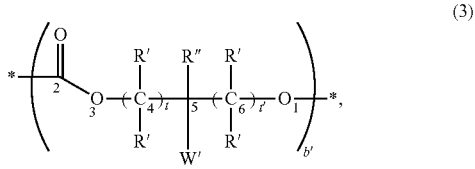

wherein
positions 1 to 6 of the sub-structural moiety of formula (3) are numbered,
b' is a number greater than or equal to 1,
each R' is an independent monovalent radical selected from the group consisting of hydrogen, halogens, methyl, and ethyl,
R" is a monovalent radical selected from the group consisting of hydrogen, halogens, and alkyl groups comprising 1 to 6 carbons,
t is a positive integer having a value of 0 to 2,
t' is a positive integer having a value of 0 to 2,
t and t' cannot both be zero, and
W' is a functional group selected from the group consisting of hydrogen and functional groups comprising 1 or more carbons;

(II) forming a third mixture comprising water and a second monomer comprising two or more nucleophilic amine groups capable of reacting with the PFPC groups of the first monomer to form respective carbamate groups;

(III) combining with agitation the first emulsion and the third mixture, thereby forming a second emulsion; and (IV) allowing the first monomer and the second monomer of the second emulsion to react by interfacial polymerization, thereby forming a polyurethane nanoparticle, wherein the polyurethane has a number average molecular weight (Mn) of about 30000 to about 80000.

The above-described and other features and advantages of the present invention will be appreciated and understood by those skilled in the art from the following detailed description, drawings, and appended claims.

DETAILED DESCRIPTION

Figure 1:
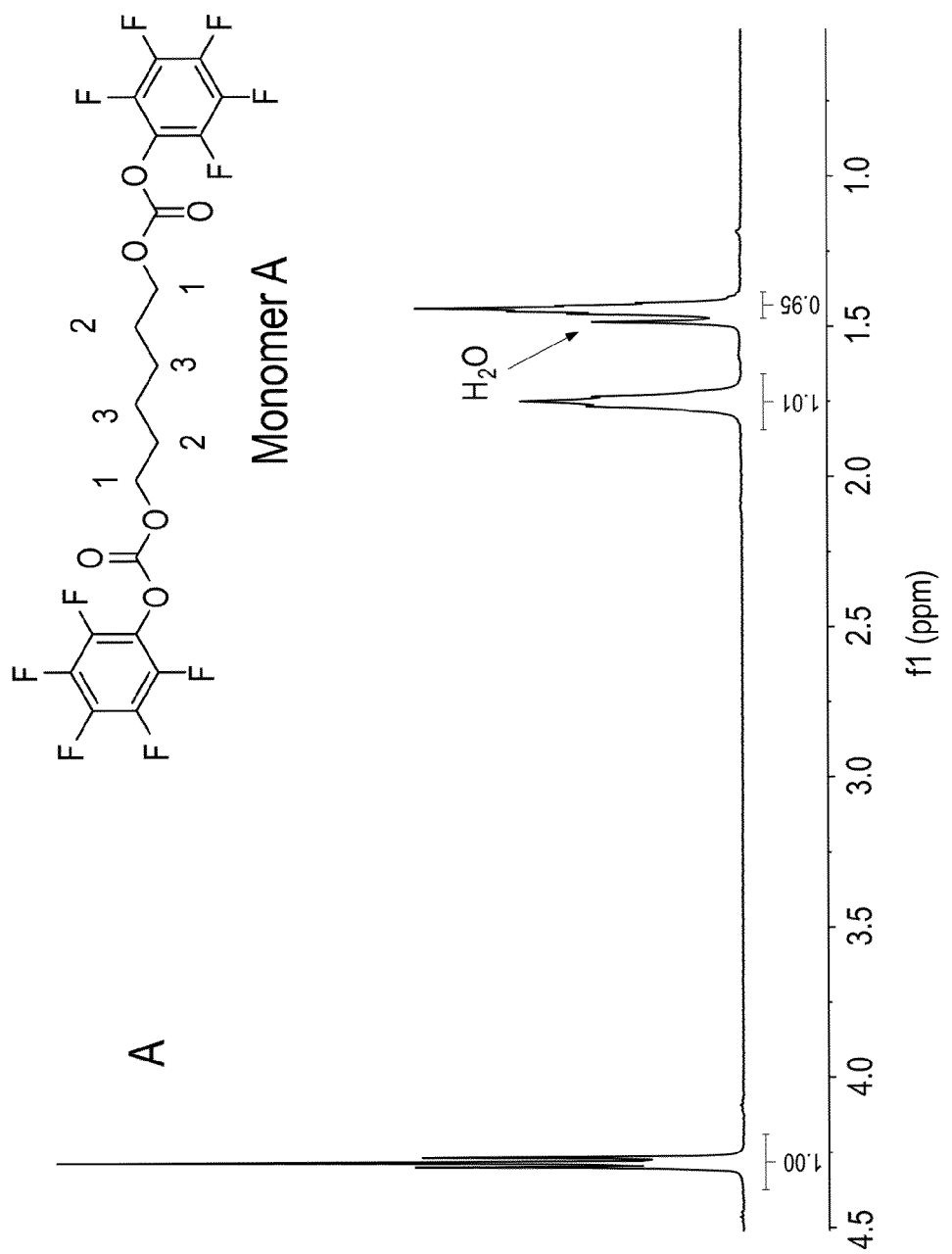
FIG. 1 is a $^1$H NMR spectrum of Monomer A prepared from 1,6-hexanediol.

Disclosed herein are catalyst-free methods of preparing polyurethanes (PUs) from multi-functional pentafluorophenyl carbonate monomers. Herein, the term "carbamate" is synonymous with the term "urethane," and the term "polyurethane" is synonymous with the term "polycarbamate." The polyurethanes can be formed by a solution polymerization utilizing water, an organic solvent, or a combination thereof. Preferably, the polyurethanes are formed by a surfactant assisted interfacial polymerization (SAIP). The SAIP method utilizes i) a first monomer comprising two or more pentafluorophenyl carbonate groups ("PFPC groups") and ii) a second monomer comprising two or more nucleophilic amine groups. Each of the two or more nucleophilic amine groups of the second monomer is capable of reacting with a respective PFPC group of the first monomer to form a respective carbamate group.

The polyurethanes can be non-branched (i.e., the polyurethane has one branch comprising a polyurethane chain) or branched (each PU macromolecule has two or more intersecting branches wherein each branch comprises a polyurethane chain). The polyurethanes can be non-crosslinked or crosslinked (e.g., as nanogels). The polyurethanes and/or nanoparticles thereof can be disposed on a variety of substrates in the form of a film layer. Alternatively, the polyurethane nanoparticles can serve as carriers for drugs used in medical treatments.

Herein, a drug can be any biologically active substance used in a medical treatment. Drugs include polymer drugs and non-polymer drugs. Polymer drugs include genes and proteins used in medical treatments. The loaded nanoparticles can comprise both small molecular weight drugs in the size range from 100 g/mole to about 1,000 g/mole, as well as larger macromolecular drugs, such as peptide and protein drugs in the size range from about 1,000 daltons to about 100,000 daltons, and beyond.

The disclosed methods provide other advantages. The methods produce no urea byproduct typically formed in an aqueous emulsion polymerization of isocyanate monomers. The methods also avoid the toxicity concerns arising from the utilization of metal catalysts and isocyanate monomers. Moreover, the alcohol byproduct formed by the condensation reaction of the active carbonate and the amine is potentially recyclable. The disclosed methods rapidly produce high molecular weight polyurethane having 1:1 stoichiometry of the monomers independent of reactant concentration, allowing for high molecular weight polyurethanes to be produced using dilute conditions. Moreover, the method permits introduction of a wide variety of side chains comprising additional functionality (e.g., pendant esters, pendant carboxylic acids, pendant amides, pendant ethers, backbone tertiary amine groups, and backbone ethers). Additionally, the crosslinked PU nanoparticles are generally stable in aqueous media.

The polyurethanes can be biodegradable and/or biocompatible. The term "biodegradable" is defined by the American Society for Testing and Materials as a degradation caused by biological activity, especially by enzymatic action, leading to a significant change in the chemical structure of the material. For purposes herein, a material is "biodegradable" if it undergoes 60% biodegradation within 180 days in accordance with ASTM D6400. Herein, a material is "enzymatically biodegradable" if the material can be degraded (e.g., depolymerized) by a reaction catalyzed by an enzyme.

A "biocompatible" material is defined herein as a material capable of performing with an appropriate host response in a specific application.

Herein, a polyurethane chain segment contains "O-fragments" and "N-fragments" derived from the first monomer and second monomer, respectively. An oxygen of an O-fragment is joined to a nitrogen of a N-fragment by way of a carbonyl group, as illustrated by the example in Scheme 1.

Scheme 1.

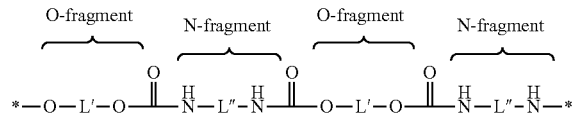

In Scheme 1, the starred bonds represent attachment points to other portions of the polyurethane structure. L' and L" in Scheme 1 represent multi-valent linking groups comprising 2 or more carbons. In Scheme 1, L' and L" have a valency of 2. An O-fragment and/or an N-fragment can comprise a polymer sub-structure (e.g., polyether and/or polycarbonate). That is, the first "monomer" and/or the second "monomer" for the interfacial polymerization to form polyurethane can comprise a polymer sub-structure.

Monomers

The first monomer is a composition of matter having a structure in accordance with formula (1):

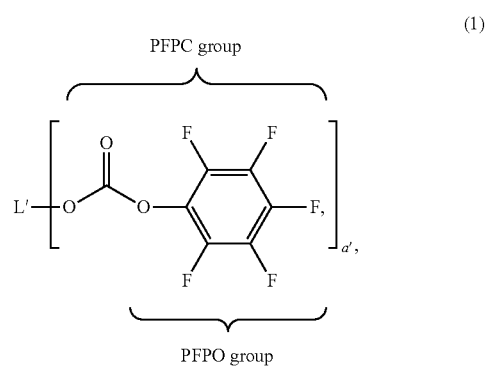

wherein a' is a positive integer having a value of 2 or more, and

L' is a multivalent linking group having a valency of a', wherein L' comprises 2 or more carbons.

In an embodiment, a' is 2 or 3. Each pentafluorophenyl carbonate (PFPC) group in the brackets is capable of reacting with a primary amine to form a carbamate, wherein the pentafluorophenyloxy (PFPO) group of formula (1) is a leaving group. The carbamate forming reaction produces pentafluorophenol as a byproduct that can be isolated and recycled.

In general, a precursor to the first monomer can be any polymer or compound comprising 2 or more alcohol groups, in which the alcohol groups are individually capable of being converted to a respective PFPC group. More specifically, precursors to the first monomer are multi-functional alcohols of formula (2):

wherein a' is a positive integer equal to 2 or more, and

L' is a multivalent linking group having a valency of a', wherein L' comprises 2 to or more carbons.

L' of formula (1) and formula (2) can be polymeric or non-polymeric. Non-limiting examples of L' include substituted and unsubstituted aliphatic groups, substituted and unsubstituted aromatic groups, and combinations thereof. L' of formula (1) and formula (2) can contain other functionality to be incorporated into the backbone of the PU or in a side chain linked to the polyurethane backbone. As non-limiting examples, L' can comprise one or more alkene groups, alkyne groups, azide groups, halide groups, ether groups, ester groups, amide groups, carbonate groups, urea groups, tertiary amine groups, quaternary amine groups, protected amine groups, protected alcohol groups, protected acid groups, sulfide groups, disulfide groups, nitrogen heterocyles, oxygen heterocyles, sulfur heterocyles, sulfonates, sulfobetaines, and combinations of the foregoing groups.

In an embodiment, the precursor to the first monomer is 1,6-hexane diol and/or a polyethylene glycol (PEG). The PEG can have a number average molecular weight (Mn) of about 1000 to about 10000, preferably 1000 to about 5000.

More specific first monomers comprise one or more sub-structural moieties of formula (3):

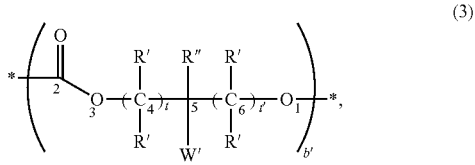
(3)

wherein
positions 1 to 6 of the sub-structural moiety of formula (3) are numbered,
b' is a number greater than or equal to 1,
each R' is an independent monovalent radical selected from the group consisting of hydrogen, halogens, methyl, and ethyl,
R" is a monovalent radical selected from the group consisting of hydrogen, halogens, and alkyl groups comprising 1 to 6 carbons,
t is a positive integer having a value of 0 to 2,
t' is a positive integer having a value of 0 to 2,
t and t' cannot both be zero, and
W' is a functional group selected from the group consisting of hydrogen and functional groups comprising 1 or more carbons.

When b' is 1, the first monomer can comprise one or more of sub-structural moieties of formula (3) that may or may not be present in a concatenated arrangement (i.e., polymer chain) in the first monomer. When b' is 2 or more, the sub-structural moiety of formula (3) represents a polycarbonate chain, in which case b' corresponds to an average value of the number of carbonate repeat units in a given polycarbonate chain segment. The first monomer can comprise one or more polycarbonate chain segments of formula (3).

In an embodiment, b' is 1, t is 1, t' is 1, each R' is hydrogen, and R" is methyl or ethyl in formula (3).

Other first monomers comprise one or more sub-structural moieties of formula (4):

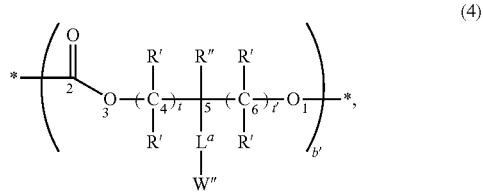
(4)

wherein
positions 1 to 6 are numbered in formula (4),
b' is a number greater than or equal to 1,
each R' is an independent monovalent radical selected from the group consisting of hydrogen, halogens, methyl, and ethyl,
R" is a monovalent radical selected from the group consisting of hydrogen, halogens, and alkyl groups comprising 1 to 6 carbons,
t is a positive integer having a value of 0 to 2,
t' is a positive integer having a value of 0 to 2,
t and t' cannot both be zero, $L^a$ is a divalent linking group comprising a carbonyl group, and
W" is a group comprising a heteroatom linked to the carbonyl of $L^a$, the heteroatom selected from the group consisting of O, N, and S.

Herein, a starred bond represents an attachment point (not a methyl group). In an embodiment, $L^a$ is selected from the group consisting of

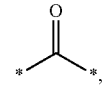

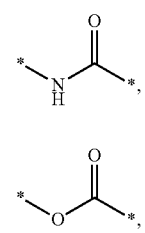

and
combinations thereof.

It should be understood that one starred bond of

is linked to W" and the other starred bond is linked to carbon 5 of formula (4). Also, it should be understood that the nitrogen starred bond of

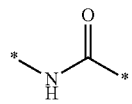

is linked to carbon 5 of formula (4) and the carbonyl starred bond is linked to W". Also, it should be understood that the oxygen starred bond of

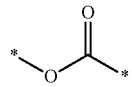

is linked to carbon 5 of formula (4) and the carbonyl starred bond is linked to W".

Other first monomers can have a structure according to formula (5):

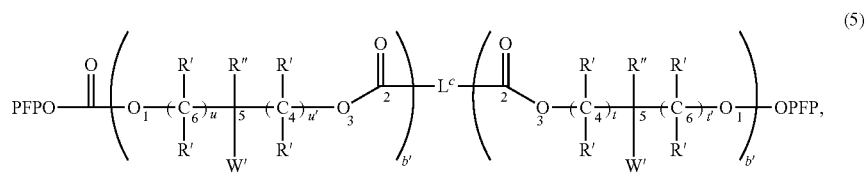
(5)

wherein
positions 1 to 6 of each parenthesized sub-structure are numbered in formula (5),
each PFPO represents a pentafluorophenyloxy group,
each b' is an independent number greater than or equal to 1, each R' is an independent monovalent radical selected from the group consisting of hydrogen, halogens, methyl, and ethyl, each R" is an independent monovalent radical selected from the group consisting of hydrogen, halogens, and alkyl groups comprising 1 to 6 carbons, t is a positive integer having a value of 0 to 2,
t' is a positive integer having a value of 0 to 2,
t and t' cannot both be zero,
u is a positive integer having a value of 0 to 2,
u' is a positive integer having a value of 0 to 2,
u and u' cannot both be zero, $L^c$ is a divalent linking group comprising 1 or more carbons, and each W' is a functional group selected from the group consisting of hydrogen and functional groups comprising 1 or more carbons.

Other more specific first monomers have a structure according to formula (6):

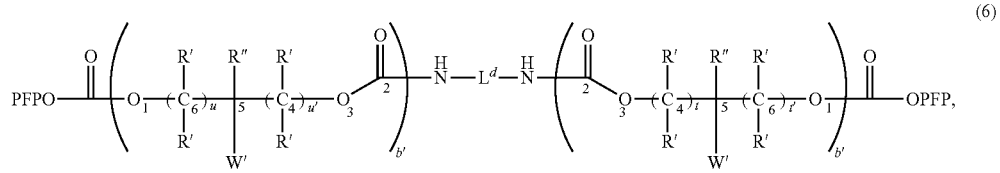

wherein positions 1 to 6 of each parenthesized sub-structure are numbered in formula (6), each PFPO represents a pentafluorophenyloxy group,
each b' is an independent number greater than or equal to 1,
each R' is an independent monovalent radical selected from the group consisting of hydrogen, halogens, methyl, and ethyl, each R" is an independent monovalent radical selected from the group consisting of hydrogen, halogens, and alkyl groups comprising 1 to 6 carbons, t is a positive integer having a value of 0 to 2,
t' is a positive integer having a value of 0 to 2,
t and t' cannot both be zero,
u is a positive integer having a value of 0 to 2,
u' is a positive integer having a value of 0 to 2,
u and u' cannot both be zero, $L^d$ is a divalent linking group comprising 1 or more carbons, and each W' is a functional group selected from the group consisting of hydrogen and functional groups comprising 1 or more carbons.

An exemplary first monomer having a structure according to formula (6) is Monomer C:

Monomer C

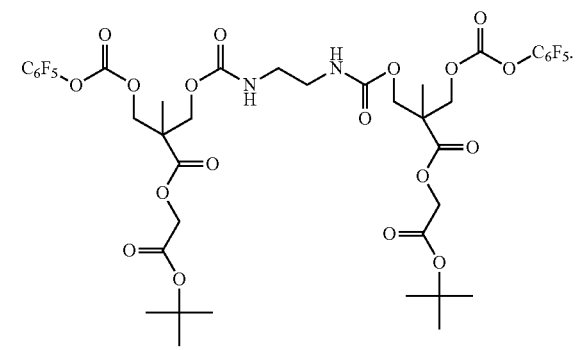

Monomer C can be prepared by ring opening a cyclic carbonate monomer MTC-TB using 1,2-ethylenediamine, and capping the resulting diol using bis(pentafluorophenyl) carbonate (PFC) as shown in Scheme 2.

Scheme 2

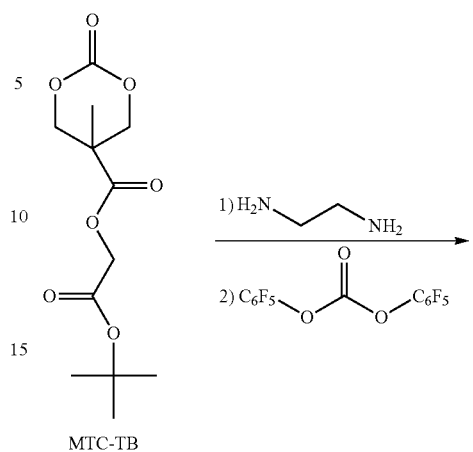

MTC-TB

-continued

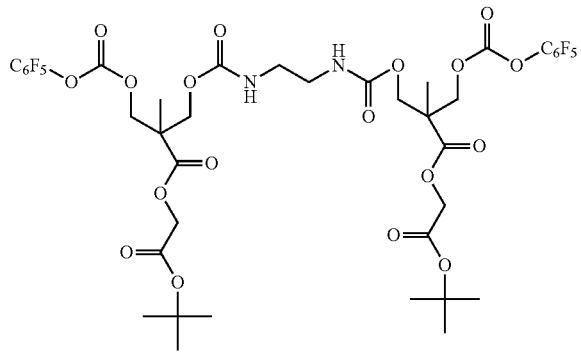

Monomer C

The t-butyl ester of Monomer C serves as a protected carboxylic acid, which can be deprotected (e.g., using trifluoroacetic acid) after formation of the polyurethane.

Other cyclic carbonates for potentially introducing functionality into the polyurethane include those listed in Table 1.

TABLE 1

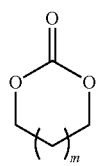

m = 1, Trimethylene carbonate (TMC)
m = 2, Tetramethylene carbonate (TEMC)
m = 3, Pentamethylene carbonate (PMC)

TABLE 1-continued
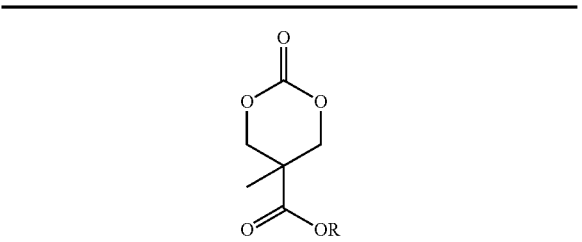
R = methyl (MTCOMe)
R = t-butyl (MTCO'Bu)
R = ethyl (MTCOEt)
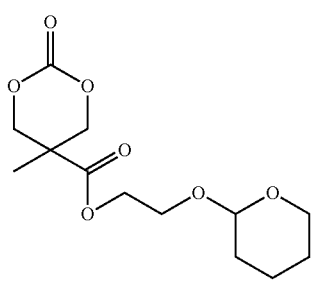 [SMILES: CC1(C(=O)OCCOC2CCCCO2)COC(=O)OC1]
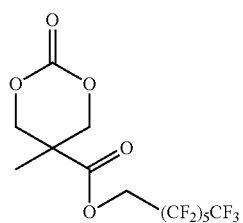
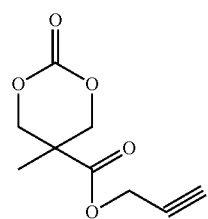
(MTCTFE)
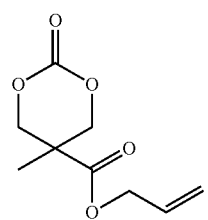
TABLE 1-continued
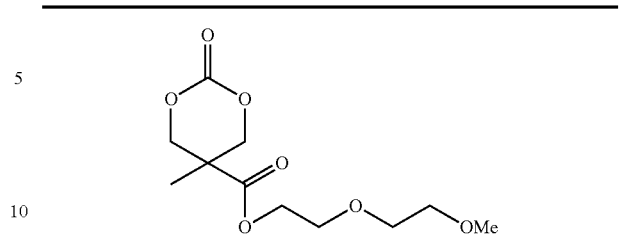
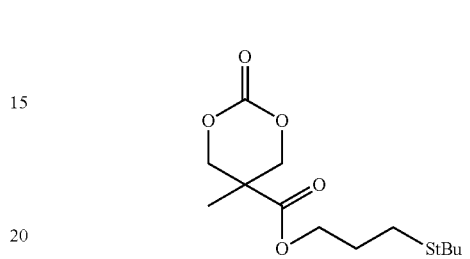
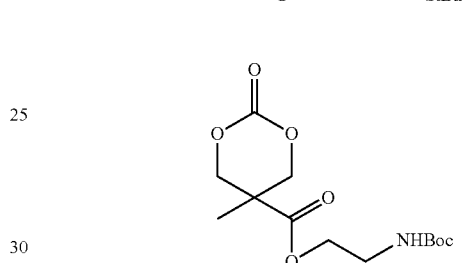
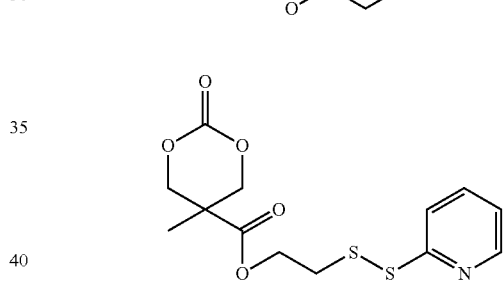
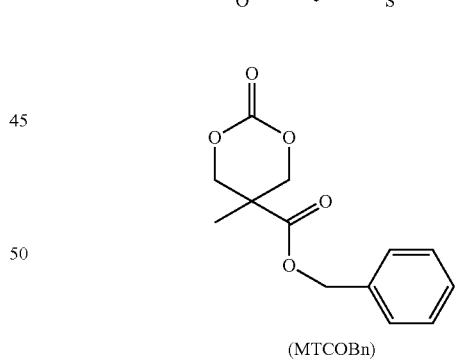
(MTCOBn)
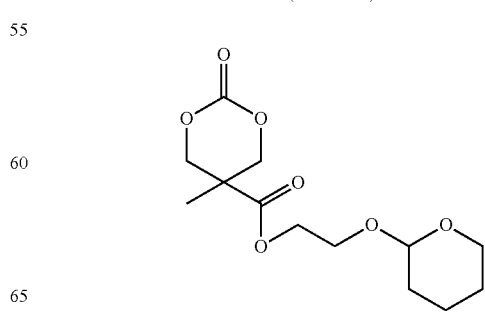

TABLE 1-continued

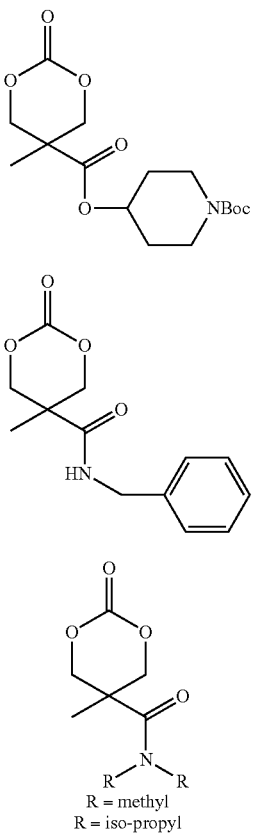

The above functionalized cyclic carbonates provide synthetic pathways for introducing a variety of important functionalities into the first monomer.

The above-described first monomers can be used singularly or in combination.

The active carbonate groups can be prepared by treating a multi-functional alcohol of formula (2) with bis(pentafluorophenyl)carbonate (PFC):

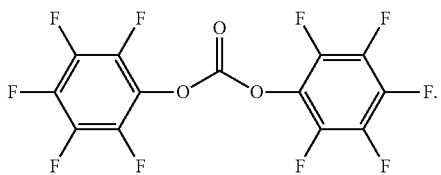 [SMILES: O=C(Oc1c(F)c(F)c(F)c(F)c1F)Oc1c(F)c(F)c(F)c(F)c1F]

The modification of the precursor of formula (2) with PFC is generally performed using a catalyst. Non-limiting catalysts for the alcohol modification include PROTON SPONGE (1,8-bis(dimethylamino)naphthalene), cesium fluoride, and sodium hydride. Most preferably, the catalyst is PROTON SPONGE.

The second monomer has a structure according to formula (7):

$$L''[NH_2]_{c'}, \quad (7),$$

wherein c' is a positive integer equal to 2 or more, and

L" is a multivalent linking group having a valency of c', wherein L" comprises 2 or more carbons.

L" can be polymeric or non-polymeric. Non-limiting examples of L" include substituted and unsubstituted aliphatic groups, substituted and unsubstituted aromatic groups, and combination thereof. L" can comprise one or more alkene groups, alkyne groups, azide groups, halide groups, ether groups, ester groups, amide groups, carbonate groups, urea groups, tertiary amine groups, quaternary amine groups, protected amine groups, protected alcohol groups, protected acid groups, sulfide groups, disulfide groups, nitrogen heterocyles, oxygen heterocycles, sulfur heterocycles, sulfonates, sulfobetaines, and combinations of the foregoing groups.

More specific exemplary second monomers include ethylenediamine, hexanediamine, polyethylene glycol diamine (Mn=3600), polyethylene glycol tetraamine (Mn=10,000), and polypropylene glycol diamine (Mn=2000).

The second monomer can comprise a sub-structural moiety of formula (3) and/or formula (4), which can be derived from a cyclic carbonate monomer, as described above for the first monomer.

Interfacial Reaction

The disclosed method includes initially forming an emulsion comprising two immiscible liquid phases, an organic phase and an aqueous phase. The interface is the boundary separating the organic phase from the aqueous phase. The organic phase comprises the less polar monomer (more hydrophobic monomer, generally the first monomer) dissolved in a water immiscible organic solvent. The aqueous phase comprises the more polar monomer (the more hydrophilic monomer, generally the second monomer) dissolved in water. The aqueous phase also contains a surfactant to enhance the stability of the droplets of the organic phase dispersed in the aqueous phase.

An initial emulsion can be prepared by i) forming a first solution comprising the less polar monomer in a water immiscible organic solvent, ii) forming an second solution comprising water and a surfactant, and iii) mixing the first solution and second solution with agitation (e.g., sonication), thereby forming an initial emulsion (first emulsion). To the initial emulsion is added portionwise (e.g., dropwise for a period of about an hour), preferably with agitation, a third solution comprising water and the more polar monomer, thereby forming a second emulsion. The first monomer and the second monomer of the second emulsion are allowed to interfacially react to form a high molecular weight polyurethane.

The first solution can comprise the less polar monomer in an amount of 99 wt % to 0.01 wt % based on total weight of the first solution.

The second solution can comprise the surfactant in an amount of 0.01 wt % to 20 wt % based on total weight of the second solution.

The third solution can comprise the more polar monomer in an amount of 99 wt % to 0.01 wt % based on total weight of the third solution.

The first monomer: second monomer mole ratio can be varied from 1:0.1 to 1:2, and more preferably from 1:0.8 to 1:1.2. This ratio affects considerably the molecular weight of the obtained polyurethane.

The organic phase of the second emulsion is in the form of dispersed droplets having an average size of about 1 nm to 1000 nm, more specifically about 50 nm to about 200 nm based on average circular diameter. The size dispersity of the droplets can be in a range of 0.001 to 1.

The organic solvent: water weight ratio of the second emulsion can be in a range of 95:5 to 5:95 wt/wt.

The polymerization can be conducted at an emulsion temperature of about 1° C. to about 80° C., preferably at ambient temperature (about 20° C.).

The interfacial polymerization is preferably conducted at a pH of 7 or higher, more particularly at a pH of about 8 to about 9.

Non-limiting exemplary water immiscible organic solvents include toluene, chloroform, dichloromethane (DCM), hexane, and diethyl ether.

Non-limiting exemplary surfactants for stabilizing the polymer system can be any anionic, cationic or non-ionic surfactant, preferably, sodium dodecyl sulphate, TRITON X 100 and/or cetyl trimethyl ammonium bromide.

A first monomer and/or second monomer comprising 3 or more carbamate forming groups can be used to produce branched and/or crosslinked polyurethane particles in the form of nanogels.

The reaction mixture can further include a chain growth terminating agent (e.g., a monofunctional pentafluorophenylcarbonate).

Unlike other emulsion polymerizations used to form polyurethanes, the disclosed method can produce polyurethanes having a number average molecular weight (Mn) of about 30000 or more, more particularly about 40000 to about 80000.

The process can produce polyurethanes in the form of nanoparticles having an average particle size in water in a range of about 4 nm to about 500 nm based on average circular diameter of the nanoparticles.

Drug Loaded Nanoparticles

The disclosed polyurethane nanoparticles are potentially useful as carriers for drugs. A method of forming a drug-loaded nanoparticle comprises combining, with agitation, an aqueous solution containing the polyurethane nanoparticles with a second solution containing a drug dissolved in a water miscible organic solvent (e.g., N,N-dimethyl acetamide (DMAc)). Removing the organic solvent (e.g., by dialysis) from the resulting mixture produces a drug-loaded nanoparticle, also referred to as a loaded nanoparticle. A given loaded nanoparticle comprises, in contact together, the drug and the polyurethane. The loaded nanoparticles can be isolated as water-dispersible solid particles by removing the water (e.g., using lyophilization).

The loaded nanoparticles can have an average particle size (average circular diameter) of about 20 nm to about 700 nm at a pH of 5.0 to 8.0. The loaded nanoparticles can have a size polydispersity of about 0.2 to about 0.5.

Further disclosed is a method of treating a cell, comprising contacting the cell with an aqueous mixture comprising the disclosed loaded nanoparticles.

The biologically active cargo can comprise a single drug or a mixture of drugs.

Cells can be contacted in vitro, ex vivo, or in vivo.

The loaded nanoparticles can comprise the drug in an amount of about 0.1 wt % to about 50 wt %, and more particularly about 3.0 wt % to about 30 wt % based on total dry weight of the loaded nanoparticles.

The loaded nanoparticles can comprise the polyurethane in an amount of about 99.9 wt % to about 50 wt %, more particularly about 97 wt % to about 70 wt % based on total dry weight of the loaded nanoparticles.

Drugs

Exemplary protein drugs include peptide hormones such as insulin, glucagon, parathyroid hormone, calcitonin, vasopression, renin, prolactin, growth hormone, the gonadotropins including chorionic gonadotropin, follicle stimulating hormone, thyroid stimulating hormone and leutenizing hormone; physiologically active enzymes such as transferases, hydrolases, lyases, isomerases, phosphatases, glycosidases, superoxide dismutase, factor VIII, plasminogen activators; and other therapeutic agents including protein factors such as epidermal growth factor, insulin-like growth factor, tumour necrosis factor, transforming growth factors, fibroblast growth factors, patelet-derived growth factors, erythropoietin, colony stimulating factors, bone morphogenetic proteins, interleukins and interferons. Exemplary non-protein macromolecules include polysaccharides, nucleic acid polymers, and therapeutic secondary metabolites including plant products such as vinblastine, vincristine, taxol and the like.

Other drugs include Aspirin, Diflunisal, Diclofenac, Aceclofenac, Acemetacin, Etodolac, Indometacin, Sulindac, Tolmetin, Ibuprofen, Carprofen, Fenbufen, Fenoprofen, Flurbiprofen, Ketoprofen, Ketorolac, Loxoprofen, Naproxen, Oxaprozin, Tiaprofenic acid, Suprofen, Mefenamic acid, Meclofenamic acid, Lumiracoxib, Oxyphenbutazone, Piroxicam, Lornoxicam, Meloxicam, and Tenoxicam. Steroidal Anti-Inflammatory Drugs include Hydrocortisone, Prednisone, Prednisolone, Methylprednisolone, Dexamethasone, Betamethasone, Triamcinolone, Beclometasone, Fludrocortisone acetate, and Aldosterone. Chemotherapeutic drugs include Doxorubicin and DNA alkylating Agents such as Melphalan, Chlorambucil, Dacarbazine, Temozolomide, and Streptozotocin. Antimetabolite drugs include Methotrexate, Pemetrexed, Raltitrexed, Tioguanine, Fludarabine, Pentostatin, Cladribine, Floxuridine, and Gemcitabine. Alkaloid drugs include Vincristine, Vinblastine, Vinorelbine, Vindesine, and Topoisomerase. Inhibitors include Etoposide, Teniposide, Irinotecan, and Topotecan. Taxanes include Paclitaxel and Docetaxel. Anticoagulants include Warfarin, Acenocoumarol, Phenprocoumon, Argatroban, and Ximelagatran.

Still other exemplary commercially available drugs include 13-cis-Retinoic Acid, 2-CdA, 2-Chlorodeoxyadenosine, 5-Azacitidine, 5-Fluorouracil, 5-FU, 6-Mercaptopurine, 6-MP, 6-TG, 6-Thioguanine, Abraxane, Accutane®, Actinomycin-D, Adriamycin®, Adrucil®, Afinitor®, Agrylin®, Ala-Cort®, Aldesleukin, Alemtuzumab, ALIMTA, Alitretinoin, Alkaban-AQ®, Alkeran®, All-transretinoic Acid, Alpha Interferon, Altretamine, Amethopterin, Amifostine, Aminoglutethimide, Anagrelide, Anandron®, Anastrozole, Arabinosylcytosine, Ara-C, Aranesp®, Aredia®, Arimidex®, Aromasin®, Arranon®, Arsenic Trioxide, Asparaginase, ATRA, Avastin®, Azacitidine, BCG, BCNU, Bendamustine, Bevacizumab, Bexarotene, BEXXAR®, Bicalutamide, BiCNU, Blenoxane®, Bleomycin, Bortezomib, Busulfan, Busulfex®, C225, Calcium Leucovorin, Campath®, Camptosar®, Camptothecin-11, Capecitabine, Carac™, Carboplatin, Carmustine, Carmustine Wafer, Casodex®, CC-5013, CCI-779, CCNU, CDDP, CeeNU, Cerubidine®, Cetuximab, Chlorambucil, Cisplatin, Citrovorum Factor, Cladribine, Cortisone, Cosmegen®, CPT-11, Cyclophosphamide, Cytadren®, Cytarabine, Cytarabine Liposomal, Cytosar-U®, Cytoxan®, Dacarbazine, Dacogen, Dactinomycin, Darbepoetin Alfa, Dasatinib, Daunomycin, Daunorubicin, Daunorubicin Hydrochloride, Daunorubicin Liposomal, DaunoXome®, Decadron, Decitabine, Delta-Cortef®, Deltasone®, Denileukin Diftitox, DepoCyt™, Dexamethasone, Dexamethasone Acetate, Dexamethasone Sodium Phosphate Dexasone, Dexrazoxane, DHAD, DIC, Diodex, Docetaxel, Doxil®, Doxorubicin, Doxorubicin Liposomal, Droxia™, DTIC, DTIC-Dome®, Duralone®, Efudex®, Eligard™, Ellence™, Eloxatin™, Elspar®, Emcyt®, Epirubicin, Epoetin Alfa, Erbitux, Erlotinib, Erwinia L-asparaginase, Estramustine, Ethyol, Etopophos®, Etoposide, Etoposide Phosphate, Eulexin®, Everolimus, Evista®, Exemestane, Fareston®, Faslodex®, Femara®, Filgrastim, Floxuridine, Fludara®, Fludarabine, Fluoroplex®, Fluorouracil, Fluorouracil (cream), Fluoxymesterone, Flutamide, Folinic Acid, FUDR®, Fulvestrant, G-CSF, Gefitinib, Gemcitabine, Gemtuzumab ozogamicin, Gemzar, Gleevec™, Gliadel® Wafer, GM-CSF, Goserelin, Granulocyte-Colony Stimulating Factor, Granulocyte Macrophage Colony Stimulating Factor, Halotestin®, Herceptin®, Hexadrol, Hexalen®, Hexamethylmelamine, HMM, Hycamtin®, Hydrea®, Hydrocort Acetate®, Hydrocortisone, Hydrocortisone Sodium Phosphate, Hydrocortisone Sodium Succinate, Hydrocortone Phosphate, Hydroxyurea, Ibritumomab, Ibritumomab Tiuxetan Idamycin®, Idarubicin, Ifex®, IFN-alpha Ifosfamide, IL-11 IL-2 Imatinib mesylate, Imidazole Carboxamide Interferon alfa, Interferon Alfa-2b (PEG Conjugate), Interleukin-2, Interleukin-11, Intron A® (interferon alfa-2b), Iressa®, Irinotecan, Isotretinoin, Ixabepilone, Ixempra™, K Kidrolase (t), Lanacort®, Lapatinib, L-asparaginase, LCR, Lenalidomide, Letrozole, Leucovorin, Leukeran, Leukine™, Leuprolide, Leurocristine, Leustatin™, Liposomal Ara-C, Liquid Pred®, Lomustine, L-PAM, L-Sarcolysin, Lupron®, Lupron Depot®, Matulane®, Maxidex, Mechlorethamine, Mechlorethamine Hydrochloride, Medralone®, Medrol®, Megace®, Megestrol, Megestrol Acetate, Melphalan, Mercaptopurine, Mesna, Mesnex™, Methotrexate, Methotrexate Sodium, Methylprednisolone, Meticorten®, Mitomycin, Mitomycin-C, Mitoxantrone, M-Prednisol®, MTC, MTX, Mustargen®, Mustine Mutamycin®, Myleran®, Mylocel™, Mylotarg®, Navelbine®, Nelarabine, Neosar®, Neulasta™, Neumega®, Neupogen®, Nexavar®, Nilandron®, Nilutamide, Nipent®, Nitrogen Mustard, Novaldex®, Novantrone®, Octreotide, Octreotide acetate, Oncospar®, Oncovin®, Ontak®, Onxal™, Oprevelkin, Orapred®, Orasone®, Oxaliplatin, Paclitaxel, Paclitaxel Protein-bound, Pamidronate, Panitumumab, Panretin®, Paraplatin®, Pediapred®, PEG Interferon, Pegaspargase, Pegfilgrastim, PEG-INTRON™, PEG-L-asparaginase, PEMETREXED, Pentostatin, Phenylalanine Mustard, Platinol®, Platinol-AQ®, Prednisolone, Prednisone, Prelone®, Procarbazine, PROCRIT®, Proleukin®, Prolifeprospan 20 with Carmustine Implant, Purinethol®, Raloxifene, Revlimid®, Rheumatrex®, Rituxan®, Rituximab, Roferon-A® (Interferon Alfa-2a) Rubex®, Rubidomycin hydrochloride, Sandostatin®, Sandostatin LAR®, Sargramostim, Solu-Cortef®, Solu-Medrol®, Sorafenib, SPRYCEL™, STI-571, Streptozocin, SU11248, Sunitinib, Sutent®, Tamoxifen, Tarceva®, Targretin®, Taxol®, Taxotere®, Temodar®, Temozolomide, Temsirolimus, Teniposide, TESPA, Thalidomide, Thalomid®, TheraCys®, Thioguanine, Thioguanine Tabloid®, Thiophosphoamide, Thioplex®, Thiotepa, TICE®, Toposar®, Topotecan, Toremifene, Torisel®, Tositumomab, Trastuzumab, Treanda®, Tretinoin, Trexall™, Trisenox®, TSPA, TYKERB®, VCR, Vectibix™, Velban®, Velcade®, VePesid®, Vesanoid®, Viadur™, Vidaza®, Vinblastine, Vinblastine Sulfate, Vincasar Pfs®, Vincristine, Vinorelbine, Vinorelbine tartrate, VLB, VM-26, Vorinostat, VP-16, Vumon®, Xeloda®, Zanosar®, Zevalin™, Zinecard®, Zoladex®, Zoledronic acid, Zolinza, and Zometa.

No restriction is placed on the type of cell that can be treated with the above-described loaded nanoparticles. In particular, the cells can be eukaryotic cells, mammalian cells, and more particularly rodent and/or human cells. The cells can be derived from various tissues, including extraembryonic or embryonic stem cells, totipotent or pluripotent, dividing or non-dividing, parenchyma or epithelium, immortalized or transformed, or the like. The cell may be a stem cell or a differentiated cell. Cell types that are differentiated include adipocytes, fibroblasts, myocytes, cardiomyocytes, endothelium, dendritic cells, neurons, glia, mast cells, blood cells and leukocytes (e.g., erythrocytes, megakaryotes, lymphocytes, such as B, T and natural killer cells, macrophages, neutrophils, eosinophils, basophils, platelets, granulocytes), epithelial cells, keratinocytes, chondrocytes, osteoblasts, osteoclasts, hepatocytes, and cells of the endocrine or exocrine glands, as well as sensory cells.

The loaded nanoparticles can be used as non-viral transfection vectors. The target gene is not limited to any particular type of target gene or nucleotide sequence. For example, the target gene can be a cellular gene, an endogenous gene, an oncogene, a transgene, or a viral gene including translated and non-translated RNAs. Exemplary possible target genes include: transcription factors and developmental genes (e.g., adhesion molecules, cyclin-dependent kinase inhibitors, Wnt family members, Pax family members, Winged helix family members, Hox family members, cytokines/lymphokines and their receptors, growth/differentiation factors and their receptors, neurotransmitters and their receptors); oncogenes (e.g., ABLI, BCLI, BCL2, BCL6, CBFA2, CBL, CSFIR, ERBA, ERBB, ERBB2, ETSI, ETV6, FGR, FOS, FYN, HCR, HRAS, JUN, KRAS, LCK, LYN, MDM2, MLL, MYB, MYC, MYCLI, MYCN, NRAS, PIMI, PML, RET, SKP2, SRC, TALI, TCL3, and YES); tumor suppressor genes (e.g., APC, BRAI, BRCA2, CTMP, MADH4, MCC, NFI, NF2, RBI, TP53, and WTI); and enzymes (e.g., ACP desaturases and hydroxylases, ADP-glucose pyrophorylases, ATPases, alcohol dehydrogenases, amylases, amyloglucosidases, catalases, cyclooxygenases, decarboxylases, dextrinases, DNA and RNA polymerases, galactosidases, glucose oxidases, GTPases, helicases, integrases, insulinases, invertases, isomerases, kinases, lactases, lipases, lipoxygenases, lysozymes, peroxidases, phosphatases, phospholipases, phosphorylases, proteinases and peptidases, recombinases, reverse transcriptases, telomerase, including RNA and/or protein components, and topoisomerases).

Thin Films by Interfacial Polymerization

Figure 25:
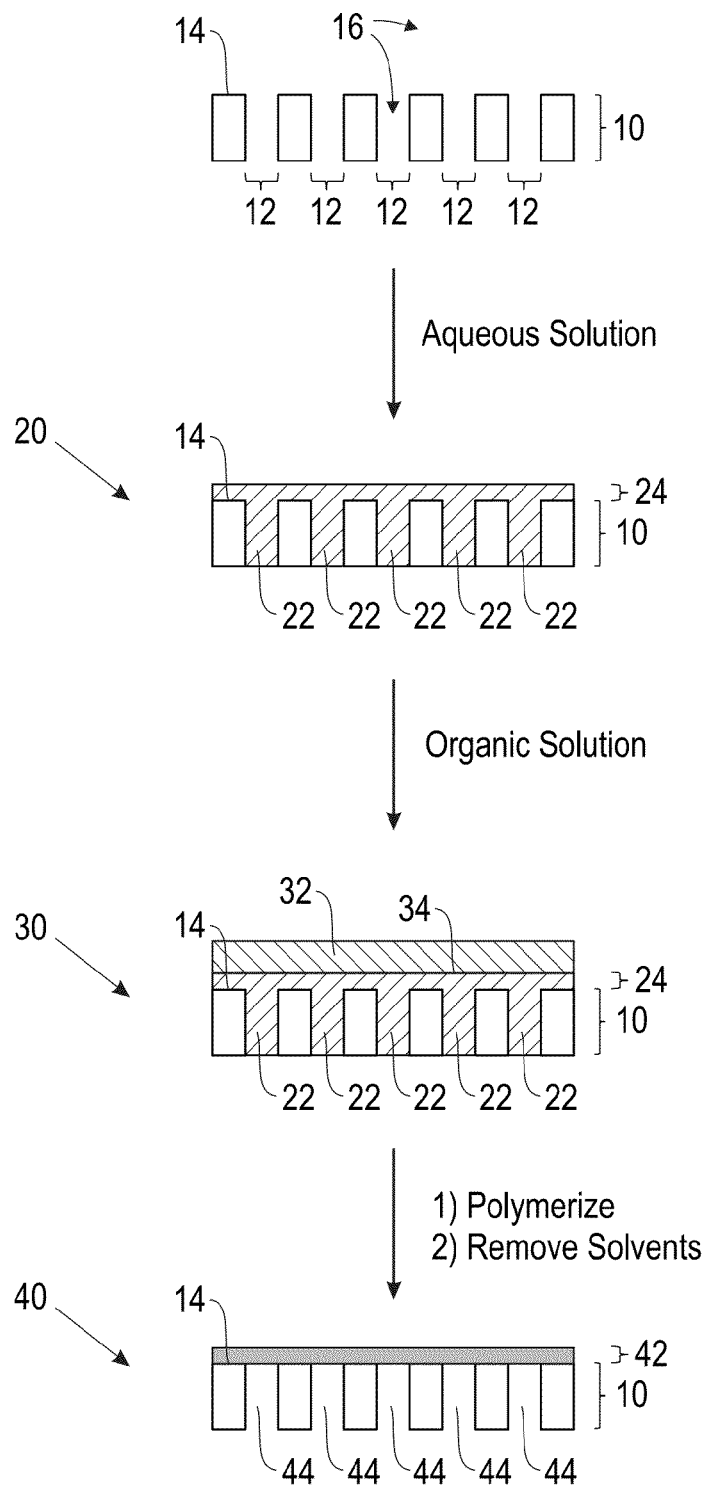
FIG. 25 is a series of cross-sectional layer diagrams showing a process of making a thin film by interfacial polymerization.

Another possible utility for the disclosed method is the formation of thin polyurethane films on porous substrates. Non-limiting examples of porous substrates include aqueous filtration membranes. A process of forming a thin film on a porous membrane is illustrated in schematic layer diagrams of FIG. 25. Porous support 10 comprises pores 12 and top surface 14 exposed to air 16. Porous support 10 is treated with an aqueous solution containing preferably an above-described water soluble second monomer (e.g., a diamine), thereby forming structure 20. Structure 20 comprises aqueous solution-filled pores 22 and thin aqueous liquid layer 24 disposed on top surface 14 of support 10. Structure 20 is then contacted with an organic mixture comprising a water immiscible organic solvent and preferably an above-described first monomer (e.g., an active dicarbonate), thereby forming structure 30. The organic mixture can be in the form of an emulsion (e.g., comprising water, surfactant, organic solvent, and the second monomer) or a solution. Structure 30 comprises thin organic liquid layer 32 disposed on thin aqueous liquid layer 24, having interface 34 therebetween. The first monomer and the second monomer are allowed to react by interfacial polymerization to form polyurethane. Removal of the solvents results in structure 40 comprising a polyurethane layer 42 disposed on top surface 14 of porous support 10, having pores 44.

The following examples illustrate the preparation of polyurethane nanoparticles.

EXAMPLES

Materials used in the following examples are listed in Table 2.

TABLE 2

| ABBREVIATION | DESCRIPTION | SUPPLIER |
| --- | --- | --- |
| HD | 1,6-Hexanediol | Sigma-Aldrich |
| PEG | Poly(ethylene glycol); Mn = 1500, PDI 1.04 | RAPP Polymere GmbH |
| PEG-DA | PEG-DA; PEG-diamine; poly(ethylene oxide) terminated with amine groups; Mn = 3600 | NOF Corporation |
| PFC | bis(Pentafluorophenyl) Carbonate | Central Glass |
| SDS | Sodium Dodecylsulfate; surfactant | Sigma-Aldrich |
| PROTON-SPONGE | N,N,N',N'-Tetramethyl-1,8-naphthalenediamine | Sigma-Aldrich |
| DAE | Ethylene Diamine | Sigma-Aldrich |
| TEA | Triethylamine | Sigma-Aldrich |
| TMA | Trimethylamine | Sigma-Aldrich |
| DCM | Dichloromethane | Sigma-Aldrich |
| DMSO | Dimethylsulfoxide | Sigma-Aldrich |
| THF | Tetrahydrofuran | Sigma-Aldrich |
| TAEA | Tris(2-Aminoethyl) Amine | Sigma-Aldrich |
| bis-MPA | 2,2-bis(Methylol) Propionic Acid | Sigma-Aldrich |
| TBBA | tert-Butyl Bromoacetate | Sigma-Aldrich |
| ECF | Ethyl Chloroformate | Sigma-Aldrich |
|  | 4-Nitrophenyl Chloroformate | Sigma-Aldrich |
|  | 1,1'-Carbonyl Diimidazole | Sigma-Aldrich |

Herein, Mn is the number average molecular weight, Mw is the weight average molecular weight, and MW is the molecular weight of one molecule.

Monomer Synthesis

Example 1

Synthesis of $C_6F_5O$—COO—$(CH_2)_6$—OCO—$OC_6F_5$ (Monomer A)

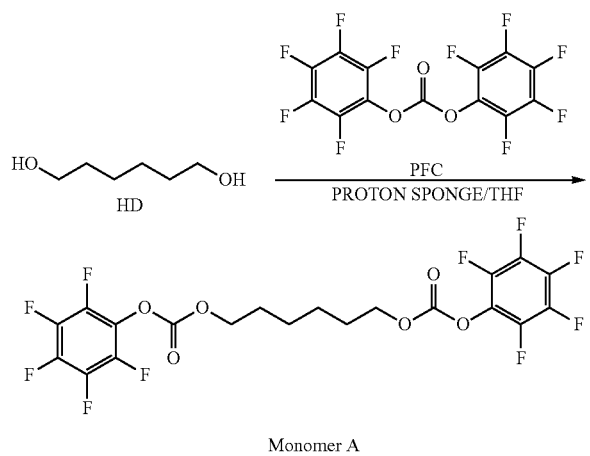

Monomer A

PFC (2.5 g, 5.0 mmol, 2.5 equivalents (equiv.)) and PROTON-SPONGE (0.11 g, 0.50 mmol, 0.25 equiv.) were dissolved in THF (8.0 mL) and stirred for 30 minutes. 1,6-hexanediol (HD, 0.24 g, 2.0 mmol) dissolved in 2.0 mL of THF was added dropwise to the reaction mixture and allowed to react at room temperature until completion (4 hours). The reaction mixture was concentrated and the residue was dissolved in dichloromethane, from which much of the pentafluorophenol byproduct precipitated and was removed. The filtrate was then rinsed with saturated aqueous $NaHCO_3$ and water, dried over $MgSO_4$, and concentrated. The crude product was recrystallized from hexanes to afford $C_6F_5O$—COO—$(CH_2)_6$—OCO—$OC_6F_5$ (Monomer A) as a white crystalline powder (0.77 g, 73% yield). The structure was confirmed by $^1H$ NMR (FIG. 1), $^{13}C$ NMR, and $^{19}F$ NMR spectroscopy. $^1H$ NMR ($CDCl_3$, 400 MHz): delta=4.28 (t, $OCOOCH_2$, 4H), 1.75 (t, $OCOOCH_2CH_2$, 4H), 1.44 (t, $CH_2$, 4H). $^{13}C$ NMR ($CDCl_3$, 400 MHz): delta=151.0 (OCOO), 142.0, 140.0, 139.0, 136.0 ($C_{Ar}$), 70.0 (s, $COOCH_2$), 28.0 ($COOCH_2CH_2$), 25.0 ($CH_2$). $^{19}F$ NMR ($CDCl_3$ 400 MHz): delta-154 (d, Ar-F, 4F), -158 (t, Ar-F, 4F), -162 (q, Ar-F, 2F).

Example 2

Synthesis of $C_6F_5O$-COO-PEG-OCO-$OC_6F_5$ (Monomer B)

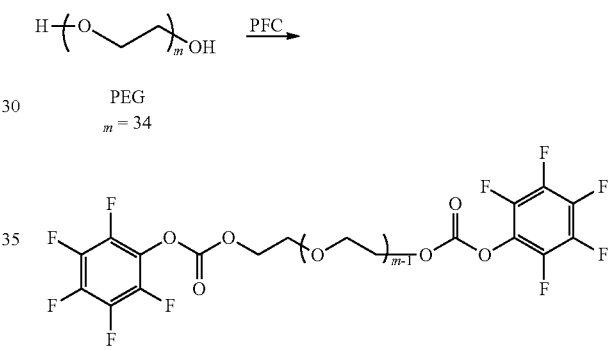

Monomer B

Figure 2:
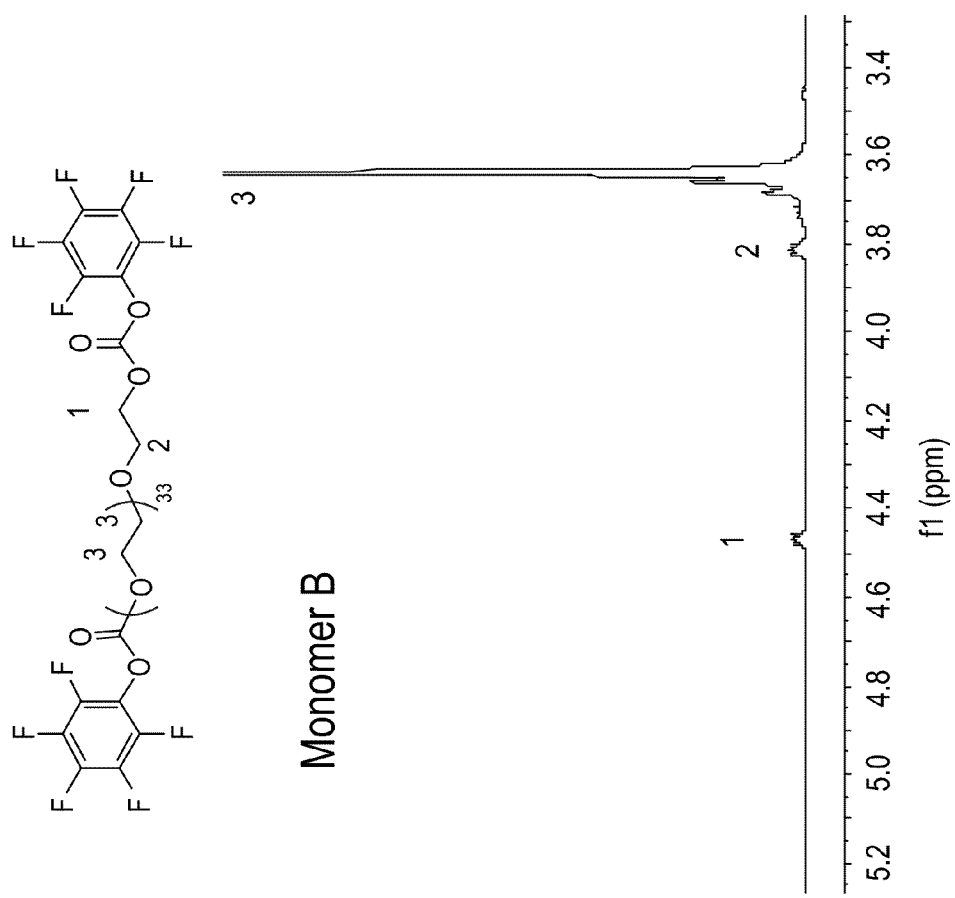
FIG. 2 is a $^1$H NMR spectrum of Monomer B prepared from PEG (Mn=1,500 Da).

PFC (4.1 g, 8.3 mmol, 2.5 equiv.) and PROTON-SPONGE (0.36 g, 1.7 mmol, 0.50 equiv.) were dissolved in THF (40 mL) and stirred for 30 min. A solution of PEG (5.0 g, 3.3 mmol, Mn=1,500 Da) dissolved in THF (10.0 mL) was added dropwise to the reaction mixture, and the solution was stirred at room temperature for 8 hours. The reaction mixture was concentrated and the residue was dissolved in methylene chloride. Much of the pentafluorophenol byproduct precipitated from methylene chloride and was removed. The filtrate was treated with cold diethyl ether, precipitating $C_6F_5O$-COO-PEG-OCO-$OC_6F_5$ (Monomer B) as a white crystalline powder (6.0 g, 86% yield, by GPC, $M_n$=2400 g $mol^{-1}$, PDI=1.05). The structure was confirmed by $^1H$ NMR (FIG. 2), $^{13}C$ NMR, and $^{19}F$ NMR spectroscopy. $^1H$ NMR ($CDCl_3$, 400 MHz): delta=4.47 (t, $OCOOCH_2$, 2H), 3.81 (t, $OCOOCH_2CH_2$, 2H), 3.64 (m, $OCH_2$, 64H). $^{13}C$ NMR ($CDCl_3$, 400 MHz): delta=151.0 (OCOO), 142.0, 140.0, 139.0, 136.0 ($C_{Ar}$), 70.5 ($OCH_2$), 69.5 ($OCOOCH_2$), 68.5 ($OCOOCH_2$). $^{19}F$ NMR ($CDCl_3$ 400 MHz): delta-153 (d, Ar-F, 2F), -158 (t, Ar-F, 2F), -162 (q, Ar-F, 1F).

Preparation of polyurethane nanoparticles by interfacial polymerization

Example 3

Preparation of PU-1

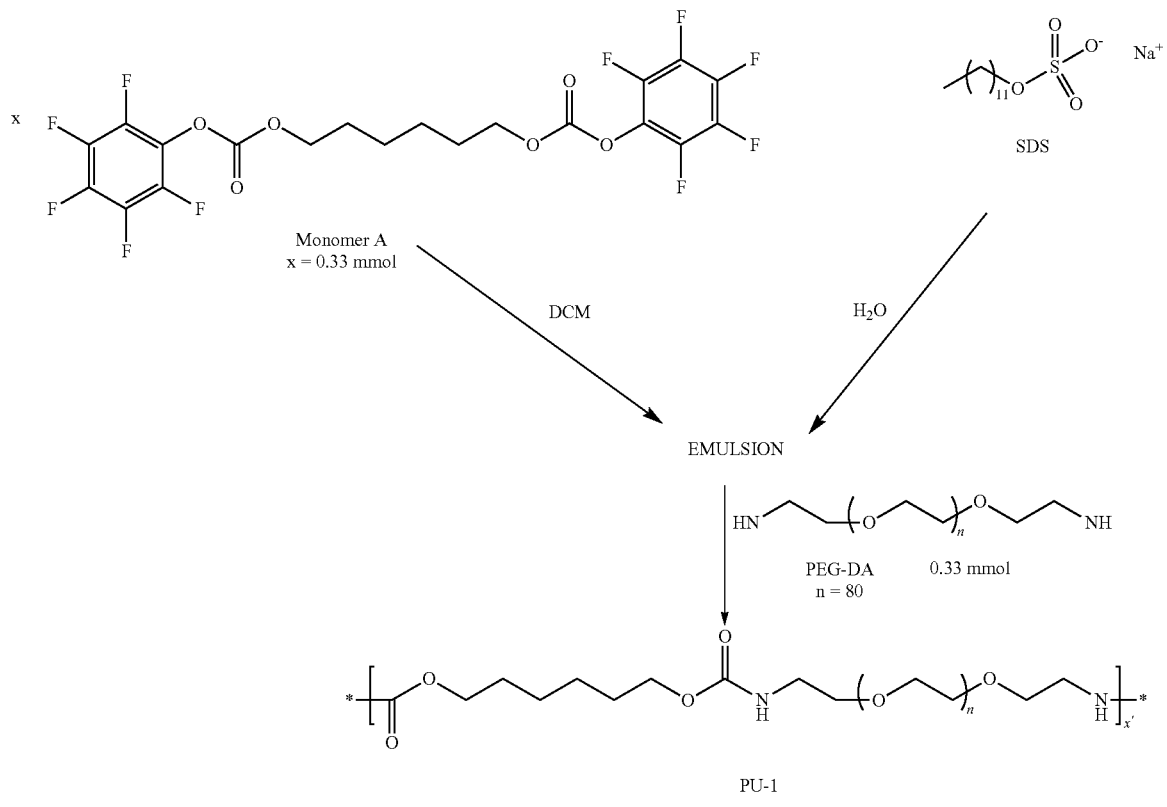

The quantity x refers to millimoles of Monomer A. The quantity x' refers to the average number of the bracketed repeat unit in the product polyurethane. The end groups are not shown in the above structure of PU-1. Each polymer chain of PU-1 can terminate with a primary amine group (*—$NH_2$), a pentafluorophenyl carbonate group, or a hydroxyl group (*—OH) formed by hydrolysis of the pentafluorophenyl carbonate group. The end groups can be present in combination.

The interfacial polymerization process to form polyurethane PU-1 using Monomer A was carried out in two steps.

A) Generation of a stable emulsion in water by sonication. Monomer A (0.17 g, 0.33 mmol, 1 equiv.) was dissolved in methylene chloride (DCM, 7 mL) to form an organic phase. The surfactant, sodium dodecyl sulphate (SDS, 0.17 g) was dissolved in distilled water (35 mL) to form an aqueous phase (pH=8.6). Both phases were mixed vigorously using a sonicator to form a stable emulsion.

Figure 3:
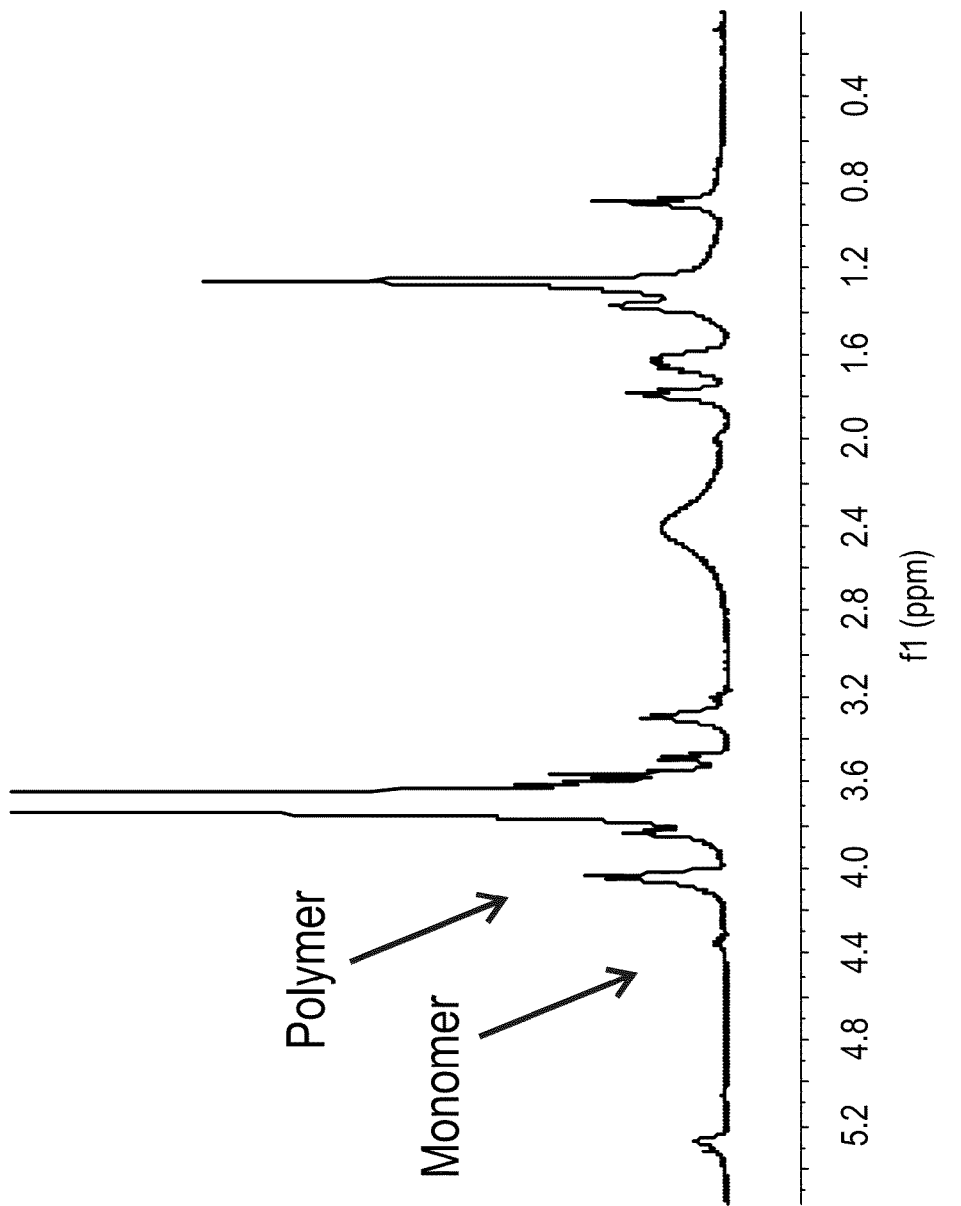
FIG. 3 is a pair of $^1$H NMR spectra of the reaction mixture before and after formation of polyurethane PU-1 (Example 3).
Figure 4:
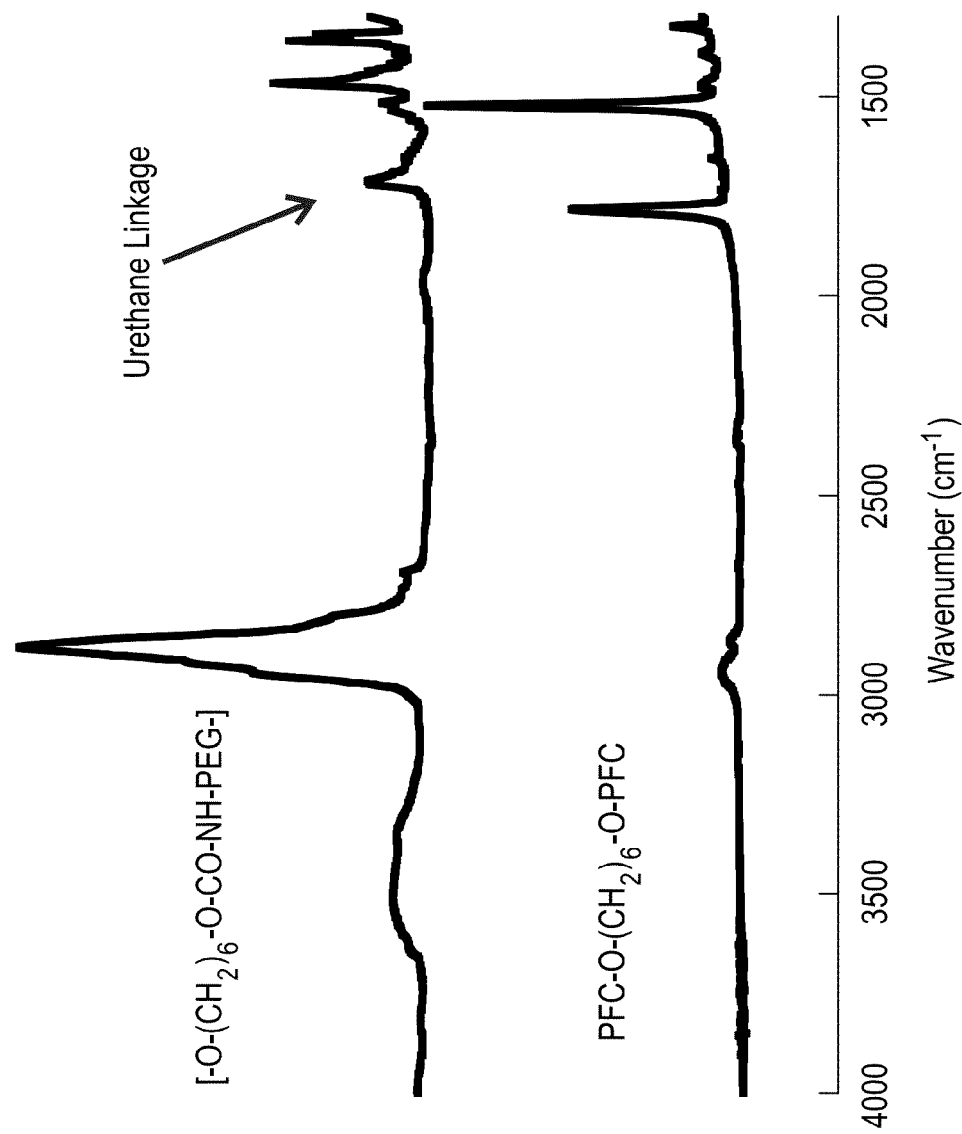
FIG. 4 is a pair of overlapping FTIR spectra of the reaction mixture before and after formation of polyurethane PU-1 (Example 3).

B) Polymerization. PEG-DA (Mn=3600, 1.188 g, 0.33 mmol, 1 equiv., DP=80) was dissolved in distilled water (20 mL) and was added dropwise at 20 ml/hour to the emulsion formed in part A). Upon completion of the addition, the reaction mixture was stirred at room temperature about 6 hours. The reaction conversion was followed by $^1$H-NMR as shown in the graph of FIG. 3. The characteristic signal of the activated carbonate end units at delta=4.45 disappears completely and a new signal attributed to the methylene group linked to the O—CO—NH appears at delta=4.2 ppm. The reaction was also confirmed using Fourier transform infrared spectroscopy (FTIR) by the appearance of a new band attributed to the urethane bond at 1720 $cm^{-1}$ and the dissipation of the band attributed to carbonate groups at 1750 $cm^{-1}$ (FIG. 4). The reaction mixture was transferred to a dialysis membrane having a molecular weight cut off (MWCO) of 2 kDa. The mixture was dialyzed against deionized water for 48 hours at room temperature, replacing the water periodically at least 3 times per day. Finally, the resulting mixture was filtered, and the product containing filtrate was frozen using liquid nitrogen for 15 minutes, and frozen filtrate was lyophilized by a freeze-dryer to obtain isolated product.

Figure 5:
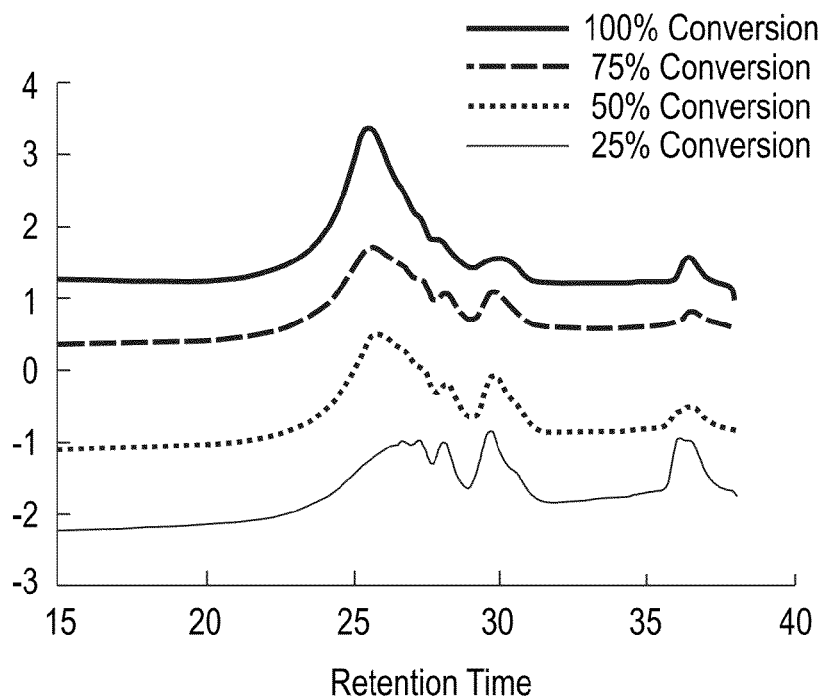
FIG. 5 is a series of GPC traces at different % conversion in the polymerization to form PU-1 (Example 3). High molecular weight polymer was formed in the initial stages of the reaction.

The molecular weight was determined as a function of the conversion. As seen in FIG. 5 (graph), the interfacial polymerization produced high molecular weight polyurethane in the initial stages of the polymerization and the maximum peaks were the same even at low conversions. For PU-1, Mn=45000, PDI=1.6, and x'=12.5.

Figure 6:
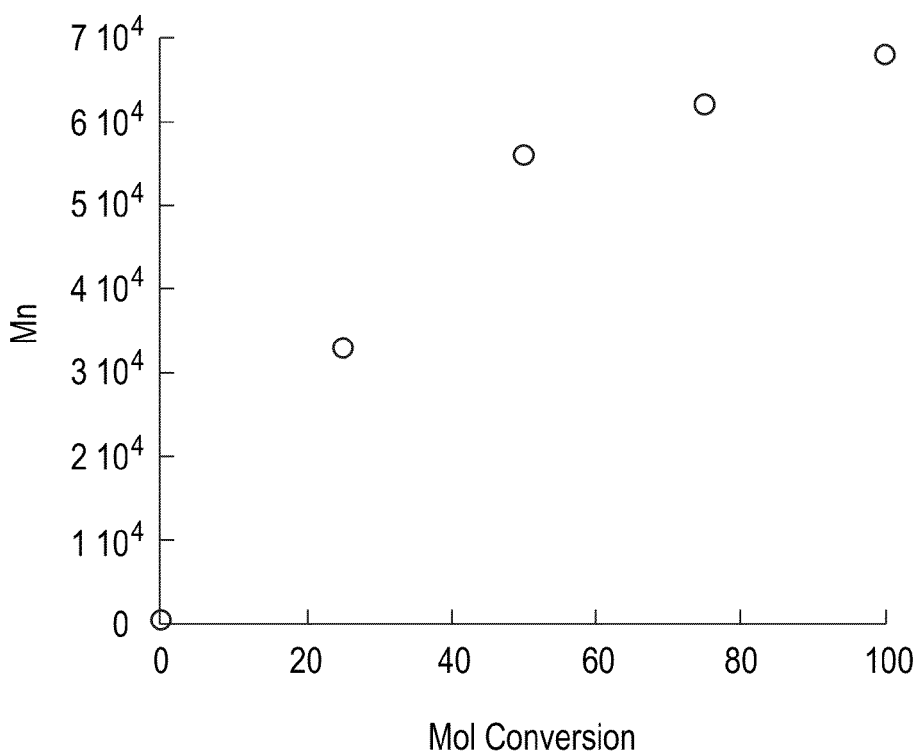
FIG. 6 is a graph depicting number average molecular weight (Mn) as a function of monomer conversion in the polymerization to form PU-1.

It was not necessary to maintain equal molarity of reactants in order to obtain high molecular weight product. Above 50% conversion, the change in average molecular weight with percent conversion was less pronounced compared to the initial stages of the polymerization (FIG. 6). That is, rapid chain growth occurs in the initial stages followed by significantly slower chain growth above about Mn 45000.

Figure 7:
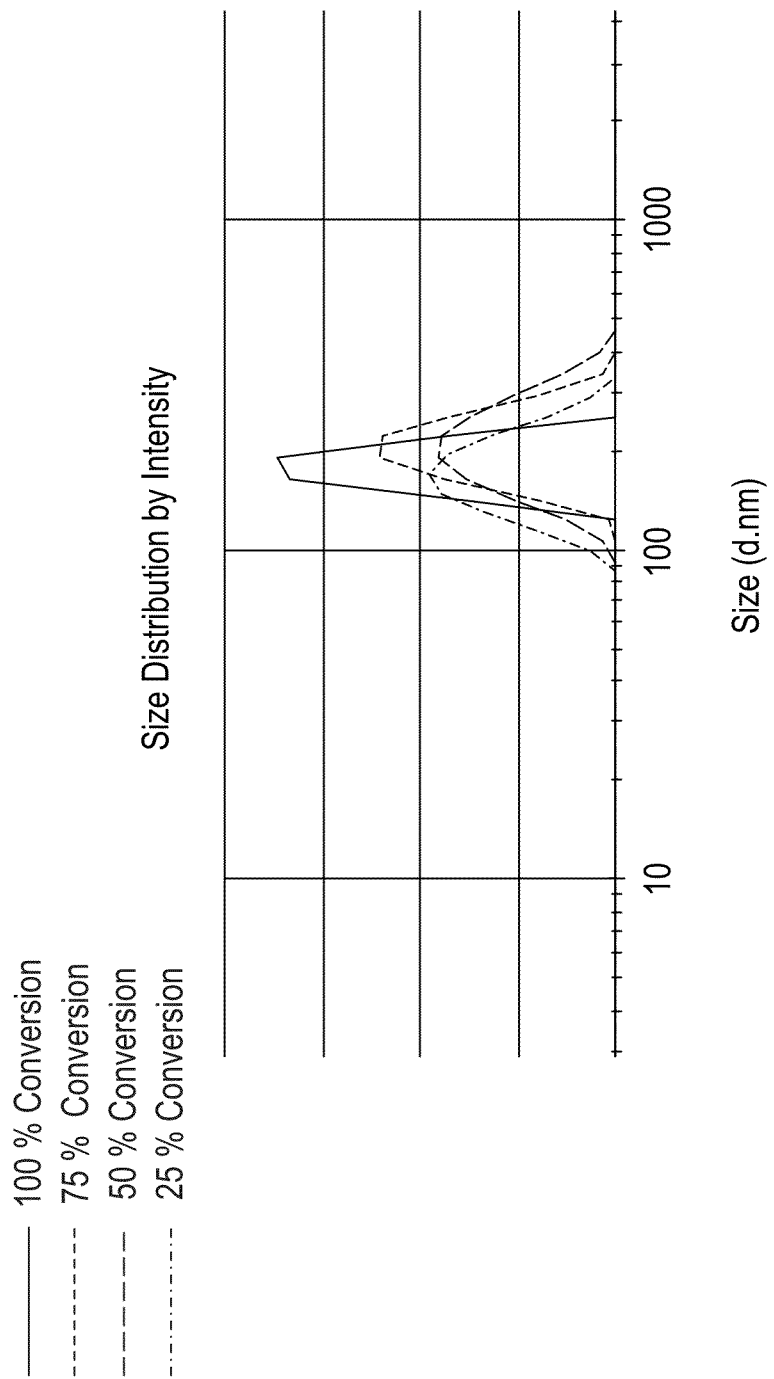
FIG. 7 is a graph showing the evolution of the particle size distribution as a function of conversion in the polymerization to form PU-1. The particle size also remains relatively constant from 25% conversion to 100% conversion.

The stability of the synthesized nanoparticles was measured by dynamic light scattering (DLS). As seen in FIG. 7 (graph) the particle size also remains relatively constant as the reaction progresses from 25% conversion to 100% conversion in the emulsion (organic solvent and water present). The particle size value for the final dispersion in water is 450 nm with a polydispersity index (PDI) of 0.21.

Examples 4 to 6

Using the interfacial procedure of Example 1, polyurethanes were synthesized by varying the Monomer A/Monomer B ratio, where the total moles of Monomer A (formed from HD) and Monomer B (formed from PEG) was 0.33 mmol.

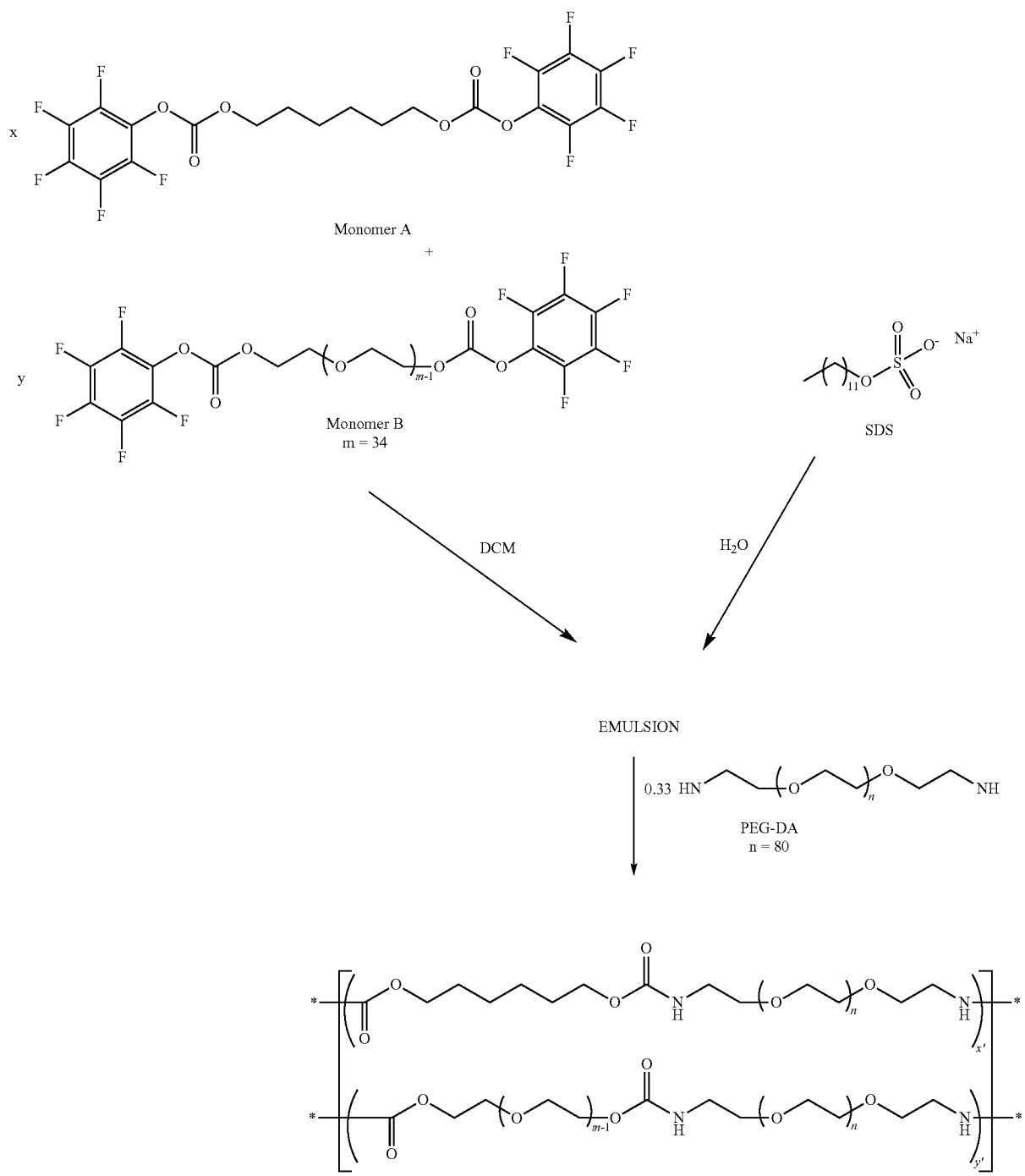

The quantities x and y in the above diagram refer to millimoles of each starting material. The quantities x' and y' represent the average number of the repeat unit in parentheses in the resulting products, and are summarized in Table 3 below.

The end groups are not shown in the above structure. The end groups can have a primary amine terminus as in the structures:

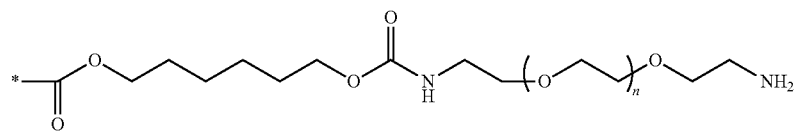

and

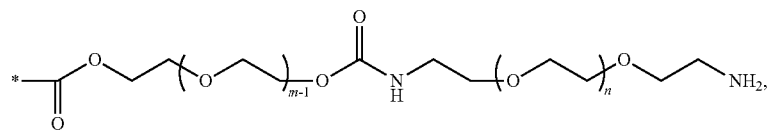

where the starred bond of the carbonyl is linked to the polyurethane backbone. The end groups can have a hydroxy terminus as in the structures:

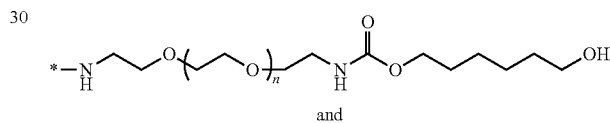

and

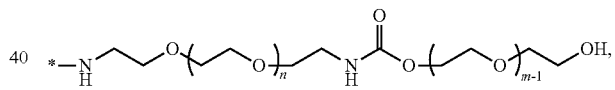

where the starred bond of the nitrogen is linked to the polyurethane backbone. The end groups can have a pentafluorophenyl carbonate terminus as in the structures:

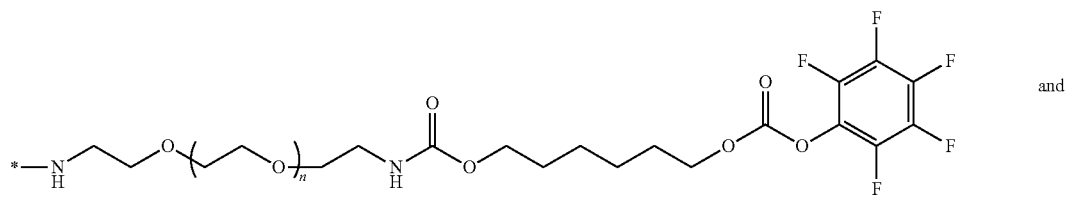

and

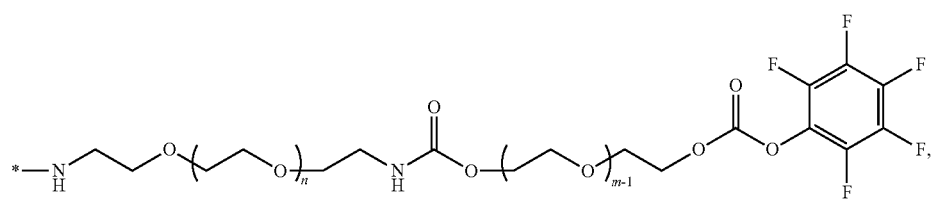

where the starred bond of the nitrogen is linked to the polyurethane backbone. The foregoing end groups can be present in combination.

Example 7

Formation of PU-5 Using the Interfacial Procedure

I at 1720 cm$^{-1}$, and amide II at 1550 cm$^{-1}$), confirming the successful formation of urethane linkages.

Figure 10:
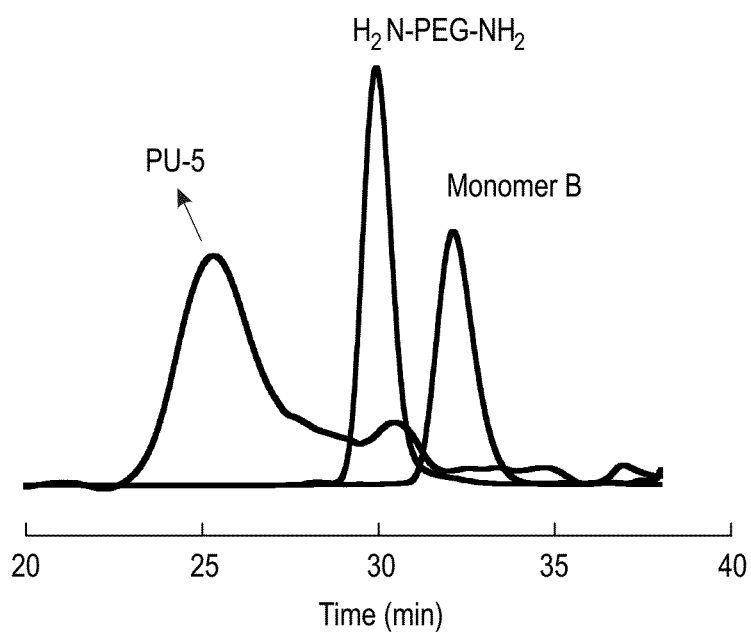
FIG. 10 is a series of gel permeation chromatography (GPC) traces of PU-5, PEG-DA, and Monomer B.

The polymerization of the PEG-DA was also confirmed by the increase in the number average molecular weight (Mn) from 3,600 to 79,000 (FIG. 10, gel permeation chromatography (GPC) analysis). The data in FIG. 10 show a comparison between the GPC traces of PU-5, PEG-DA, and Monomer B.

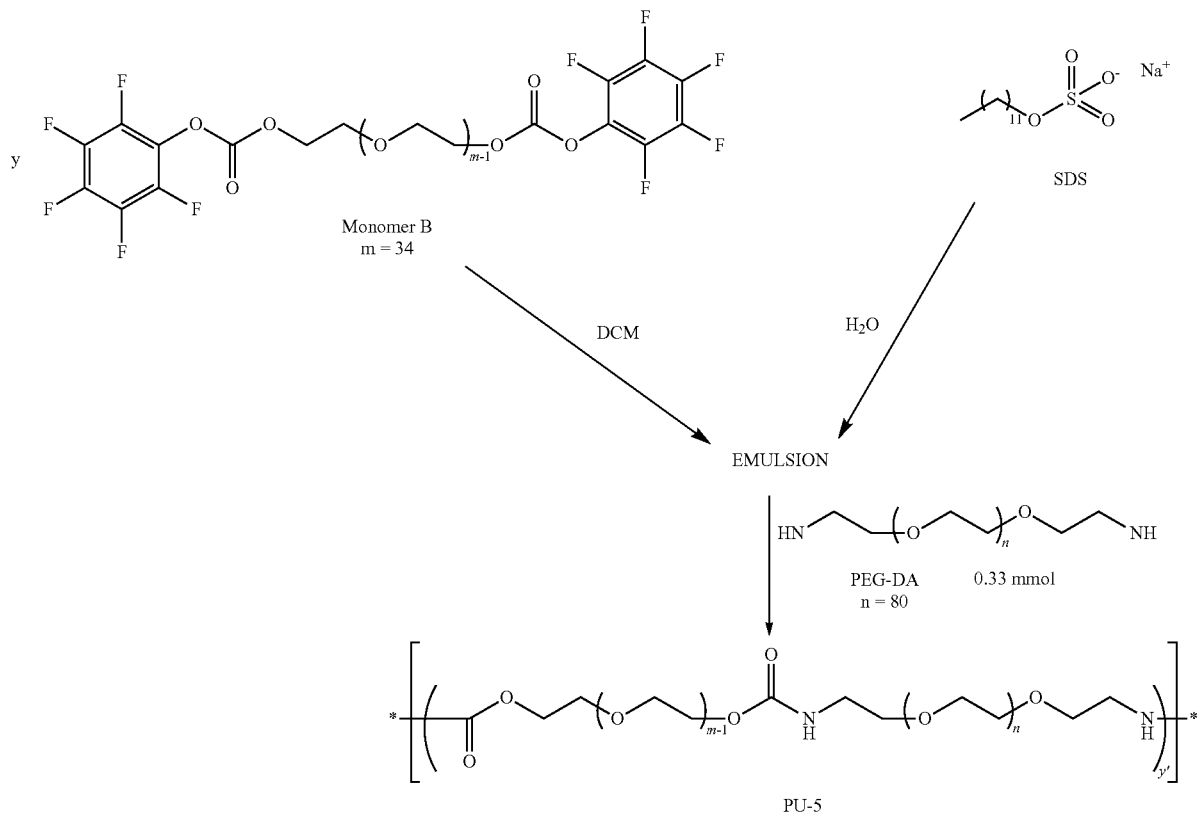

Figure 8:
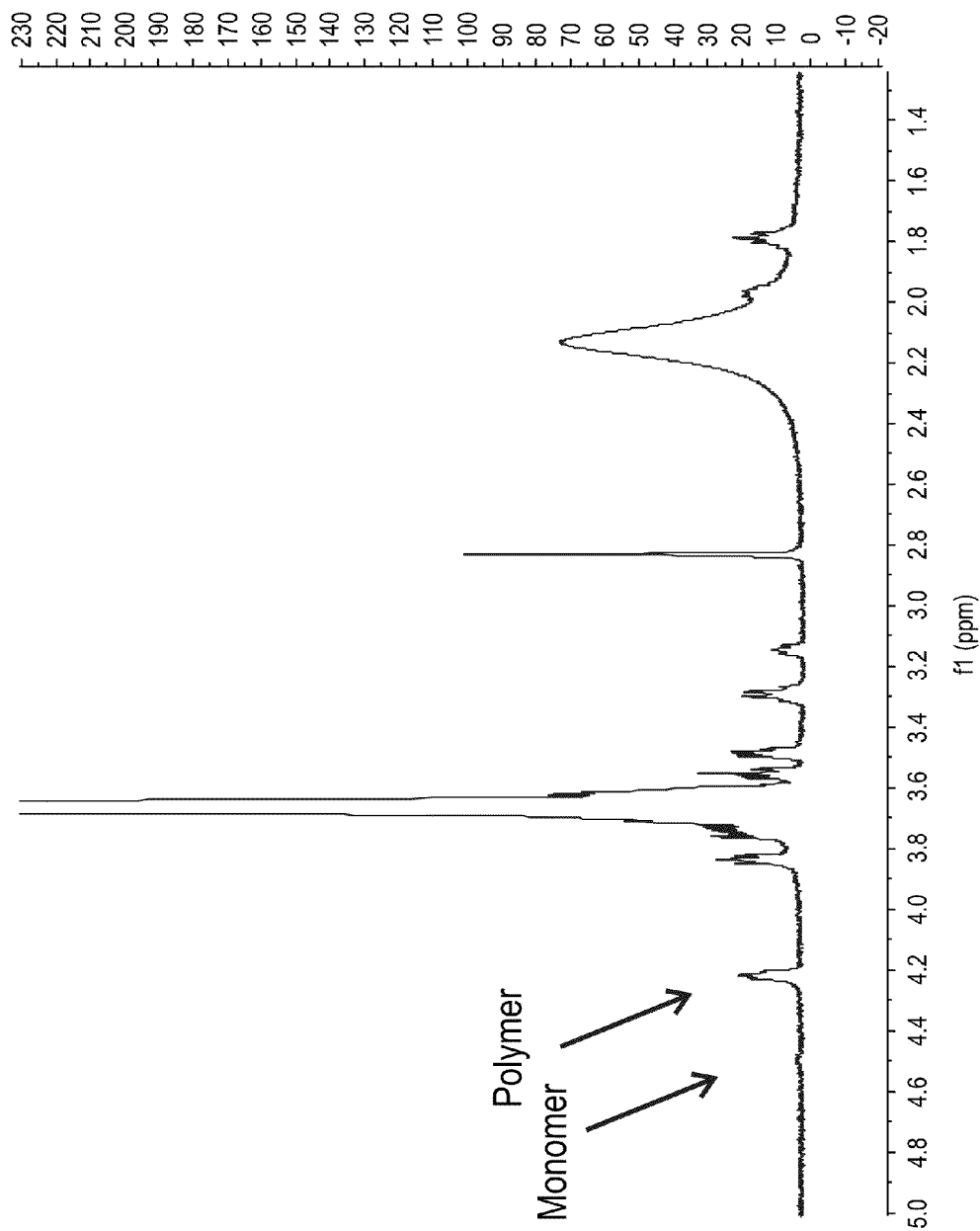
FIG. 8 is $^1$H NMR spectrum of the reaction to form PU-5 at 98% conversion.

PU-5 was formed using the interfacial procedure of Example 1, substituting Monomer A with Monomer B. The formation of polyurethane was confirmed by $^1$H NMR. As in Example 3 (PU-1), the characteristic signals of the activated carbonates disappeared and a new signal for the methylene protons linked to the urethane functionality appeared. FIG. 8 is a $^1$H NMR spectrum of the reaction to form PU-5 at 98% conversion.

Figure 9:
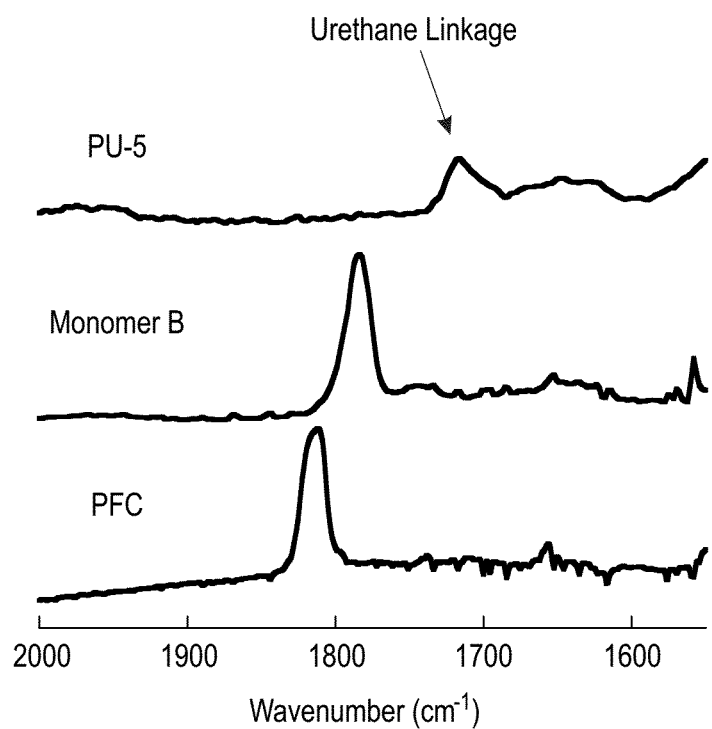
FIG. 9 is a series of Fourier transform infra-red (FTIR) spectra of PFC, Monomer B, and PU-5.

The polymerization process was also monitored by FTIR. The infrared spectra shown in FIG. 9 correspond to Monomer B and PU-5. As the reaction proceeds, there is an intensity decrease and a complete disappearance of the carbonate (C=O) stretch at 1760 cm$^{-1}$. Two new bands appear (amide High molecular weight polyurethanes were synthesized via the activated carbonate route when either a small molecule monomer (Monomer A) or a macromolecular monomer (Monomer B) was exclusively copolymerized with PEG-DA (Examples 3 and 7, respectively). These molecular weights are significantly higher than those obtained through different aqueous-phase methods.

Table 3 summarizes the polyurethane reactants and products of Examples 3 to 7, including x, y, x' and y' in the above reaction schemes. The interfacial method produces high molecular weight polyurethanes that are free of urea byproducts. The number average molecular weight, Mn, and polydispersity index (PDI) of polyurethanes PU-1 to PU-5 are also listed.

TABLE 3

| Example | Name | Monomer A (mmol) x | Monomer B (mmol) y | PEG-DA (mmol) | Monomer A (equiv.) | Monomer B (equiv.) | PEG-DA (equiv.) | x' | y' | Mn (kDa) | PDI |
|---|---|---|---|---|---|---|---|---|---|---|---|
| 3 | PU-1 | 0.33 | 0 | 0.33 | 1.00 | 0 | 1.00 | 12.5 | 0 | 45 | 1.6 |
| 4 | PU-2 | 0.25 | 0.08 | 0.33 | 0.75 | 0.25 | 1.00 | 9 | 4.5 | 53 | 1.4 |
| 5 | PU-3 | 0.17 | 0.17 | 0.33 | 0.50 | 0.50 | 1.00 | 7 | 7 | 58 | 1.9 |
| 6 | PU-4 | 0.08 | 0.25 | 0.33 | 0.25 | 0.75 | 1.00 | 5 | 10 | 64 | 1.3 |
| 7 | PU-5 | 0 | 0.33 | 0.33 | 0.00 | 1.00 | 1.00 | 0 | 21 | 79 | 1.6 |

Examples 3 to 7 have a number average molecular weight in a range of 45000 to 79000, and a polydispersity index (PDI) in a range of 1.3 to 1.9.

Example 8

Comparative

Attempted formation of polyurethane using the interfacial procedure with a diisocyanate.

Figure 11:
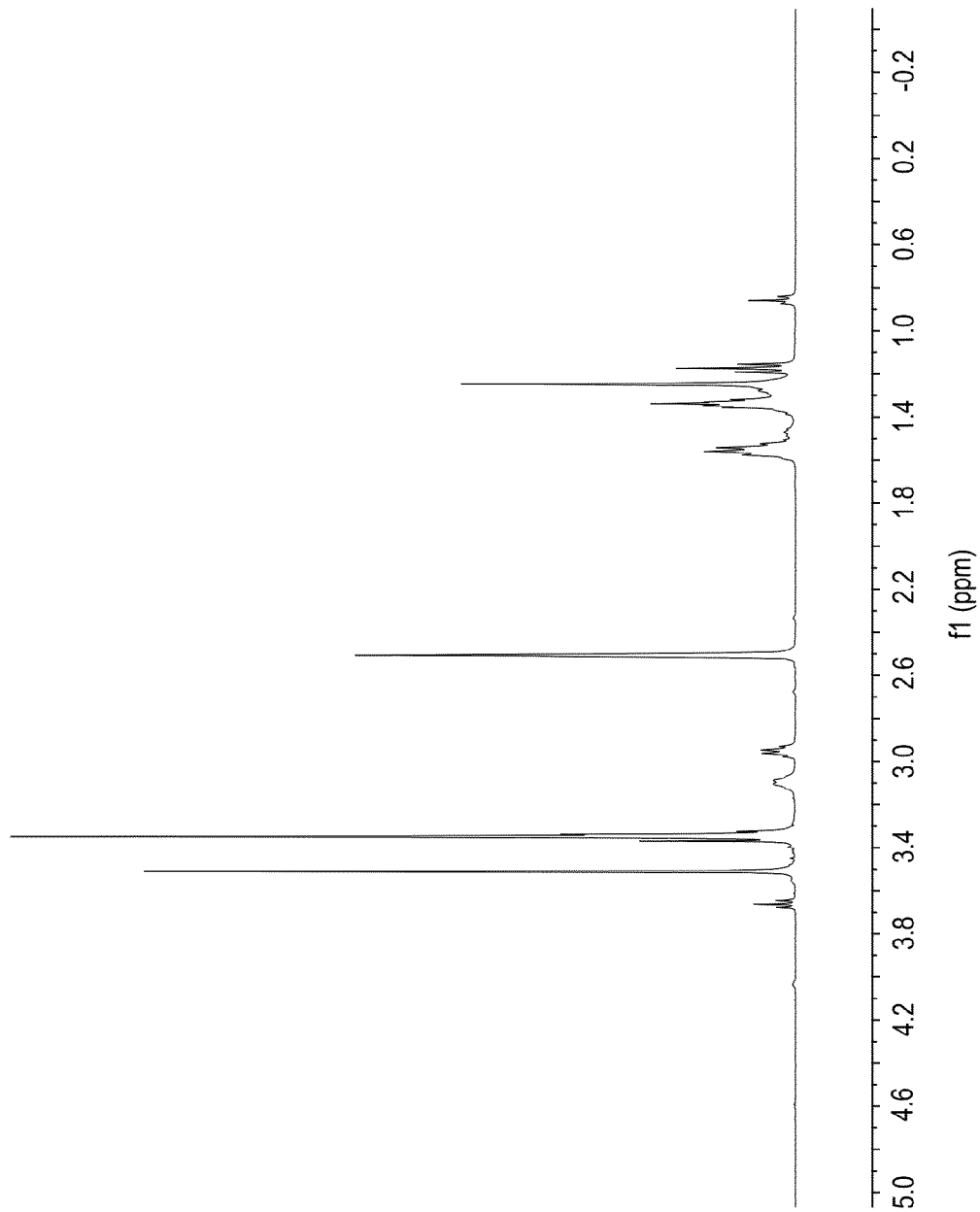
FIG. 11 is a $^1$H NMR spectrum of the reaction to form polyurethane by interfacial polymerization of an hexane diisocyanate (Example 8, comparative). Urethane linkages were almost negligible.
Figure 12:
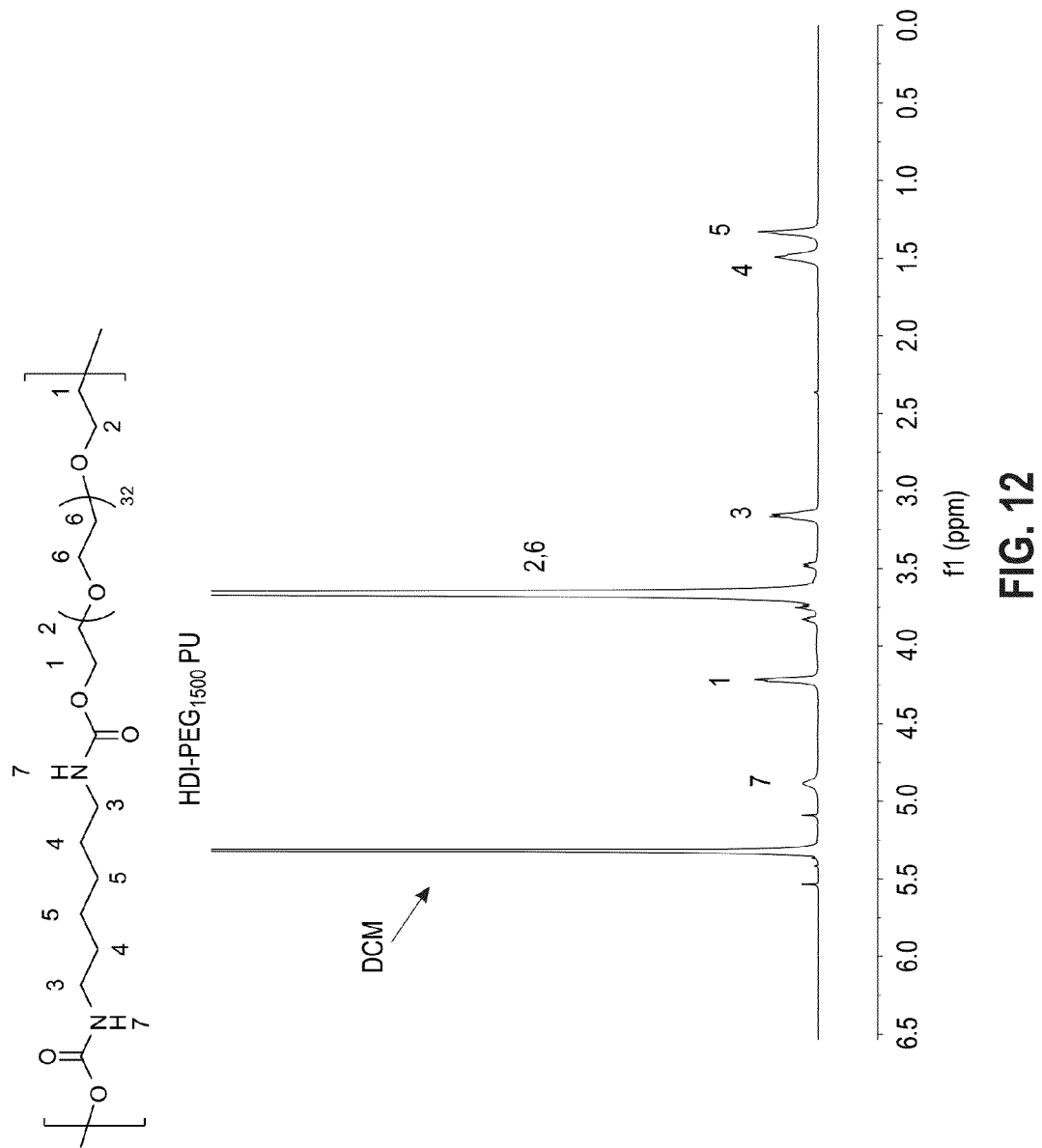
FIG. 12 is a $^1$H NMR spectrum of the reaction to form polyurethane by solution polymerization of hexane diisocyanate (Example 8, comparative). Urethane linkages were almost negligible.

B) Polymerization. Poly(ethylene glycol) (PEG) (Mn=1500, 1.8 g, 1.19 mmol, 1 equiv., DP=34) was dissolved in distilled water (20 mL) and was added dropwise at 20 ml/hour to the emulsion formed in part A). As observed by $^1$H NMR (FIG. 11) and FTIR the formation of urethane linkages was almost negligible (i.e., x'~0 in the above diagram). Predominantly, urea groups were formed due to the side reactions between isocyanate groups and water. For comparison, FIG. 12 is a $^1$H NMR spectrum of the polyurethane formed by HDI with PEG in a solution polymerization performed with an organic solvent.

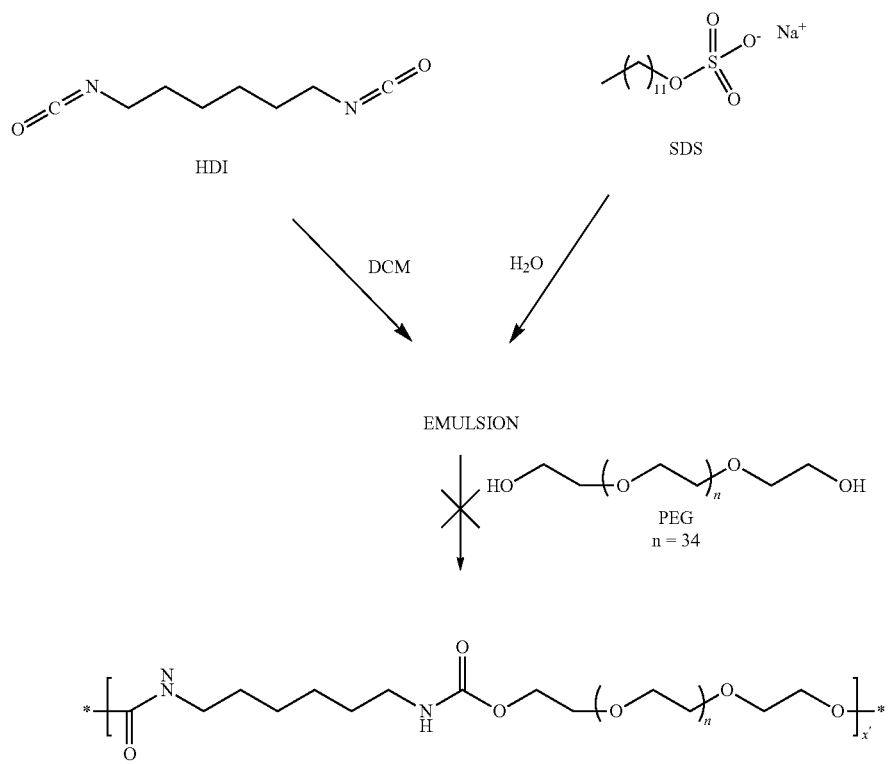

A) A stable emulsion in water was generated as follows. Hexamethylene diisocyanate (HDI) (0.2 g, 1.19 mmol, 1 equiv.) was dissolved in methylene chloride (DCM, 7 mL) to form an organic phase. In another vessel, the surfactant sodium dodecyl sulphate (SDS, 0.2 g) was dissolved in distilled water (35 mL) to form an aqueous phase. Both phases were mixed vigorously using a sonicator to form a stable emulsion.

Particle Size Analysis

The particle size of Examples 3-7 was evaluated by dynamic light scattering (DLS). The dichloromethane was removed from the obtained dispersions and the particle size was measured as the average circular diameter. Table 4 lists the average particle size and the particle size dispersity of PU-1 to PU-5.

TABLE 4

| Example | Name | Monomer A (mmol) x | Monomer B (mmol) y | PEG-DA (mmol) | Monomer A (equiv.) | Monomer B (equiv.) | PEG-DA (equiv.) | x' | y' | Particle size (nm) | Size PDI |
|---|---|---|---|---|---|---|---|---|---|---|---|
| 3 | PU-1 | 0.33 | 0 | 0.33 | 1.00 | 0 | 1.00 | 12.5 | 0 | 450 | 0.21 |
| 4 | PU-2 | 0.25 | 0.08 | 0.33 | 0.75 | 0.25 | 1.00 | 9 | 4.5 | 350 | 0.22 |
| 5 | PU-3 | 0.17 | 0.17 | 0.33 | 0.50 | 0.50 | 1.00 | 7 | 7 | 200 | 0.13 |

TABLE 4-continued

| Example | Name | Monomer A (mmol) x | Monomer B (mmol) y | PEG-DA (mmol) | Monomer A (equiv.) | Monomer B (equiv.) | PEG-DA (equiv.) | x' | y' | Particle size (nm) | Size PDI |
|---|---|---|---|---|---|---|---|---|---|---|---|
| 6 | PU-4 | 0.08 | 0.25 | 0.33 | 0.25 | 0.75 | 1.00 | 5 | 10 | 80 | 0.45 |
| 7 | PU-5 | 0 | 0.33 | 0.33 | 0.00 | 1.00 | 1.00 | 0 | 21 | 4 | 0.79 |

Examples 3 to 7 have a particle size in a range of 4 nm to 450 nm and a particle size dispersity in a range of 0.13 to 0.79. As noted above (Table 3), high molecular weight polymer was obtained for each particle size (Mn≥45000). Unexpectedly, Mn increased inversely with particle size in this series. The highest Mn (79000) was obtained for PU-5 having the smallest particle size (4 nm).

Figure 13:
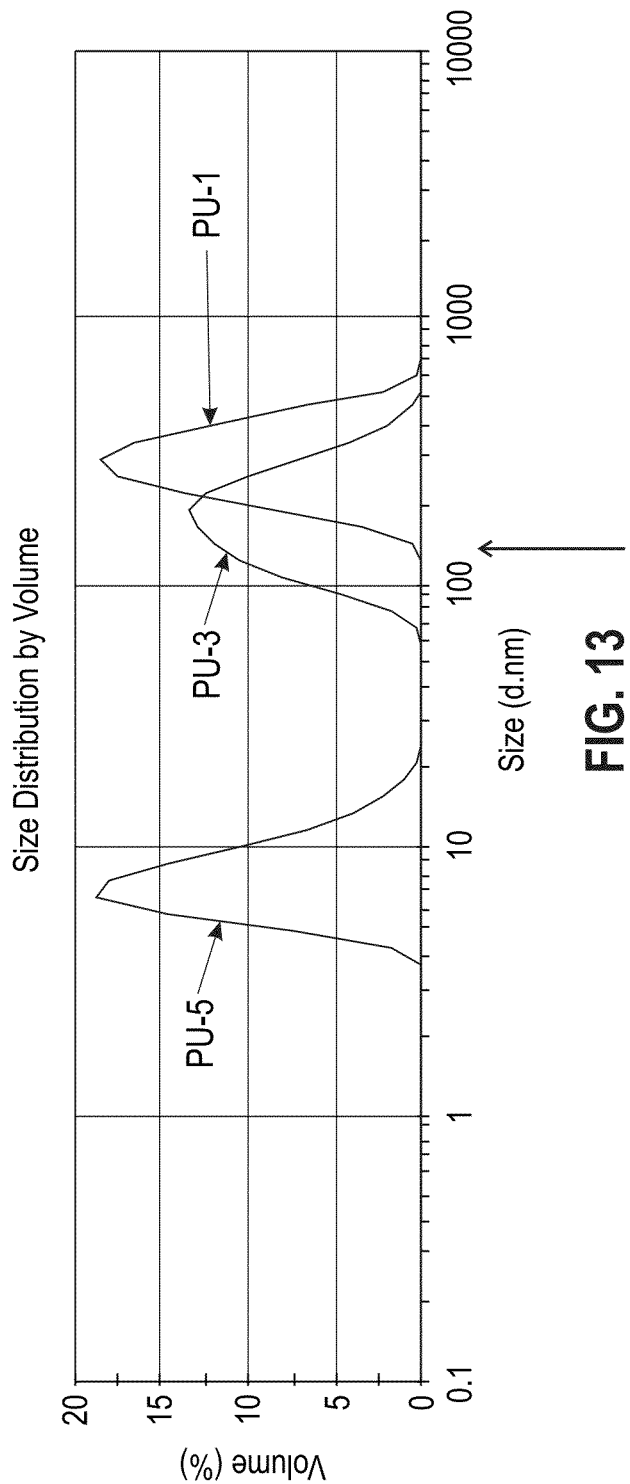
FIG. 13 is a graph showing the particle size distribution of PU-1, PU-3 and PU-5 by dynamic light scattering.

As shown in FIG. 13, the particle size depends on the polymer composition. As the PEG content was increased, the hydrophilicity of the system increased, permitting controlled formation of particles in a size range of about 4 nm to about 450 nm in water containing no organic solvent. This is attractive for biomedical applications requiring different particle sizes.

Preparation of Nanogels by Interfacial Polymerization

Example 9

Preparation of nanogel NG-1

The polymerization process to form a polyurethane nanogel was carried in two steps as shown below, where y' and z' in the nanogel represent millimoles (mmoles) of PEG-DA and TAEA, respectively, used in the feed. The amount of Monomer A in the feed was 0.33 mmoles.

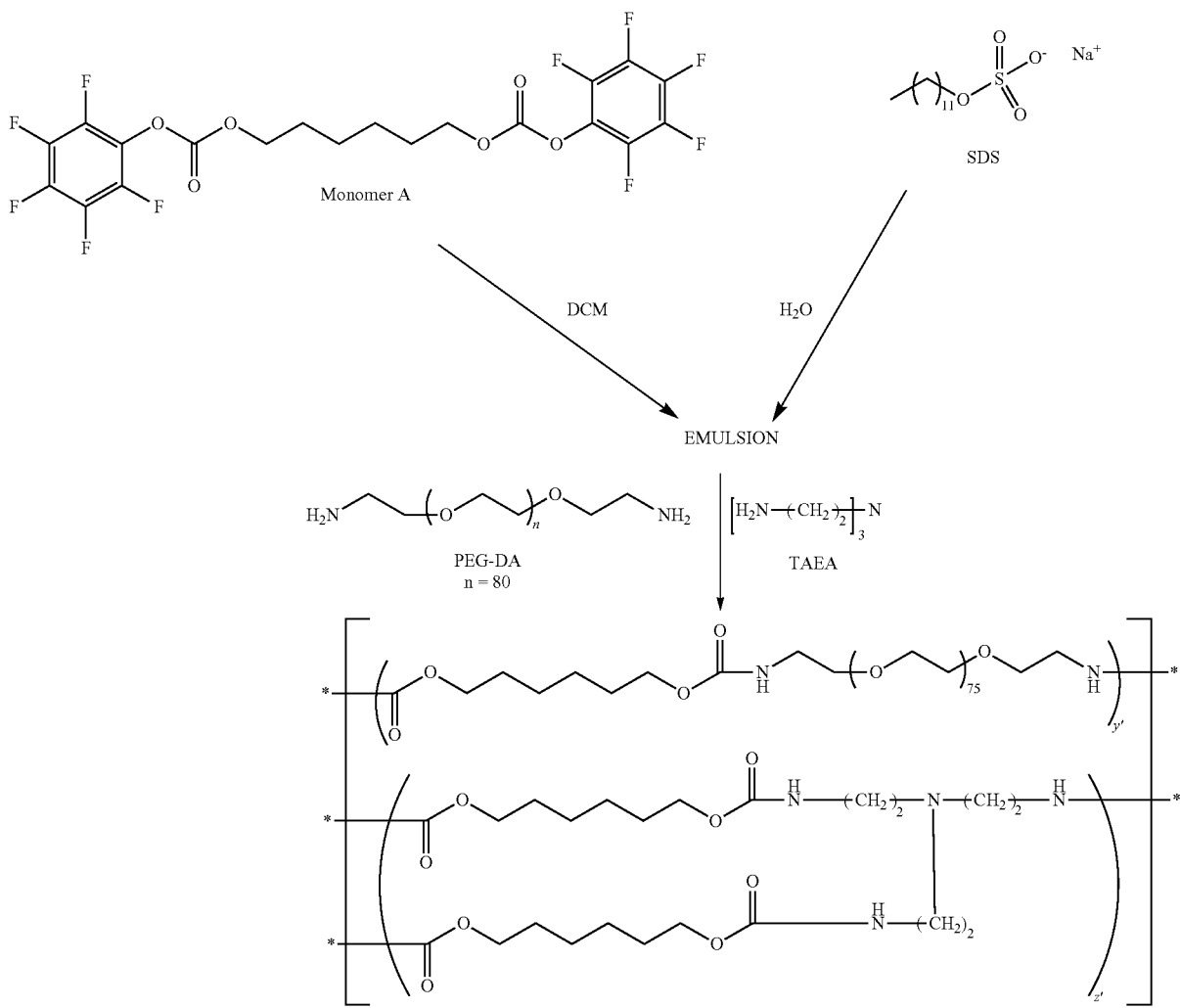

NG-1

It should be understood from the above notation that the starred bonds of the nitrogens of PEG-DA and TAEA are linked to respective carbonyl groups of the Monomer A fragment and not to another amine nitrogen. End groups of NG-1 are not shown. The chain termini of NG-1 can be a primary amine group (*—NH$_2$), hydroxyl group (*—OH), pentafluorophenyl carbonate group, or a combination of the foregoing groups.

A) A stable emulsion in water was prepared as follows. Monomer A (0.17 g, 0.33 mmol) was dissolved in 7 mL of methylene chloride to form an organic phase. SDS (0.06 g) was dissolved in 35 mL of distilled water to form an aqueous phase. Both phases were mixed vigorously using a sonicator cup to form a stable emulsion.

B) Polymerization process. PEG-DA (0.95 g, 0.26 mmol, 0.8 equiv., Mn=3,600) together with the trifunctional tris(2-aminoethyl) amine (TAEA, 0.0073 g, 0.050 mmol, 0.15 equiv.) were dissolved in 20 mL of distilled water and added dropwise at 20 ml/hour to the emulsion. The reaction was carried out at room temperature and was complete in about 6 hours. The molar feed ratio y'/z' of PEG-DA/TAEA was 0.8/0.15=5.3.

Figure 14A:
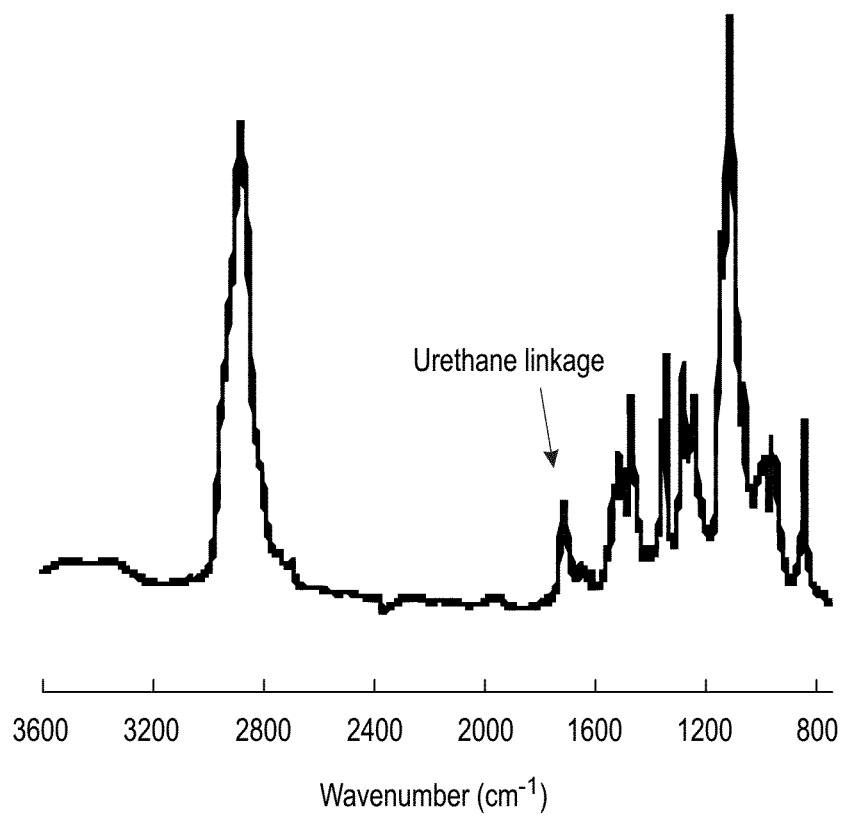
FIG. 14A is an FTIR spectrum of the synthesized polyurethane nanogel NG-1 (Example 9).
Figure 14B:
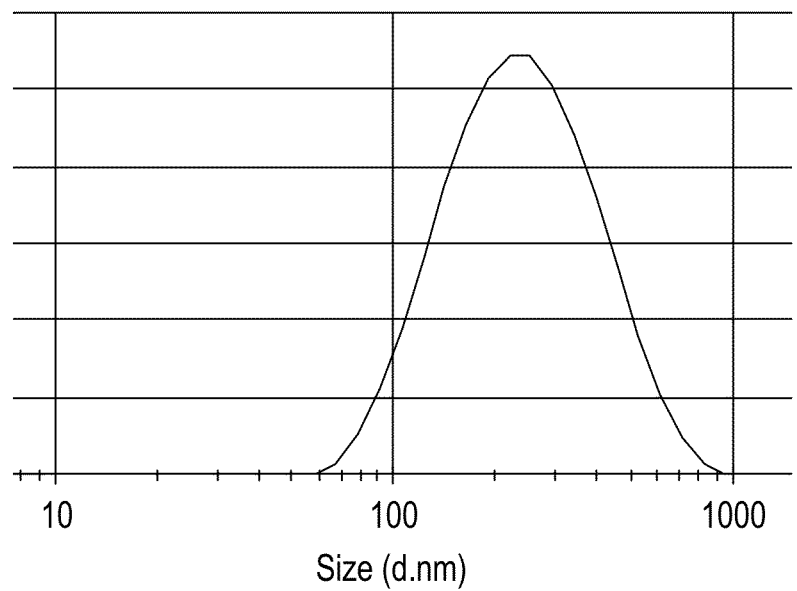
FIG. 14B is a graph showing the particle size distribution of the final NG-1 dispersion (Example 9).

As can be observed in the FTIR spectrum of FIG. 14A, at the initial stage before reacting with the diamine the activated carbonate appears at 1750 cm$^{-1}$. After the end of the reaction, the band attributed to the carbonate groups has completely disappeared and a new band attributed to the urethane groups appears at 1720 cm$^{-1}$, confirming the polymerization reaction. The final particle size of was 189 nm with a PDI of 0.25 (FIG. 14B).

Incorporation of Functionality into Polyurethane Particles

Scheme 5 below shows a synthetic path for obtaining pentafluorophenyl carbonate end-capped monomers containing pendant protected carboxylic acid groups. The polymerized polyurethanes formed with these monomers are potentially useful for drug delivery.

Scheme 5.

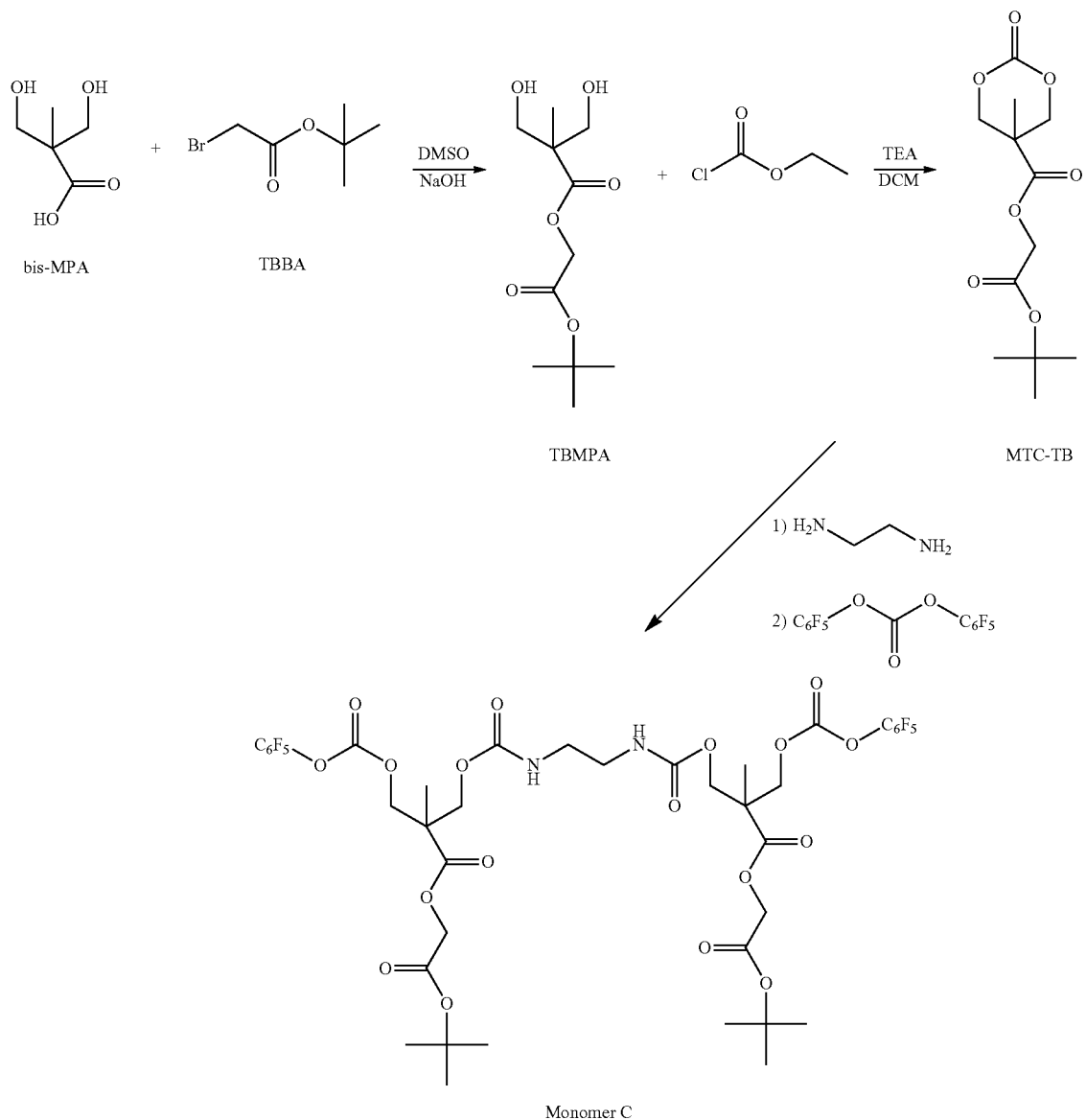

Monomer C

Example 10

Preparation of Monomer C

Monomer C was prepared in three steps as follows.

A) In the first step 2,2-bis(methylol) propionic acid (bis-MPA) was modified with tert-butyl bromoacetate (TBBA) to form the protected acid TBMPA in the presence of NaOH. In a typical modification procedure, bis-MPA (10 g, 74.6 mmol, 1 equiv.) and NaOH (2.98 g, 74.6 mmol, 1 equiv.) were placed in DMSO (50 mL) at 80° C. and stirred for 24 hours prior to the drop-wise addition of a solution of tert-butyl bromoacetate (14.25 g, 73.1 mmol, 0.98 equiv.) dissolved in DMSO (10 mL). The reaction was stirred at 80° C. for about 8 hours, at which time the reaction was diluted 10-fold with water and the product was extracted with diethyl ether. The product solution containing TBMPA was rinsed with saturated $NaHCO_3$, dried over $MgSO_4$, and concentrated. Yellow liquid was obtained (17 g, 69% yield). The 1H NMR spectrum of TBMPA was consistent with published data.

Figure 15:
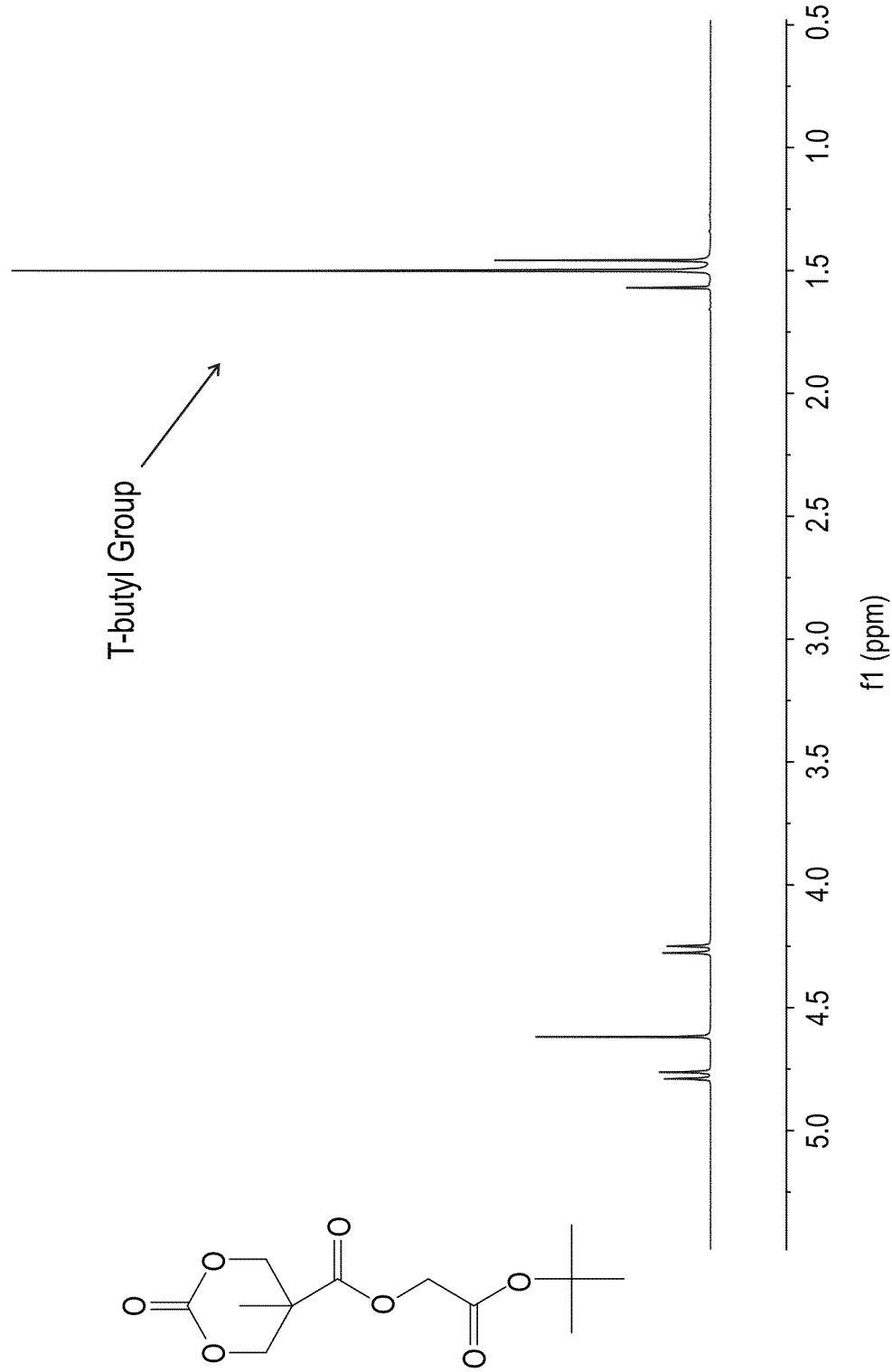
FIG. 15 is a $^1$H NMR spectrum of cyclic carbonate monomer MTC-TB.

B) In the second step, the synthesized diol, TBMPA, was reacted with ethyl chloroformate (ECF) in the presence of triethylamine (TEA) to form the 6-membered cyclic carbonate, MTC-TB. In a typical modification procedure, TBMPA (4 g, 17.1 mmol, 1 equiv.) was dissolved in dry THF (40 mL) and the resulting solution was cooled in an ice bath to 0° C. prior to the addition of ethyl chloroformate (4.43 g, 37.6 mmol, 2.2 equiv.). Subsequently, triethyl amine (TEA) (3.79 g, 37.6 mmol, 2.2 equiv.) was dissolved in dry THF (20 mL) and added drop-wise to the reaction mixture, which was maintained under N2. Upon completion (about 8 hours), the reaction was concentrated and recrystallized in diethyl ether to give cyclic carbonate monomer MTC-TB (2.2 g, yield 50%). FIG. 15 is a $^1H$ NMR spectrum of MTC-TB.

Figure 16:
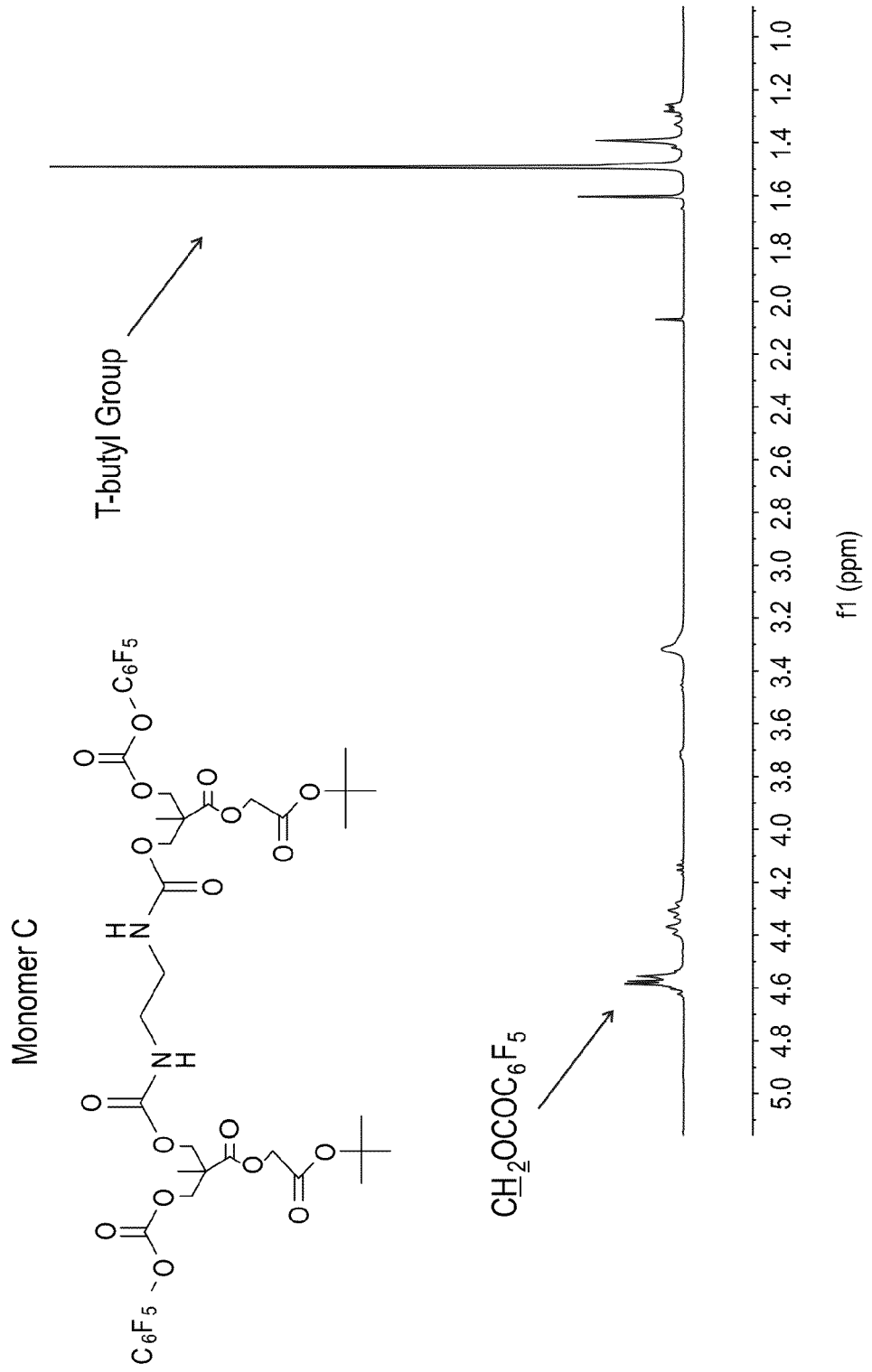
FIG. 16 is $^1$H NMR spectrum of Monomer C.

C) In the third step, the cyclic monomer MTC-TB was ring opened with the ethylene diamine and functionalized with the bis(pentafluorophenyl) carbonate (PFC) in the presence of PROTON SPONGE to form the activated carbonate Monomer C. In a typical modification procedure, MTC-TB (1 g, 0.0036 mmol, 1 equiv.) was dissolved in dry THF (4 mL). The resulting solution was cooled in a ice bath prior to the drop-wise addition of ethylene diamine (0.108 g, 0.0018 mmol, 0.5 equiv.). Upon completion (about 1 hour), bis(pentafluorophenyl) carbonate (1.1 g, 0.0022 mmol, 1.2 equiv.) and PROTON SPONGE (0.12 g, 0.00055 mmol, 0.25 equiv.) were dissolved in dry THF (4 mL), and the resulting solution was added drop-wise to the reaction mixture. The reaction was carried out at 20° C. under nitrogen. Upon completion (about 12 hours), the reaction mixture was concentrated and dissolved in methylene chloride, upon which much of the pentafluorophenol byproduct precipitated and was recovered. The solution containing the product Monomer C was then rinsed with saturated aqueous $NaHCO_3$ followed by water, dried over $Mg_5O_4$, and concentrated. The crude product Monomer C was recrystallized in hexane to afford a viscous liquid (1.2 g, 73% yield). FIG. 16 shows the $^1H$-NMR spectrum of Monomer C. It can be clearly seen that the methylene groups linked to the pentafluorophenyl carbonate are shifted to 4.5 ppm. Moreover, the t-butyl group is not affected by the pentafluorophenyl carbonate modification.

Example 11

Preparation of Acid Functionalized Polyurethane PU-6

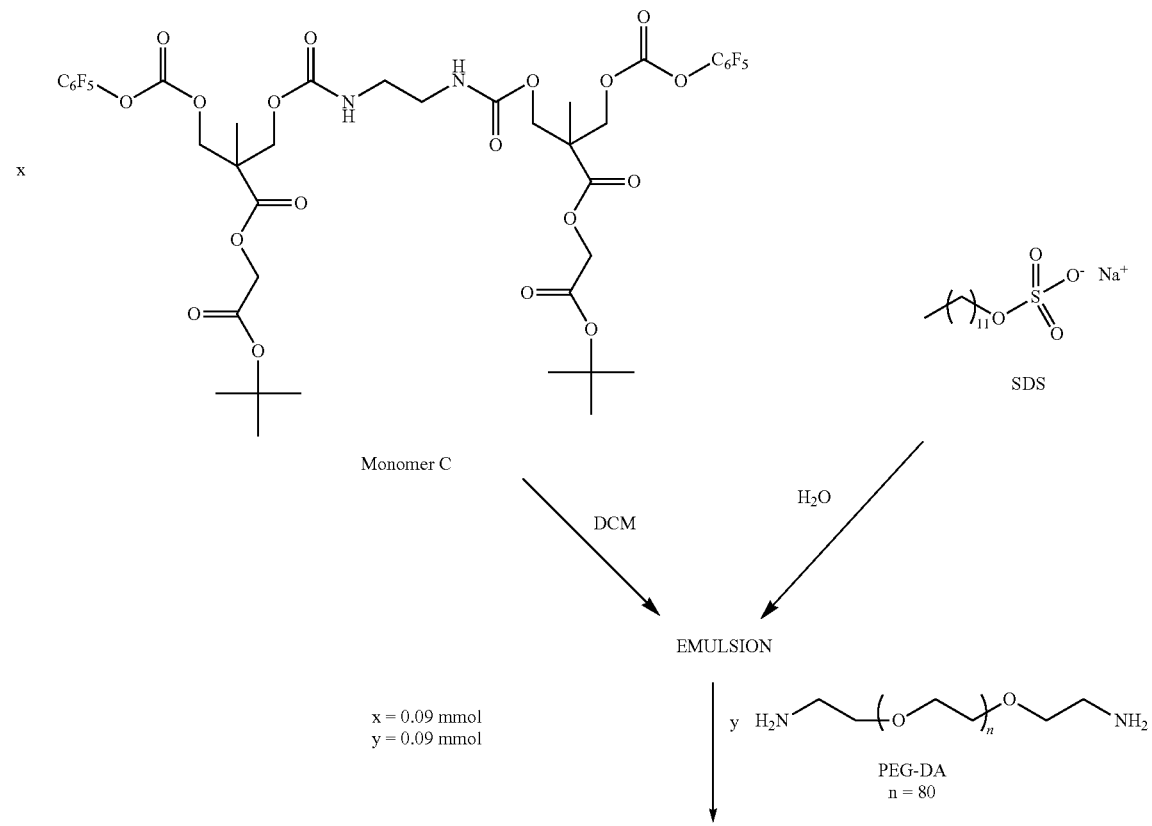

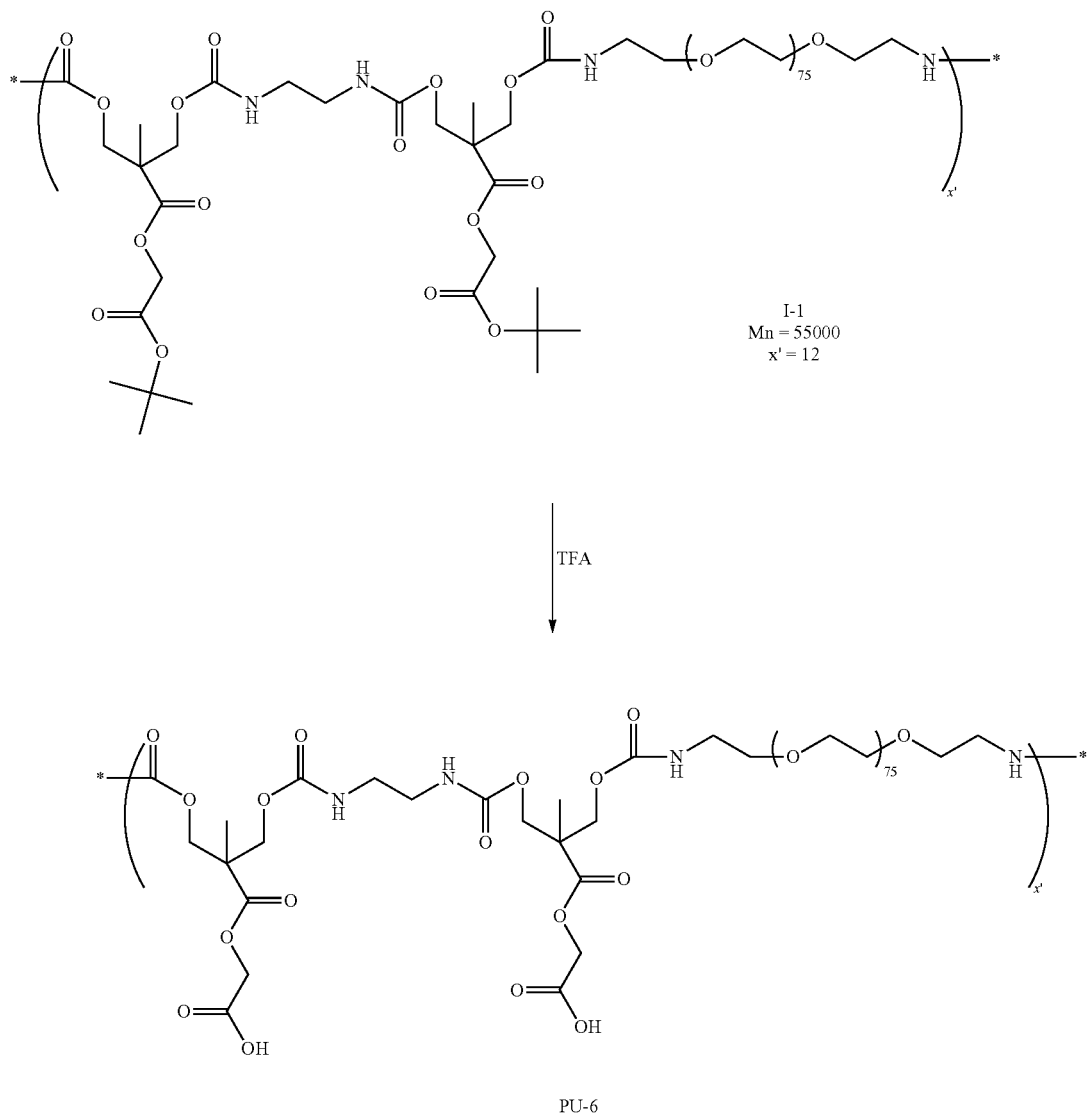

I-1
Mn = 55000
x' = 12

TFA

PU-6

The polymerization process to form polyurethane PU-6 was carried out in three steps following the procedure for PU-1.

A) Generation of a stable emulsion in water. Monomer C (0.1 g, 0.09 mmol, 1 equiv.) was dissolved in 3 mL of methylene chloride to form an organic phase. Sodium dodecyl sulphate (SDS) (0.02 g) was dissolved in distilled water (15 mL) to form an aqueous phase. Both phases were mixed vigorously using a sonicator cup to form a stable emulsion.

Figure 17:
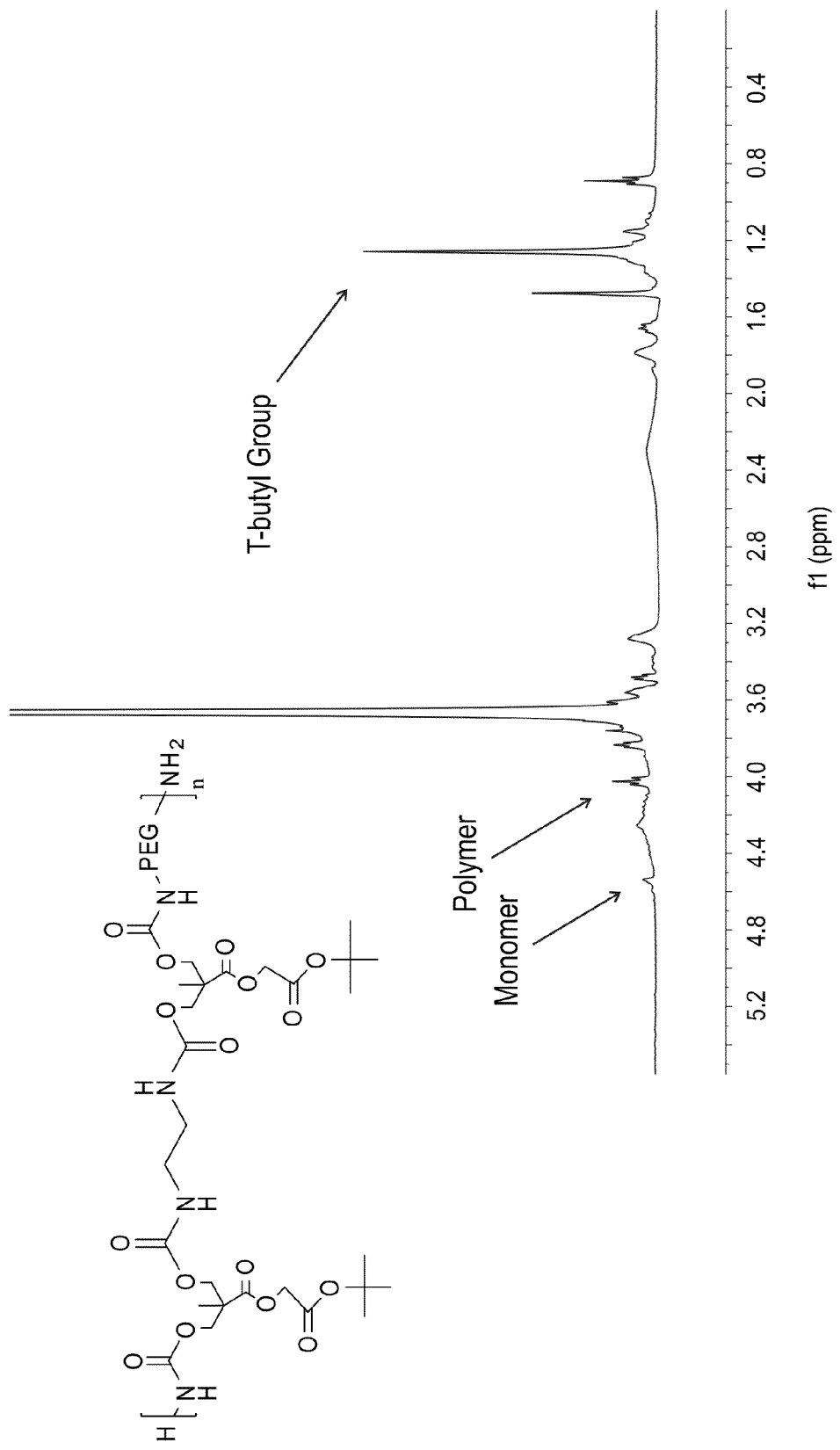
FIG. 17 is $^1$H NMR spectrum of protected intermediate polyurethane I-1 of Example 11.
Figure 18:
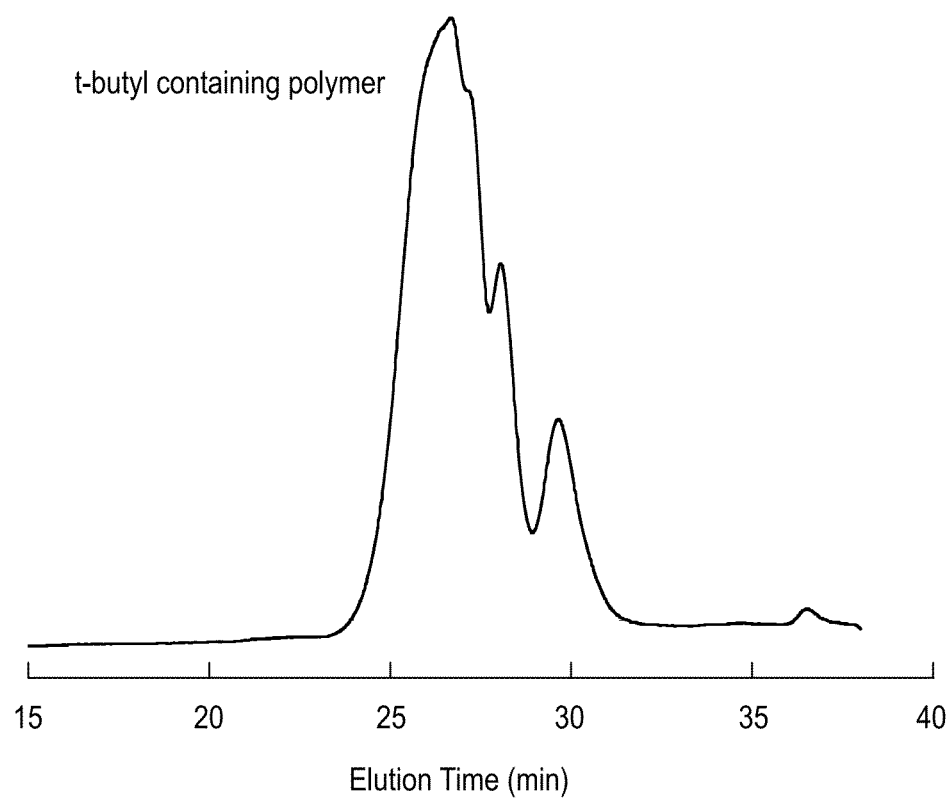
FIG. 18 is a GPC trace of protected intermediate polyurethane I-1 (Example 11).
Figure 19:
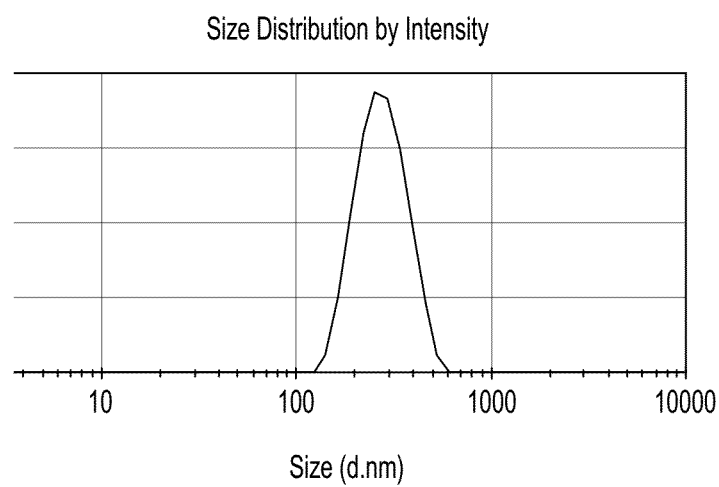
FIG. 19 is a graph showing the particle size distribution of protected intermediate polyurethane I-1 (Example 11).

B) Polymerization process to form intermediate polymer I-1. PEG-DA (Mn=3600, 0.32 g, 0.09 mmol, 1 equiv.) was dissolved in distilled water (8 mL) and the resulting solution was added dropwise at 10 mL/hour to the emulsion of step A). The polymerization was carried out at room temperature and was complete in about 6 hours. The reaction was followed by $^1$H NMR as shown in FIG. 17. The characteristic signal of the activated carbonate end units at delta=4.45 disappears completely and a new signal attributed to the methylene group linked to the O—CO—NH appears at delta=4.2 ppm. The polymerization was also confirmed by the increase in the number average molecular weight from Mn=3,600 to Mn=31,000, PDI=1.8 (FIG. 18, GPC trace). The average particle size for this system was 245 nm having a size dispersity of 0.145 (FIG. 19, particle size distribution).

Figure 20:
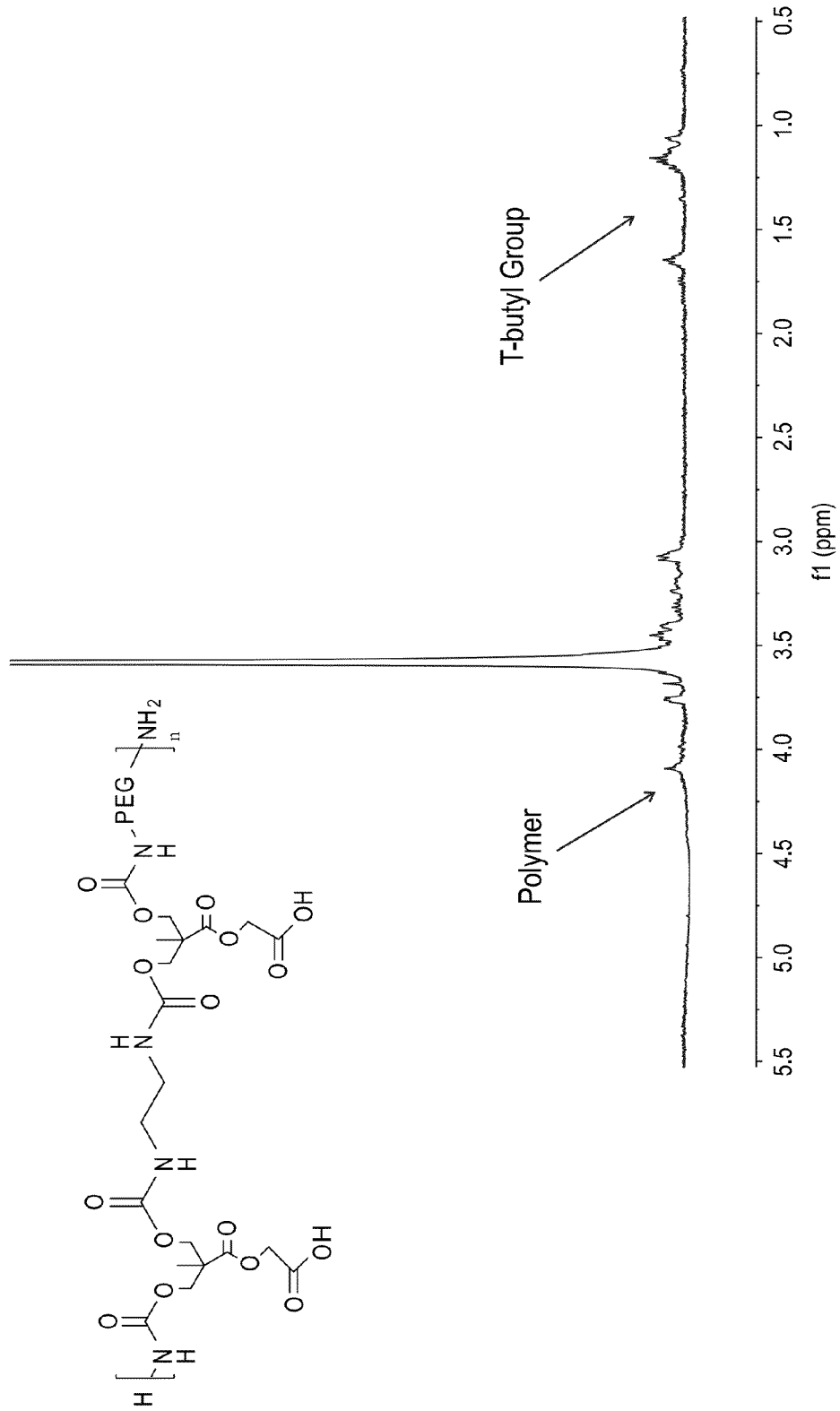
FIG. 20 is a $^1$H NMR spectrum of deprotected polyurethane PU-6 (Example 11).

C) Deprotection of t-butyl ester groups. In the third step, the t-butyl ester groups were selectively converted to carboxylic acid groups by transferring the dispersion of step B) to dichloromethane and mixing the resulting polyurethane solution with trifluoroacetic acid (TFA) (1:1 vol/vol). The modification was confirmed by $^1$H NMR following the dissipation of tert-butyl group $^1$H NMR signal. FIG. 20 is a $^1$H NMR spectrum of the final product, PU-6.

Example 12

Preparation of Monomer D (Mixture of Compounds)

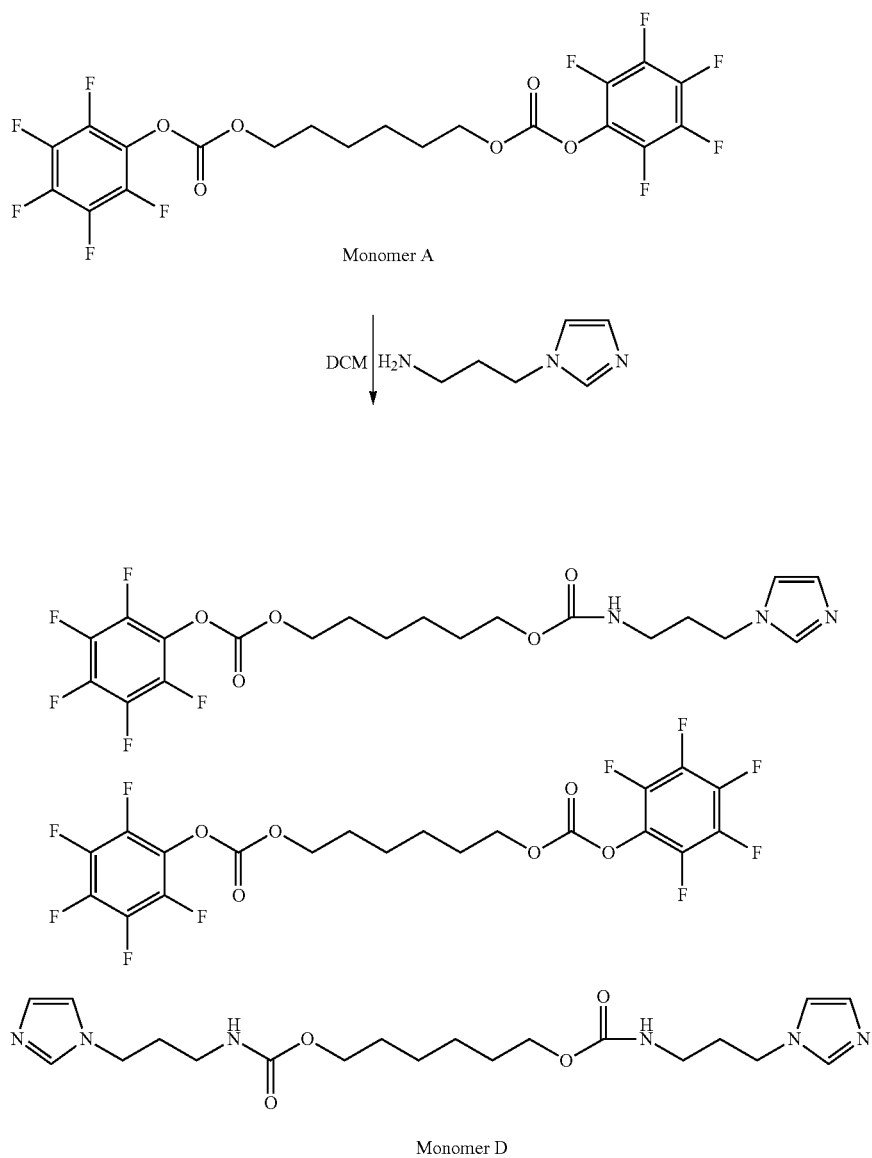

Monomer D

Figure 21:
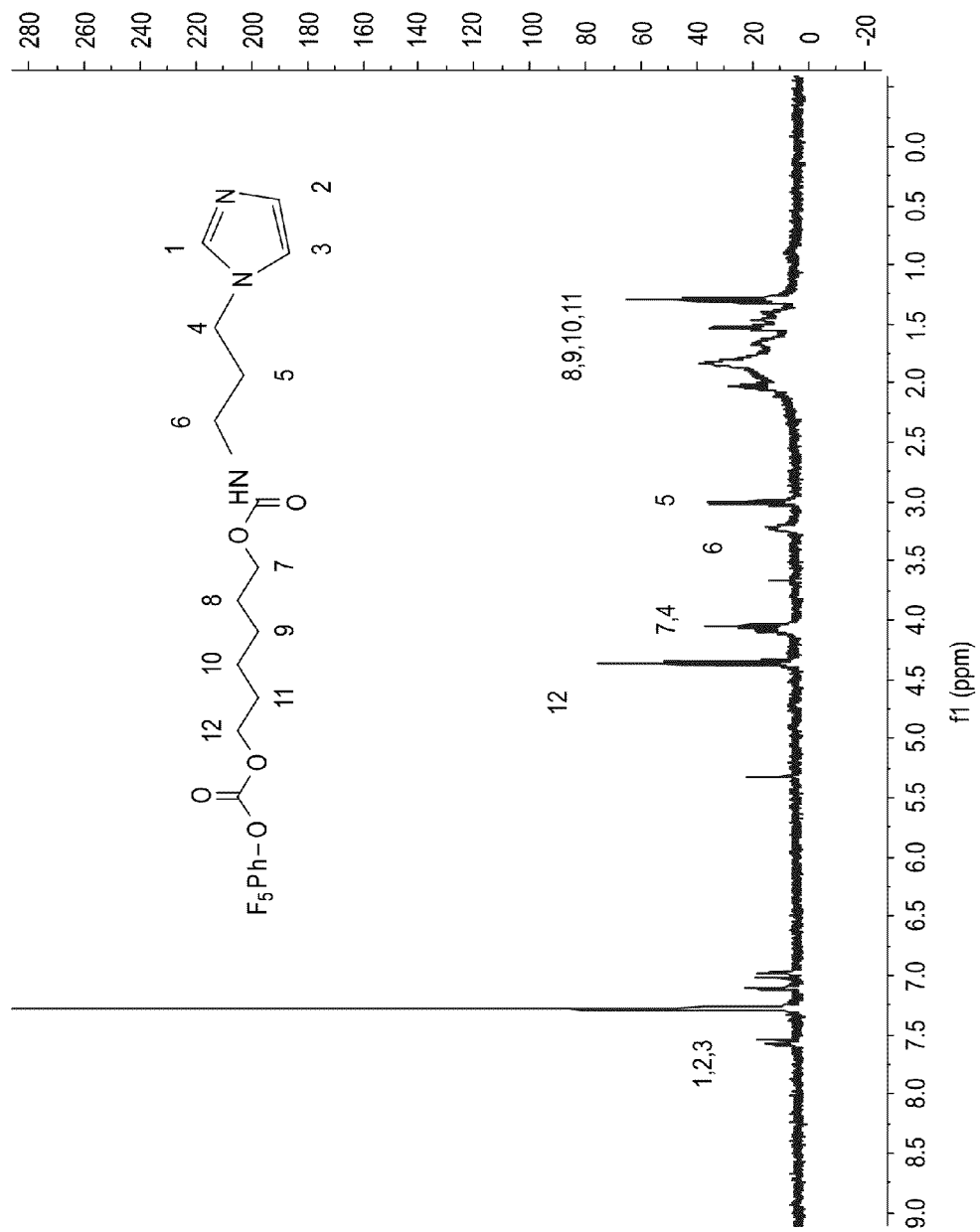
FIG. 21 is a $^1$H NMR spectrum of Monomer D, a mixture of three compounds (Example 12).

Monomer A (0.17 g, 0.33 mmol, 1 equiv., 0.66 mmol carbonate groups) was dissolved in 3.5 mL of methylene chloride together with 1-(3-aminopropyl) imidazole (0.0165 g, 0.13 mmol, 0.3 equiv., 0.13 mmol primary amine groups). The reaction was carried out at 0° C. and the conversion was followed by $^1$H NMR. As can be observed in the $^1$H NMR spectrum of FIG. 21, the characteristic peaks of the methylene linked to the amine group at 2.8 ppm disappear completely and a new signal appears at 3.1 ppm confirming the formation of the carbamate (urethane) group. Moreover, a new signal due to the methylene adjacent to the oxygen of the carbamate group appears at 4.2 ppm. Monomer D is a mixture of the compounds shown above and contains 0.53 mmol of active carbonate groups. The bis-carbamate compound is an impurity carried forward through the polymerization.

Example 13

Preparation of Polyurethane, PU-7

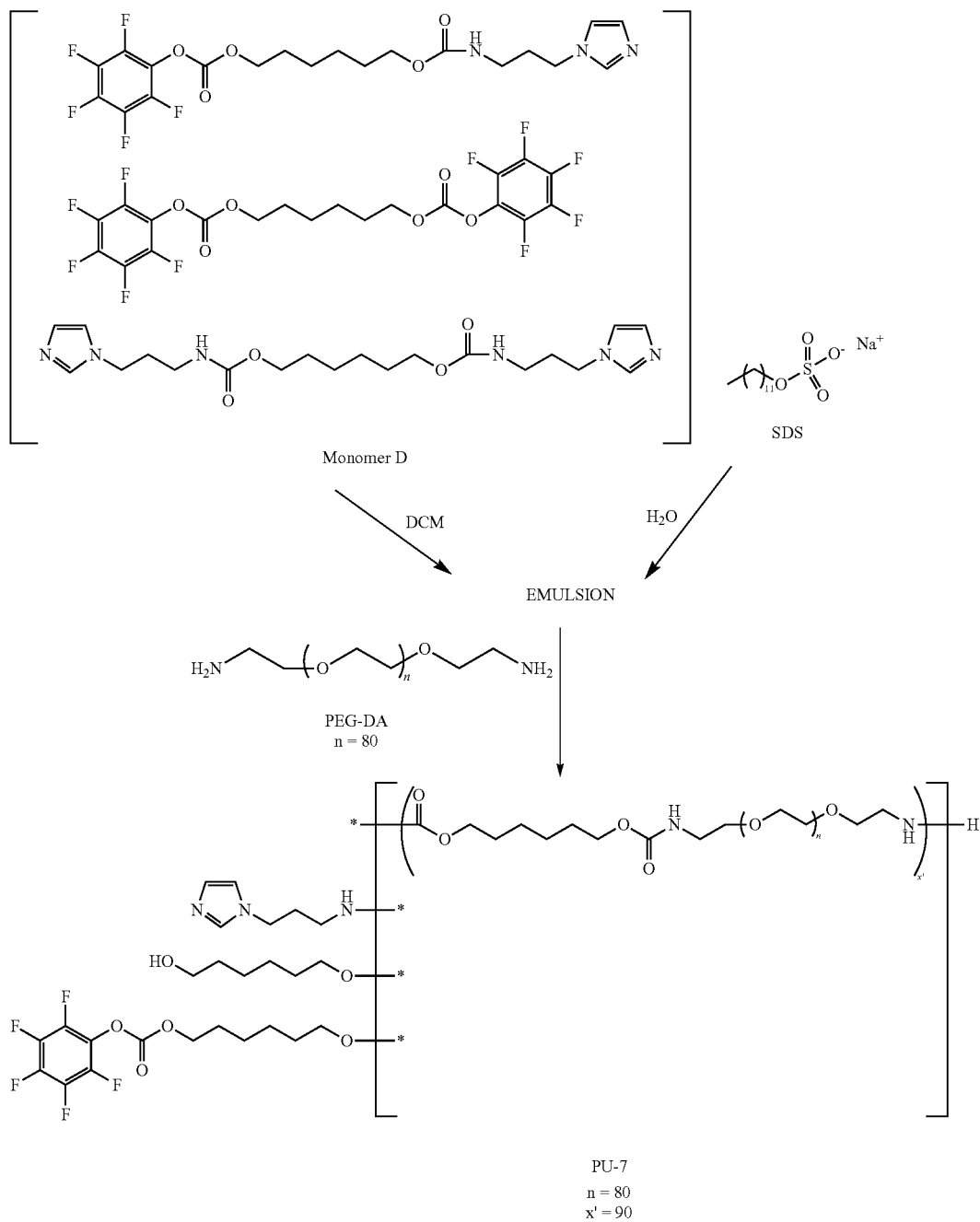

The end groups are shown in the above structure of PU-7. The end group can be a pentafluorophenyl carbonate, an imidazole propyl carbamate, an amine from PEG-DA, and/or a hydroxy group resulting from hydrolysis of a pentafluorophenyl carbonate. Subscript x' is about 90 in the above structure based on the PU-7 having an Mn of about 35000 and the above shown repeat unit of PU-7 having an average molecular weight of about 3788.

The polymerization process to form PU-7 was carried out in two steps.

A) Generation of a stable emulsion in water. The crude mixture labeled Monomer D containing 0.53 mmol activated carbonate groups was dissolved in methylene chloride (3.5 mL), the organic phase. Sodium dodecyl sulphate (0.03 g) was dissolved in distilled water (18 mL). Both phases were mixed vigorously using a sonicator cup to form a stable emulsion.

Figure 22:
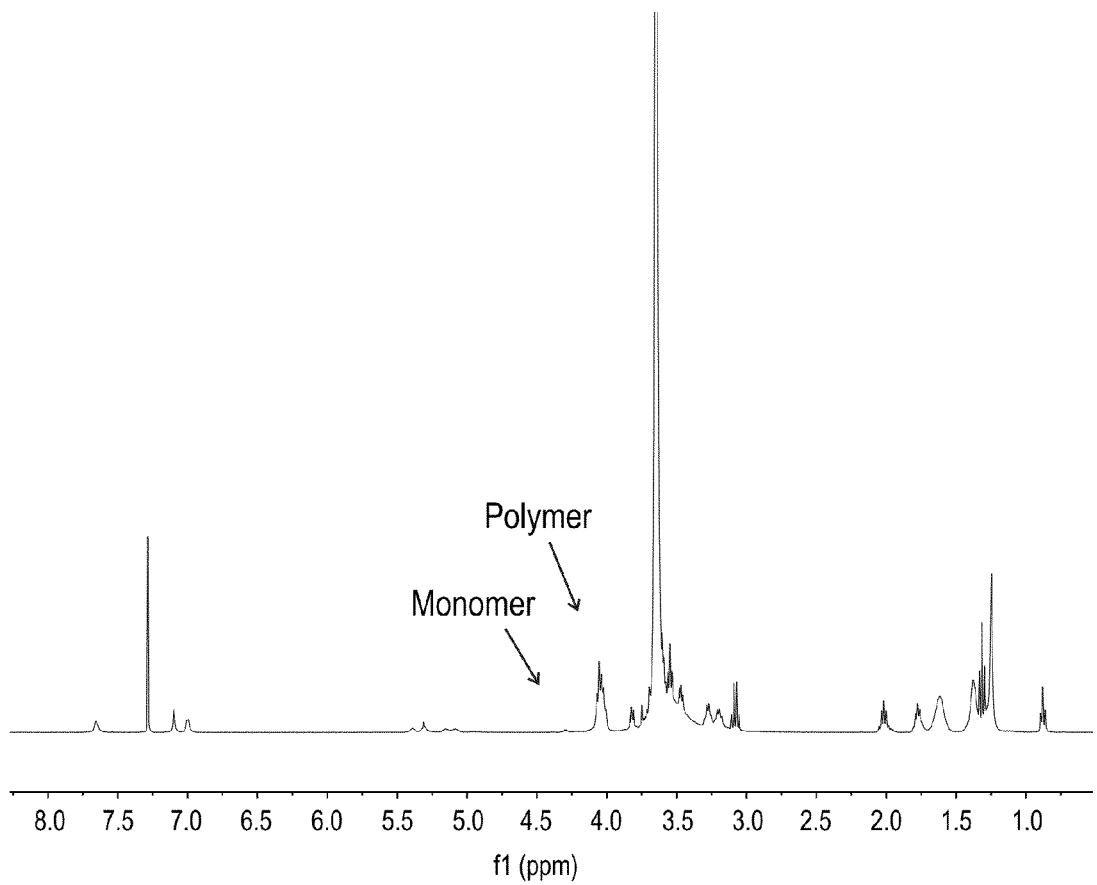
FIG. 22 is a $^1$H NMR spectrum of polyurethane nanoparticles bearing an imidazole functionality (Example 13).

B) Polymerization process. PEG-DA (Mn=3600, 0.475 g, 0.13 mmol, 0.5 equiv.) was dissolved in 9 mL of distilled water and was added dropwise at 10 ml/hr to the emulsion formed in step A). Upon complete addition, the reaction was maintained at room temperature for 6 hours. The product was confirmed by $^1$H-NMR as shown in FIG. 22. The characteristic signal of the activated carbonate end units at 4.45 ppm disappears completely and a new signal attributed to the methylene group linked to the O—CO—NH appears at 4.2 ppm. Characteristic signals of the imidazole group were confirmed by 1H-NMR at 7.7-7.0 ppm.

Figure 23:
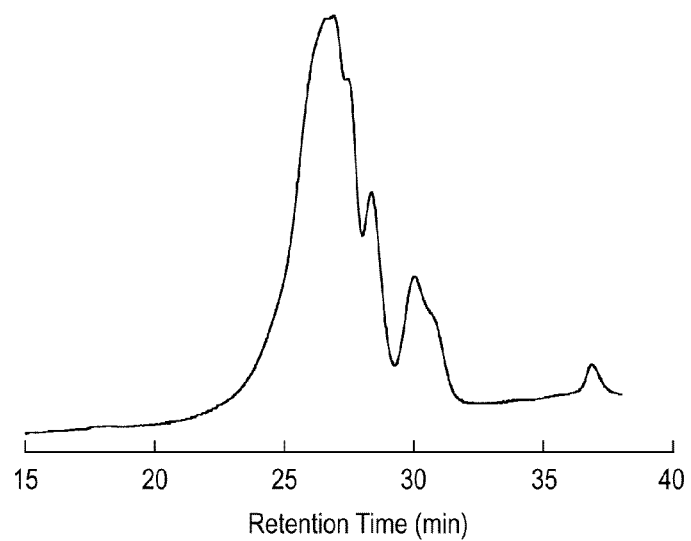
FIG. 23 is a GPC trace for the polyurethane nanoparticles PU-7 bearing an imidazole functionality (Example 13).
Figure 24:
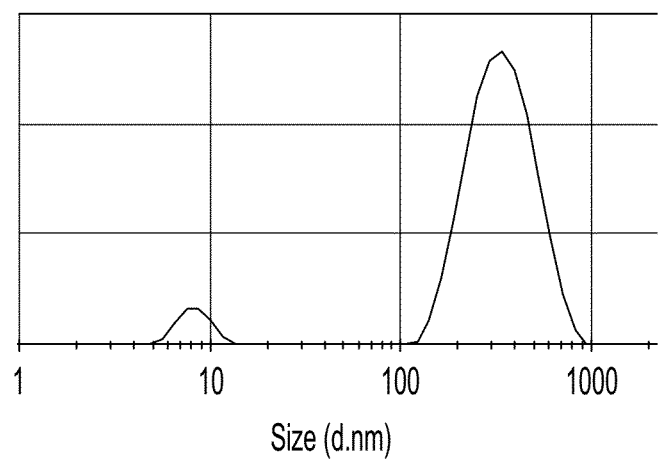
FIG. 24 is a graph showing the particle size distribution of polyurethane PU-7 (Example 12).

The polymerization was also confirmed by the increase in the number average molecular weight (Mn) from 3600 to 35000 (FIG. 23, GPC), PDI=2.3. In this particular case, the PDI was higher (FIG. 24) than the prior examples.

The stability of the synthesized nanoparticles was measured by dynamic light scattering (DLS). The particle size value for this system was 245 nm and the size polydispersity was 0.34. The particle size remained constant with the reaction time.

Example 14

Comparative

Preparation of 1,6-bis[(4-nitrophenoxy)carbonyloxy]hexane, Monomer E.

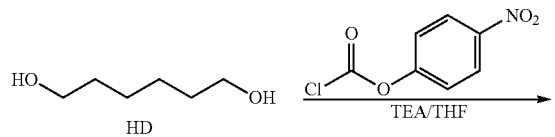

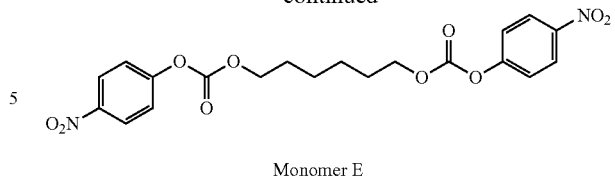

Monomer E 4-nitrophenyl chloroformate (2.2 equiv., 0.58 g, 2.9 mmol) and trethylamine (TEA, 0.29 g, 2.9 mmol, 2.2 equiv.) were dissolved in THF (8.0 mL), stirred for 30 minutes, and cooled down to 0° C. 1,6-Hexanediol (0.24 g, 2.0 mmol, 1.0 equiv.) dissolved in 2.0 mL of THF was added dropwise to the reaction mixture. The mixture was stirred at room temperature for 4 hours and filtered to remove triethylamine hydrochloride salt. The filtrate was concentrated and recrystallized from hexanes to afford Monomer E as a yellow crystalline powder (0.53 g, 76% yield). The structure was confirmed by $^1$H NMR (CDCl$_3$, 400 MHz): delta=8.40-7.20 (d, C$_{Ar}$, 4H), 4.35 (t, OCOOCH$_2$, 4H), 1.82 (t, OCOOCH$_2$CH$_2$, 4H), 1.52 (t, CH$_2$, 4H).

Example 15

Comparative

Polyurethane PU-8 was prepared from Monomer E using the procedure of Example 3.

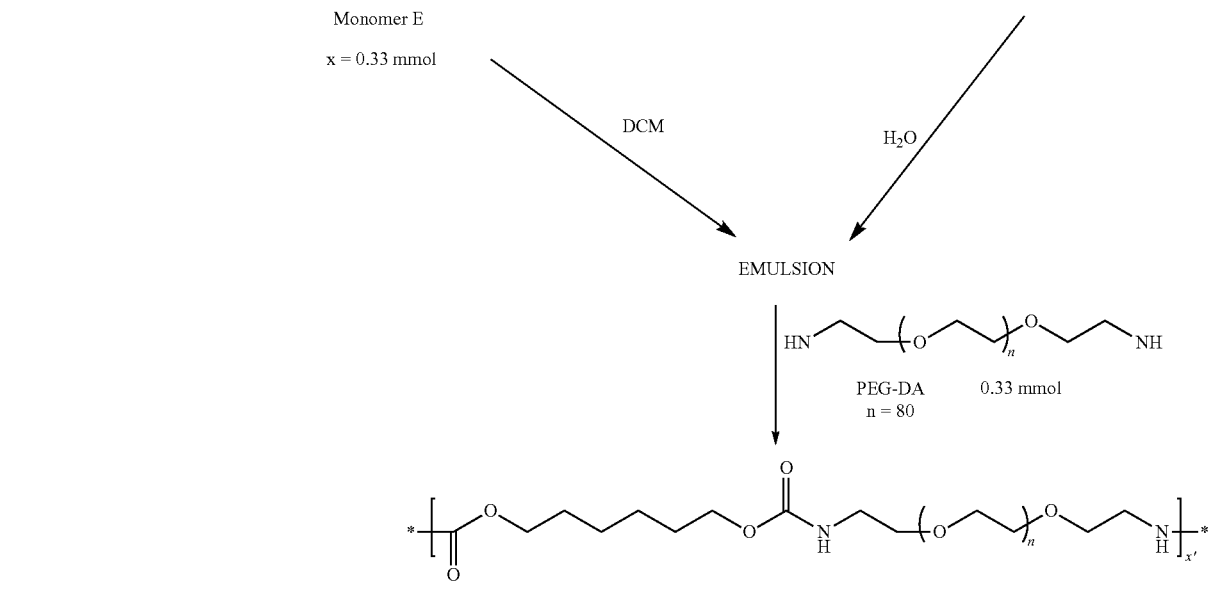

PU-8

Mn = 20000, PDI = 1.3, x' = 6

A) Generation of initial emulsion in water by sonication. Monomer E (0.14 g, 0.33 mmol, 1 equiv.) was dissolved in methylene chloride (DCM, 7 mL) to form an organic phase. The surfactant, sodium dodecyl sulphate (SDS, 0.17 g) was dissolved in distilled water (35 mL) to form an aqueous phase. Both phases were mixed vigorously using a sonicator to form a stable emulsion.

B) Polymerization. PEG-DA (Mn=3400, 1.12 g, 0.33 mmol, 1 equiv., DP=80) was dissolved in distilled water (20 mL) and was added dropwise at 20 ml/hour to the emulsion formed in part A). Upon completion of the addition, the reaction mixture was stirred at room temperature about 6 hours. The reaction conversion was followed by $^1$H-NMR. The characteristic signal of the activated carbonate end units at delta=4.35 disappears completely and a new signal attributed to the methylene group linked to the O—CO—NH appears at delta=4.2 ppm. The product PU-8 had Mn 20000, PDI 1.3, degree of polymerization x'=6. The stability of the synthesized nanoparticles was measured by dynamic light scattering (DLS). The particle size remained relatively constant as the reaction progressed. The particle size value for the final dispersion was 407 nm with a polydispersity index (PDI) of 0.19.

Example 16

Comparative

Preparation of 1,6-bis(phenoxycarbonyloxy hexane, Monomer F.

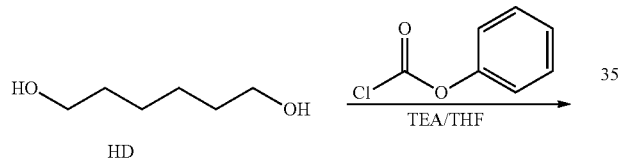

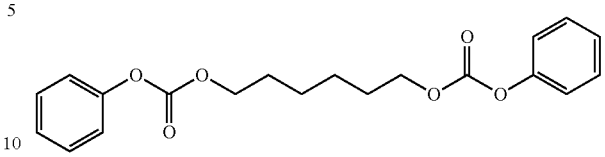

Monomer F

Phenyl chloroformate (2.2 equiv., 0.45 g, 2.9 mmol) and TEA (0.29 g, 2.9 mmol, 2.2 equiv.) were dissolved in THF (8.0 mL) and stirred for 30 min. 1,6-hexanediol (0.24 g, 2.0 mmol, 1.0 equiv.) dissolved in 2.0 mL of THF was added dropwise to the reaction mixture and the mixture was stirred at room temperature 4 hours. The reaction mixture was filtered to remove triethylamine hydrochloride salt. The product-containing filtrate was concentrated and the crude product was recrystallized from hexanes to afford Monomer F as a white crystalline powder (0.38 g, 68% yield). The structure was confirmed by $^1$H NMR (CDCl$_3$, 400 MHz): delta=7.50-7.10 (m, C$_{Ar}$, 5H) 4.30 (t, OCOOCH$_2$, 4H), 1.80 (t, OCOOCH$_2$CH$_2$, 4H), 1.50 (t, CH$_2$, 4H).

Example 17

Comparative

Polyurethane PU-9 was prepared from Monomer F using the procedure of Example 3.

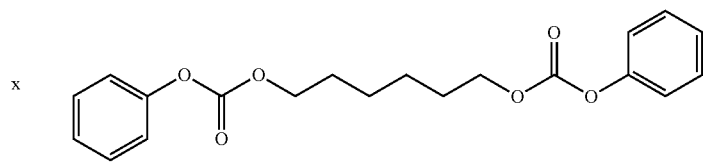 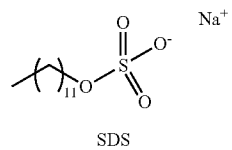

Monomer F
x = 0.33 mmol

DCM     H$_2$O

EMULSION

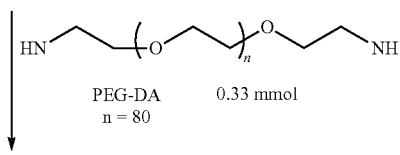

PEG-DA     0.33 mmol
n = 80

-continued

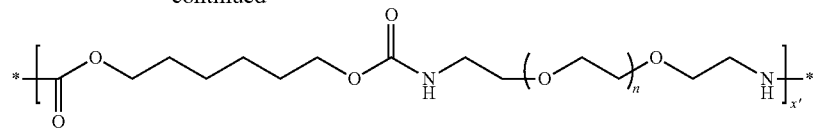

PU-9

Mn = 4000, PDI = 1.9, x' = 1

A) Generation of initial emulsion in water by sonication. Monomer F (0.12 g, 0.33 mmol, 1 equiv.) was dissolved in methylene chloride (DCM, 7 mL) to form an organic phase. The surfactant, sodium dodecyl sulphate (SDS, 0.17 g) was dissolved in distilled water (35 mL) to form an aqueous phase. Both phases were mixed vigorously using a sonicator to form a stable emulsion.

B) Polymerization. PEG-DA (Mn=3400, 1.12 g, 0.33 mmol, 1 equiv., DP=80) was dissolved in distilled water (20 mL) and was added dropwise at 20 ml/hour to the emulsion formed in part A). Upon completion of the addition, the reaction mixture was stirred at room temperature about 6 hours. The reaction conversion was followed by $^1$H-NMR. The conversion after one week was about 72% calculated by $^1$H NMR. The product PU-9 had Mn 4000, PDI 1.9, degree of polymerization x'=1. No particle size could be measured because the particles were not stable.

Example 18

Comparative

Preparation of 1,6-bis(imidazole-1-carbonyloxy hexane, Monomer G.

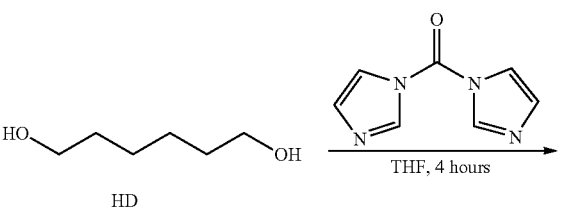

HD

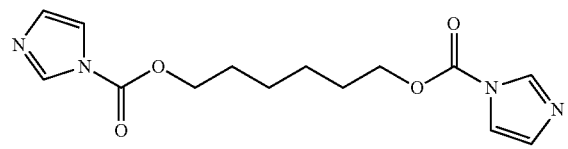

Monomer G 1,1'-Carbonyldiimidazole (2.2 equiv., 0.48 g, 2.9 mmol) was dissolved in THF (8.0 mL) and stirred for 30 min. 1,6-hexanediol (0.24 g, 2.0 mmol, 1.0 equiv.) dissolved in 2.0 mL of THF was added dropwise to the reaction mixture and the mixture was stirred at room temperature 4 hours. The reaction mixture was filtered, in which most of the Monomer G precipitates. The filtered solid was redissolved in DCM and recrystallized from hexanes to afford Monomer G as a white crystalline powder (0.40 g, 82% yield). The structure was confirmed by $^1$H NMR (CDCl$_3$, 400 MHz): delta=8.20-7.00 (m, C$_{Ar}$, 3H) 4.45 (t, OCOOCH$_2$, 4H), 1.85 (t, OCOOCH$_2$CH$_2$, 4H), 1.52 (t, CH$_2$, 4H).

Example 19

Comparative

Polyurethane PU-10 was prepared from Monomer G using the procedure of Example 3.

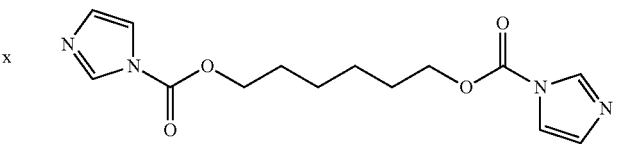

Monomer G
x = 0.33 mmol

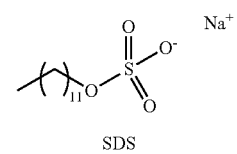

SDS

DCM        H$_2$O

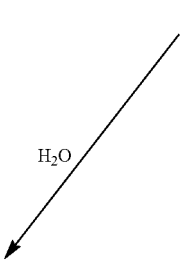

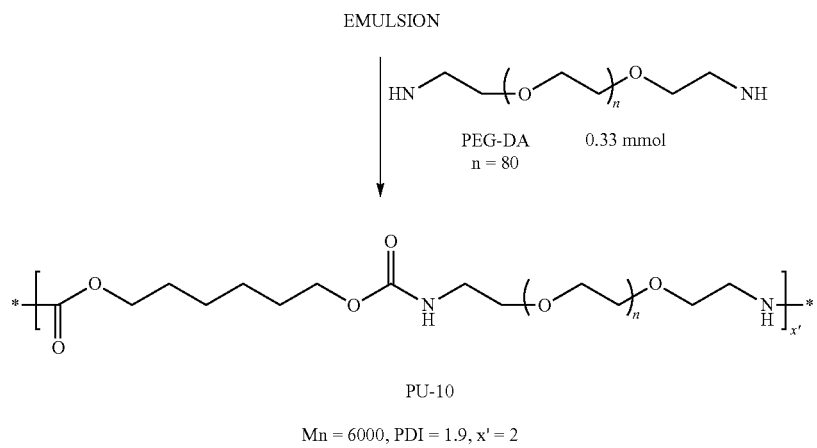

A) Generation of initial emulsion in water by sonication. Monomer G (0.10 g, 0.33 mmol, 1 equiv.) was dissolved in methylene chloride (DCM, 7 mL) to form an organic phase. The surfactant, sodium dodecyl sulphate (SDS, 0.17 g) was dissolved in distilled water (35 mL) to form an aqueous phase. Both phases were mixed vigorously using a sonicator to form a stable emulsion.

B) Polymerization. PEG-DA (Mn=3400, 1.12 g, 0.33 mmol, 1 equiv., DP=80) was dissolved in distilled water (20 mL) and was added dropwise at 20 ml/hour to the emulsion formed in part A). Upon completion of the addition, the reaction mixture was stirred at room temperature about 6 hours. The reaction conversion was followed by $^1$H-NMR. The conversion after one week was about 72% calculated by $^1$H NMR. The product PU-10 had Mn 6000, PDI 1.9, degree of polymerization x'=2. No particle size could be measured because the particles were not stable.

Table 5 summarizes the interfacial polymerizations using Monomers A, E, F, and G. Each of the polymers PU-1, PU-8, PU-9, and PU-10 has identical repeat units. The polymerizations differed only by the active dicarbonate formed with 1,6-hexanediol. Examples 17 and 19 did not form particles.

persed in N,N-dimethylacetamide (DMAc, 1.5 mL) and a fixed amount of DOX.HCl (3 mg for Example 20 or 5 mg for Example 21) was dissolved in DMAc (1.5 mL) containing 3-molar equivalent of triethylamine. The DOX solution was added dropwise to the nanoparticle suspension under stirring, and the resultant suspension was equilibrated at 25° C. for 24 hours. The DOX-containing suspension was dialyzed against deionized water using modified cellulose ester membrane tubing (Spectra/Por 7, Spectrum Laboratories Inc.) having a molecular weight cutoff (MWCO) of 1000 Da. The bath water was changed every 2 hours for 3 times on the first day and once on the second day of dialysis. After 48 hours of dialysis, the DOX-loaded nanogels were isolated by freeze-drying. The average particle size was determined on the dialyzed suspension before and after filtering the suspension through a 0.45 micrometer pore size filter. Table 6 summarizes the results.

TABLE 5

| Example | Name | Monomer | Monomer (mmol) | Monomer (equiv.) | PEG-DA (mmol) | PEG-DA (equiv.) | Mn (kDa) | PDI | x' | Particle size (nm) | Size PDI |
|---|---|---|---|---|---|---|---|---|---|---|---|
| 3 | PU-1 | A | 0.33 | 1.00 | 0.33 | 1.00 | 45 | 1.6 | 12.5 | 450 | 0.21 |
| 15 | PU-8 | E | 0.33 | 1.00 | 0.33 | 1.00 | 20 | 1.3 | 6 | 407 | 0.19 |
| 17 | PU-9 | F | 0.33 | 1.00 | 0.33 | 1.00 | 4 | 1.9 | 1 | N/A | N/A |
| 19 | PU-10 | G | 0.33 | 1.00 | 0.33 | 1.00 | 6 | 1.9 | 2 | N/A | N/A |

The results indicate that interfacial polymerization using the pentafluorophenyloxycarbonyloxy group (Monomer A) forms higher molecular weight polyurethane compared to the p-nitrophenyloxycarbonyloxy group (Monomer E), phenyloxycarbonyloxy group (Monomer F), and imidazolylcarbonyloxy group (Monomer G).

Drug Loaded Nanoparticles

Examples 20 and 21

Doxorubicin (DOX) was loaded into PU-2 (Example 9) by equilibrium adsorption as follows. PU-2 (10 mg) was dis-

TABLE 6

| | | | DOX loaded PU-2 | | |
|---|---|---|---|---|---|
| Example | Initial DOX (mg) | Filtered? (0.45 micron pore size) | Z-average diameter ± S.D. (nm) | PDI | Zeta-potential ± S.D (mV) |
| 9 | 0 | N | 301.4 ± 7.0 | 0.625 | −9.18 ± 0.5 |
|  | 0 | Y | 125.6 ± 10.1 | 0.717 | −8.75 ± 0.5 |
| 20 | 3 | N | 233.7 ± 1.7 | 0.255 | −5.81 ± 0.4 |
|  | 3 | Y | 169.8 ± 2.4 | 0.124 | −6.84 ± 0.2 |
| 21 | 5 | N | 306.3 ± 26.0 | 0.255 | −3.95 ± 0.1 |
|  | 5 | Y | 196.2 ± 1.3 | 0.105 | −6.83 ± 0.2 |

To determine the DOX-loading level, a known amount of DOX-loaded PU-2 was suspended in 10 mL of DMF and vortexed vigorously. The amount of DOX loaded was quantitatively determined using a UV-VIS spectrophotometer (Perkin Elmer, U.S.A.) at 485 nm. The DOX concentration in solution was calculated using a standard calibration curve obtained for known concentrations of DOX dissolved in DMF. The actual loading level of DOX was calculated according to the formulae: [(mass of DOX)/(mass of DOX-loaded nanogel)]×100%. Table 7 summarizes the results.

TABLE 7

| Example | Initial DOX (mg) | Actual loading level ± S.D. (% w/w) |
|---|---|---|
| 20 | 3 mg | 2.5 ± 0.05 |
| 21 | 5 mg | 10.6 ± 0.50 |

The results indicate that the PU-2 nanoparticles contained DOX in an amount of about 2.5 wt % and 10.6 wt % based on total dry weight of the loaded nanoparticles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. When a range is used to express a possible value using two numerical limits X and Y (e.g., a concentration of X ppm to Y ppm), unless otherwise stated the value can be X, Y, or any number between X and Y.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and their practical application, and to enable others of ordinary skill in the art to understand the invention.

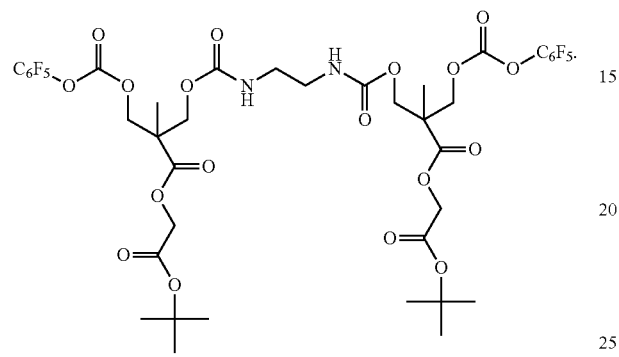

What is claimed is:

1. A method, comprising:
forming an initial emulsion by combining with agitation i) a first mixture comprising a first monomer and a water immiscible organic solvent with ii) a second mixture comprising water and a surfactant, wherein the first monomer comprises two or more pentafluorophenyl carbonate (PFPC) groups having the structure

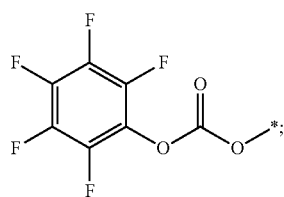

combining with agitation the initial emulsion and a third mixture, the third mixture comprising water and a second monomer, thereby forming a second emulsion that includes the first monomer and the second monomer, wherein the second monomer comprises two or more nucleophilic amine groups, and each of the two or more nucleophilic amine groups is capable of reacting with a respective PFPC group of the first monomer to form a respective carbamate group; and
allowing the first monomer and the second monomer of the second emulsion to react by interfacial polymerization, thereby forming a polyurethane, wherein the polyurethane has a number average molecular weight (Mn) of about 30000 to about 80000.

2. The method of claim 1, wherein the polyurethane has a form which is a nanoparticle having an average circular diameter in water of about 4 nm to about 500 nm.

3. The method of claim 1, wherein the second monomer is a poly(ethylene oxide) comprising two terminal primary amine groups.

4. The method of claim 1, wherein the surfactant comprises a salt of a sulfonic acid.

5. The method of claim 1, wherein the first monomer comprises two PFPC groups.

6. The method of claim 1, wherein the method utilizes no metal catalyst.

7. The method of claim 1, wherein the interfacial polymerization excludes isocyanate monomers.

8. The method of claim 1, wherein polyurethane chain growth occurs substantially at a boundary between the water and the water immiscible organic solvent.

9. A method, comprising:
forming an emulsion comprising droplets of an organic phase dispersed in an aqueous phase, the organic phase comprising a water immiscible organic solvent and a first monomer, the first monomer comprising two or more pentafluorophenyl carbonate (PFPC) groups having the structure

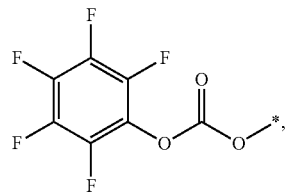

the aqueous phase comprising water, a surfactant, and a second monomer, wherein the second monomer comprises two or more nucleophilic amine groups, and;
allowing the first monomer and the second monomer of the emulsion to polymerize interfacially, thereby forming a polyurethane, wherein the polyurethane has a number average molecular weight (Mn) of about 30000 to about 80000.

10. The method of claim 9, wherein the droplets have an average circular diameter of about 1 to 1000 nm.

11. The method of claim 9, wherein the solution comprising the second monomer is added dropwise to the first emulsion over a period of about 1 hour.

12. The method of claim 9, wherein the surfactant is a hydrocarbon comprising a negative charged sulfonate group (*—SO$_3^-$).

13. The method of claim 9, wherein the organic solvent is a chlorinated hydrocarbon.

14. The method of claim 9, wherein the first monomer comprises three or more pentafluorophenyl carbonate groups, and the polyurethane nanoparticle comprises a branched polyurethane.

15. The method of claim 9, wherein the second monomer comprises three or more amine groups, and the polyurethane nanoparticle is a nanogel.

16. The method of claim 15, wherein the second monomer is tris(2-aminoethyl)amine.

17. A method, comprising:
(I) combining with agitation i) a first mixture comprising a first monomer and a water immiscible organic solvent with ii) a second mixture comprising water and a surfactant, thereby forming a first emulsion, wherein the first monomer comprises two or more pentafluorophenyl carbonate (PFPC) groups having the structure

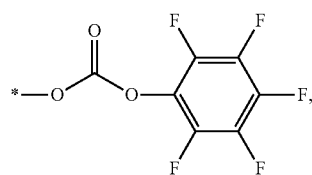 [SMILES: *OC(=O)Oc1c(F)c(F)c(F)c(F)c1F]

and one or more sub-structural moieties of formula (3):

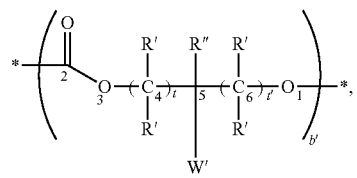

wherein
positions 1 to 6 of the sub-structural moiety of formula (3) are numbered,
b' is a number greater than or equal to 1,
each R' is an independent monovalent radical selected from the group consisting of hydrogen, halogens, methyl, and ethyl,
R" is a monovalent radical selected from the group consisting of hydrogen, halogens, and alkyl groups comprising 1 to 6 carbons,
t is a positive integer having a value of 0 to 2,
t' is a positive integer having a value of 0 to 2,
t and t' cannot both be zero, and
W' is a functional group selected from the group consisting of hydrogen and functional groups comprising 1 or more carbons;
(II) forming a third mixture comprising water and a second monomer comprising two or more nucleophilic amine groups capable of reacting with the PFPC groups of the first monomer to form respective carbamate groups;
(III) combining with agitation the first emulsion and the third mixture, thereby forming a second emulsion; and
(IV) allowing the first monomer and the second monomer of the second emulsion to react by interfacial polymerization, thereby forming a polyurethane nanoparticle, wherein the polyurethane has a number average molecular weight (Mn) of about 30000 to about 80000.

18. The method of claim 17, wherein b' is 1, t is 1, t' is 1, each R' is hydrogen, and R" is methyl or ethyl.

19. The method of claim 17, wherein the first monomer comprises one or more sub-structural moieties of formula (4):

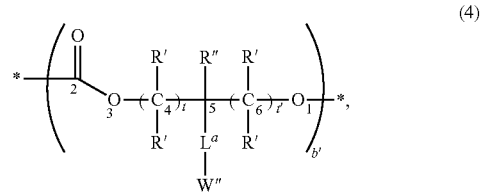

wherein
positions 1 to 6 are numbered in formula (4),
b' is a number greater than or equal to 1,
each R' is an independent monovalent radical selected from the group consisting of hydrogen, halogens, methyl, and ethyl,
R" is a monovalent radical selected from the group consisting of hydrogen, halogens, and alkyl groups comprising 1 to 6 carbons,
t is a positive integer having a value of 0 to 2,
t' is a positive integer having a value of 0 to 2,
t and t' cannot both be zero,
$L^a$ is a divalent linking group comprising a carbonyl group, and
W" is a group comprising a heteroatom linked to the carbonyl of $L^a$, the heteroatom selected from the group consisting of O, N, and S.

20. The method of claim 17, wherein the first monomer has a structure according to formula (5):

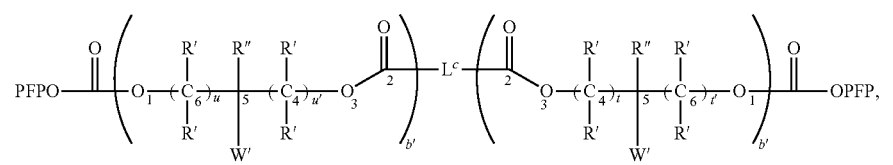

wherein
positions 1 to 6 of each parenthesized sub-structure are numbered in formula (5),
PFPO represents a pentafluorophenoxy group,
each b' is independently a number greater than or equal to 1,
each R' is an independent monovalent radical selected from the group consisting of hydrogen, halogens, methyl, and ethyl,
each R" is an independent monovalent radical selected from the group consisting of hydrogen, halogens, and alkyl groups comprising 1 to 6 carbons,
t is a positive integer having a value of 0 to 2,
t' is a positive integer having a value of 0 to 2, t and t' cannot both be zero,
u is a positive integer having a value of 0 to 2,
u' is a positive integer having a value of 0 to 2,
u and u' cannot both be zero,
$L^c$ is a divalent linking group comprising 1 or more carbons, and
each W' is a functional group selected from the group consisting of hydrogen and functional groups comprising 1 or more carbons.

21. The method of claim 17, wherein the first monomer is